US009646415B2

(12) United States Patent
Hanson et al.

(10) Patent No.: US 9,646,415 B2
(45) Date of Patent: May 9, 2017

(54) SYSTEM AND METHOD FOR VISUALIZING MULTIPLE-SENSOR SUBSURFACE IMAGING DATA

(75) Inventors: David Hanson, Pella, IA (US); Keith Jerome Sjostrom, Des Moines, IA (US); Ross Peter Jones, Cambridge (GB); Peter John Kelly, Cambridge (GB)

(73) Assignee: Underground Imaging Technologies, Inc., Latham, NY (US)

( * ) Notice: Subject to any disclaimer, the term of this patent is extended or adjusted under 35 U.S.C. 154(b) by 1670 days.

(21) Appl. No.: 11/804,310

(22) Filed: May 16, 2007

(65) Prior Publication Data

US 2008/0079723 A1   Apr. 3, 2008

Related U.S. Application Data

(60) Provisional application No. 60/800,874, filed on May 16, 2006.

(51) Int. Cl.
G06T 17/05 (2011.01)
G06K 9/00 (2006.01)
G06K 9/62 (2006.01)

(52) U.S. Cl.
CPC ............ *G06T 17/05* (2013.01); *G06K 9/0063* (2013.01); *G06K 9/6253* (2013.01)

(58) Field of Classification Search
CPC ....... G01P 13/00; Y10T 83/148; Y10T 83/538
USPC .......... 345/420, 427, 629, 630; 702/16, 156; 382/109
See application file for complete search history.

(56) References Cited

U.S. PATENT DOCUMENTS

| | | | |
|---|---|---|---|
| 3,288,242 A | | 11/1966 | Loeb |
| 4,262,920 A | * | 4/1981 | Mettetal ................. 280/408 |
| 4,297,699 A | | 10/1981 | Fowler et al. |
| 4,430,653 A | | 2/1984 | Coon et al. |
| 4,492,865 A | | 1/1985 | Murphy et al. |
| 4,686,475 A | | 8/1987 | Kober et al. |
| 4,814,768 A | | 3/1989 | Chang |
| 4,873,513 A | * | 10/1989 | Soults et al. ............... 345/27 |

(Continued)

OTHER PUBLICATIONS

Fröhlich et al., Oct. 1999, "Exploring geo-scientific data in virtual environments", Proceedings of the Conference on Visualization '99: Celebrating Ten Years, IEEE Visualization. IEEE Computer Society Press, Los Alamitos, CA, pp. 169-173.*

(Continued)

*Primary Examiner* — Haixia Du
(74) *Attorney, Agent, or Firm* — Hollingsworth & Davis

(57) ABSTRACT

A user interface includes a display for displaying of a plurality of sensor data sets representative of signals associated with a plurality of sensors configured for sensing of a subsurface. At least some of the sensors are configured for subsurface sensing in a manner differing from other sensors of the plurality of sensors. Each of the sensor data sets comprises sensor data samples each associated with geographic position data. The sensor data sets are shown overlaid within a volume depicted on the display. The graphical representations of the sensor data sets are individually viewable within the volume and displayed in geographical alignment relative to one another within the volume in accordance with the geographic position data of the sensor data samples of each of the sensor data sets.

40 Claims, 52 Drawing Sheets

(56) References Cited

U.S. PATENT DOCUMENTS

| | | | |
|---|---|---|---|
| 4,896,116 A | 1/1990 | Nagashima et al. | |
| 5,103,920 A | 4/1992 | Patton | |
| 5,321,613 A * | 6/1994 | Porter et al. | 702/1 |
| 5,337,002 A | 8/1994 | Mercer | |
| 5,341,886 A | 8/1994 | Patton | |
| 5,412,623 A | 5/1995 | Asada et al. | |
| 5,420,589 A | 5/1995 | Wells et al. | |
| 5,469,155 A | 11/1995 | Archambeault et al. | |
| 5,499,029 A | 3/1996 | Bashforth et al. | |
| 5,528,518 A * | 6/1996 | Bradshaw et al. | 702/150 |
| 5,544,052 A * | 8/1996 | Fujita et al. | 702/5 |
| 5,546,572 A * | 8/1996 | Seto et al. | |
| 5,553,407 A | 9/1996 | Stump | |
| 5,585,726 A | 12/1996 | Chau | |
| 5,614,670 A | 3/1997 | Nazarian et al. | |
| 5,630,603 A * | 5/1997 | Turner et al. | 280/407.1 |
| 5,631,970 A | 5/1997 | Hsu | |
| 5,633,589 A | 5/1997 | Mercer | |
| 5,644,237 A | 7/1997 | Eslambolchi et al. | |
| 5,659,985 A | 8/1997 | Stump | |
| 5,673,050 A | 9/1997 | Moussally et al. | |
| 5,682,136 A | 10/1997 | Del Signore | |
| 5,698,981 A | 12/1997 | Mercer | |
| 5,704,142 A | 1/1998 | Stump | |
| 5,711,381 A | 1/1998 | Archambeault et al. | |
| 5,720,354 A | 2/1998 | Stump et al. | |
| 5,746,278 A | 5/1998 | Bischel | |
| 5,757,320 A | 5/1998 | McEwan | |
| 5,764,062 A | 6/1998 | Mercer | |
| 5,767,678 A | 6/1998 | Mercer | |
| 5,769,503 A | 6/1998 | Stolarczyk et al. | |
| 5,774,091 A | 6/1998 | McEwan | |
| 5,786,537 A | 7/1998 | Anstey | |
| 5,805,110 A | 9/1998 | McEwan | |
| 5,819,859 A | 10/1998 | Stump et al. | |
| 5,825,660 A | 10/1998 | Cagan et al. | |
| 5,844,564 A * | 12/1998 | Bennis et al. | 345/423 |
| 5,867,117 A | 2/1999 | Gogineni et al. | |
| 5,904,210 A | 5/1999 | Stump et al. | |
| 5,933,014 A | 8/1999 | Hartrumpf et al. | |
| 6,014,343 A * | 1/2000 | Graf et al. | 367/38 |
| 6,035,951 A | 3/2000 | Mercer et al. | |
| 6,064,940 A * | 5/2000 | Rodgers et al. | 701/408 |
| 6,078,869 A * | 6/2000 | Gunasekera | 702/6 |
| 6,088,294 A | 7/2000 | Leggett, III et al. | |
| 6,106,561 a * | 8/2000 | Farmer | 703/10 |
| 6,119,067 A | 9/2000 | Kikuchi | |
| 6,119,804 A | 9/2000 | Owen | |
| 6,151,555 A * | 11/2000 | Van Bemmel et al. | 702/14 |
| 6,195,922 B1 | 3/2001 | Stump | |
| 6,225,941 B1 | 5/2001 | Gogineni et al. | |
| 6,252,538 B1 | 6/2001 | Chignell | |
| 6,302,221 B1 * | 10/2001 | Hamman et al. | 175/50 |
| 6,307,573 B1 * | 10/2001 | Barros | 715/764 |
| 6,308,787 B1 | 10/2001 | Alft | |
| 6,313,755 B1 | 11/2001 | Hetmaniak et al. | |
| 6,315,062 B1 | 11/2001 | Alft et al. | |
| 6,373,486 B1 * | 4/2002 | Simpson | 345/423 |
| 6,377,201 B1 | 4/2002 | Chu | |
| 6,377,210 B1 * | 4/2002 | Moore | 342/357.13 |
| 6,389,360 B1 * | 5/2002 | Alft et al. | 702/9 |
| 6,434,462 B1 * | 8/2002 | Bevly et al. | 701/50 |
| 6,435,286 B1 | 8/2002 | Stump et al. | |
| 6,437,726 B1 | 8/2002 | Price | |
| 6,462,696 B1 | 10/2002 | Gorman | |
| 6,470,976 B2 * | 10/2002 | Alft et al. | 175/61 |
| 6,477,795 B1 | 11/2002 | Stump | |
| 6,484,818 B2 | 11/2002 | Alft et al. | |
| 6,501,413 B2 | 12/2002 | Annan et al. | |
| 6,532,190 B2 | 3/2003 | Bachrach | |
| 6,667,709 B1 | 12/2003 | Hansen et al. | |
| 6,700,526 B2 | 3/2004 | Witten | |
| 6,701,647 B2 | 3/2004 | Stump | |
| 6,719,069 B2 | 4/2004 | Alft et al. | |
| 6,739,165 B1 * | 5/2004 | Strack | 702/13 |
| 6,751,553 B2 * | 6/2004 | Young et al. | 702/5 |
| 6,755,263 B2 | 6/2004 | Alft et al. | |
| 6,766,253 B2 * | 7/2004 | Burns et al. | 702/6 |
| 6,833,795 B1 | 12/2004 | Johnson et al. | |
| 6,865,465 B2 * | 3/2005 | McClure | 701/50 |
| 6,886,644 B2 | 5/2005 | Stump et al. | |
| 6,915,211 B2 * | 7/2005 | Kram et al. | 702/5 |
| 6,959,245 B2 * | 10/2005 | Rooney et al. | 702/5 |
| 6,975,942 B2 * | 12/2005 | Young et al. | 702/5 |
| 6,980,482 B2 | 12/2005 | Faichney et al. | |
| 6,999,021 B2 | 2/2006 | Taylor | |
| 7,013,991 B2 | 3/2006 | Wilson-Langman et al. | |
| 7,034,740 B2 | 4/2006 | Witten | |
| 7,054,731 B1 * | 5/2006 | Lange et al. | 701/50 |
| 7,085,196 B2 | 8/2006 | Nemeth | |
| 7,113,124 B2 * | 9/2006 | Waite | 342/22 |
| 7,123,016 B2 | 10/2006 | Larsen | |
| 7,143,844 B2 | 12/2006 | Alft et al. | |
| 7,182,151 B2 | 2/2007 | Stump et al. | |
| 7,184,611 B2 | 2/2007 | Miyagi et al. | |
| 7,211,980 B1 * | 5/2007 | Bruemmer et al. | 318/587 |
| 7,218,244 B2 | 5/2007 | Jin et al. | |
| 7,400,976 B2 | 7/2008 | Young et al. | |
| 7,424,133 B2 | 9/2008 | Schultz et al. | |
| 7,612,704 B2 | 11/2009 | Ryerson et al. | |
| 7,676,534 B2 * | 3/2010 | Murakami et al. | 708/442 |
| 8,089,390 B2 * | 1/2012 | Jones et al. | 342/22 |
| 2001/0035836 A1 * | 11/2001 | Miceli et al. | 342/22 |
| 2002/0130806 A1 | 9/2002 | Taylor et al. | |
| 2002/0184235 A1 * | 12/2002 | Young et al. | 707/104.1 |
| 2003/0012411 A1 * | 1/2003 | Sjostrom et al. | 382/109 |
| 2003/0074139 A1 * | 4/2003 | Poedjono | 702/16 |
| 2003/0083819 A1 * | 5/2003 | Rooney et al. | 702/5 |
| 2003/0135328 A1 * | 7/2003 | Burns et al. | 702/5 |
| 2003/0146985 A1 * | 8/2003 | Miyagi et al. | 348/231.3 |
| 2003/0149512 A1 * | 8/2003 | Hrovat et al. | 701/1 |
| 2004/0105090 A1 * | 6/2004 | Schultz et al. | 356/141.5 |
| 2004/0111202 A1 * | 6/2004 | Mailer | 701/50 |
| 2004/0168358 A1 | 9/2004 | Stump | |
| 2004/0225444 A1 * | 11/2004 | Young et al. | 702/14 |
| 2005/0192752 A1 * | 9/2005 | Rooney et al. | 702/5 |
| 2006/0038381 A1 * | 2/2006 | Gehring et al. | 280/477 |
| 2006/0152407 A1 | 7/2006 | Hatch et al. | |
| 2006/0271298 A1 * | 11/2006 | MacIntosh et al. | 702/5 |

OTHER PUBLICATIONS

Aaltonen J., Nissen J., "Geological mapping using GPR and differential GPS positioning: a case study", Proceedings of the Ninth International Conference on GPR, Apr. 29-May 2, 2002, Santa Barbara, California, Stockholm AB (Sweden), pp. 207-210.*

Dussauge-Peisser, C., M. Wathelet, D. Jongmans, D. Hantz, B. Couturier, and M. Sintes, Aug. 2003, "Investigation of a fractured limestone cliff (Chartreuse Massif, France) using seismic tomography and ground-penetrating radar": Near Surface Geophysics, 1, 161-170.*

H. Herman, Robotic Subsurface Mapping Using Ground Penetrating Radar, PhD thesis, Carnegie Mellon University, May 1997, 143 pages.*

Yocky, D. A.; Chadwick, M. D.; Goudy, S. P.; Johnson, D. K.; "Multisensor Data Fusion Algorithm Development", Technical Report, Sandia National Labs, Albuquerque, NM, Dec. 1, 1995, 66 pages, retrieved from: http://www.osti.gov/bridge/product.biblio.jsp?osti_id=172138.*

Definition of "Curvilinear Motion", retrieved by Examiner on Aug. 8, 2012 from: http://en.wikipedia.org/wiki/Curvilinear_motion.*

Loebis, D., R. Sutton, and J. Chudley. "Review of multisensor data fusion techniques and their application to autonomous underwater vehicle navigation." Proceedings of IMarEST—Part A—Journal of Marine Engineering and Technology 2002, No. 1 (2002): 3-14.*

McFee, John E., Victor C. Aitken, Robert Chesney, Yogadhish Das, and Kevin L. Russell. "Multisensor vehicle-mounted teleoperated mine detector with data fusion." In Aerospace/Defense Sensing and Controls, pp. 1082-1093. International Society for Optics and Photonics, 1998.*

(56) References Cited

OTHER PUBLICATIONS

Lin, Ching-Rong, R. Bowen Loftin, and H. Roice Nelson Jr. "Interaction with geoscience data in an immersive environment.", Proceedings IEEE Virtual Reality, 2000, IEEE, 2000.*
U.S. Appl. No. 11/728,726, filed Mar. 27, 2007, Krumhansl et al.
U.S. Appl. No. 11/804,217, filed May 16, 2007, Jones et al.
van der Veen et al., Design and application of a towed land-streamer system for cost-effective 2-D and pseudo-3-D shallow seismic data acquisition, Geophysics, vol. 66, No. 2, (Mar.-Apr. 2001), p. 482-500.
Aaltonen et al., Geological Mapping Using GPR and Differential GPS Positioning: A Case Study, Proceedings of the Ninth International Conference on GPR, Apr. 29-May 2, 2002, Santa Barbara, California, Stockholm AB (Sweden), pp. 207-210.
Baker et al., Source-Dependent Frequency Content of Ultrashallow Seismic Reflection Data, Bulletin of the Seismological Society of America, 90, 2, p. 494-499, Apr. 2000.
Bakhtar et al., Testing and UXO Detection Using US Air Force EarthRadar System, Mar. 1996.
Bemold et al., A Multi-Sensory Approach to 3-D Mapping of Underground Utilities, 19th Proceedings of International Symp. on Automation & Robotics in Construction, Sep. 23-25, 2002.
Dobecki et al., Geotechnical and Groundwater Geophysics, Geophysics, vol. 50, No. 12, Dec. 1985, pp. 2621-2636, abstract only.
Dussauge-Peisser et al., Investigation of a fractured limestone cliff (Chartreuse Massif, France) using seismic tomography and ground-penetrating radar: Near Surface Geophysics, 1, 161-170, Aug. 2003.
"Drill Path," Infrasoft, LLC., Computer Software for Solving Infrastructure Problems, 2916 West T.C. Jester, Houston, Texas 77018, 20 pages.
Frohlich et al., Exploring geo-scientific data in virtual environments, Proceedings of the Conference on Visualization 1999: Celebrating Ten Years, IEEE Visualization, IEEE Computer Society Press, Los Alamitos, CA, pp. 169-173, Oct. 1999.
Herman, Robotic Subsurface Mapping Using Ground Penetrating Radar, PhD thesis, Carnegie Mellon University, May 1997, 143 pages.
Hodgson, Computerized Well Planning for Directional Wells, SPE, No. 12071, Oct. 8, 1983, pp. 1-6, abstract only.
Liu et al., Identification of paleo-liquefaction and deformation features with GPR in the New Madrid seismic zone. The 8th Int'l Conference of Ground Penetrating Radar. Goldcoast, May 23-26, 2000. vol. 4084, pp. 383-389, abstract only.
Liu, Using GPR and seismic reflection measurements to characterize buried objects: large-scale simulation. IGARSS '97. 1997 In'tl Geoscience and Remote Sensing Symposium. pp. 1147-1149, vol. 3.
McFee et al., Multisensor vehicle-mounted teleoperated mine detector with data fusion, Proc. SPIE, vol. 3392, 1082, 1998, abstract only.
Parker, Buried Facility Locating with GPS Interface, GBIS '99, Edmonton, Dec. 1999.
Powers et al., Integrated Use of Continuous Seismic-Reflection Profiling and Ground-Penetrating Radar Methods at John's Pond, Cape Cod, Massachusetts, 12th Proceeding on Applications of Geophysics to Eng. & Environment, 1999, abstract only.
Santos, The Development and Field Application of a 3D Computer Graphics System for Displaying Wellbore Trajectories, SPE, No. 29197, Nov. 10, 1994, pp. 371-382.
Shoemaker et al., Refection Seismic and Ground Penetrating Radar Study of Previously Mined (Lead/Zinc) Ground, Joplin, Missouri, Missouri Department of Transportation special publication, 2000, 15 pages.
Schwamborn et al., Ground penetrating radar and shallow seismic-stratigraphic and permafrost investigations of Lake Nikolay, Delta Lena and Arctic Siberia. The 8th Int'l Conference of Ground Penetrating Radar. Goldcoast, May 23-26, 2000. vol. 4084, 2000, pp. 783-789, abstract only.

White, Building an Urban Image, Archeologia e Calcolatori (International Association of Computing in Archaeology, Rome Italy), vol. 7, 1996, 137-147, abstract only.
Yoder et al., Mapping agricultural fields with GPR and EMI to predict offsite movement of agrochemicals, Proc. SPIE, vol. 4084, 20, 2000, abstract only.
Office Action dated Sep. 22, 2005 from U.S. Appl. No. 10/195,856, 19 pages.
Office Action Response submitted Mar. 22, 2006 to office action dated Sep. 22, 2005 from U.S. Appl. No. 10/195,856, 14 pages.
Office Action dated Jun. 28, 2006 from U.S. Appl. No. 10/195,856, 22 pages.
Office Action Response submitted Aug. 28, 2006 to office action dated Jun. 28, 2006 from U.S. Appl. No. 10/195,856, 10 pages.
Office Action Response with RCE submitted Oct. 30, 2006 to office action dated Jun. 28, 2006 from U.S. Appl. No. 10/195,856, 10 pages.
Office Action dated Jan. 4, 2007 from U.S. Appl. No. 10/195,856, 23 pages.
Notice of Allowance dated Jun. 29, 2009 from U.S. Appl. No. 12/262,140, 8 pages.
Office Action dated Mar. 8, 2005 for U.S. Appl. No. 10/867,885, 10 pages.
Office Action Response submitted Jul. 8, 2005 to office action dated Mar. 8, 2005 for U.S. Appl. No. 10/867,885, 7 pages.
Notice of Allowance dated Jul. 25, 2005 for U.S. Appl. No. 10/867,885, 6 pages.
Office Action dated Mar. 27, 2007 for U.S. Appl. No. 11/296,844, 11 pages.
Office Action Response submitted Aug. 27, 2007 to office action dated Mar. 27, 2007 for U.S. Appl. No. 11/296,844, 12 pages.
Office Action dated Nov. 16, 2007 from U.S. Appl. No. 11/296,844, 10 pages.
Office Action Response submitted Jan. 16, 2008 to office action dated Nov. 16, 2007 for U.S. Appl. No. 11/296,844, 7 pages.
Notice of Allowance dated Mar. 10, 2008 for U.S. Appl. No. 11/296,844, 7 pages.
Office Action dated Aug. 1, 2003 for U.S. Appl. No. 09/881,656, 7 pages.
Notice of Allowance dated Jan. 27, 2004 for U.S. Appl. No. 09/881,656, 6 pages.
Office Action dated Mar. 25, 2009 from U.S. Appl. No. 12/218,501, 6 pages.
Office Action Response submitted Jul. 27, 2009 to office action dated Mar. 25, 2009 for U.S. Appl. No. 12/218,501, 10 pages.
Office Action dated Nov. 19, 2009 from U.S. Appl. No. 12/218,501, 11 pages.
Office Action Response submitted Jan. 21, 2010 to office action dated Nov. 19, 2009 for U.S. Appl. No. 12/218,501, 8 pages.
Office Action Response with RCE submitted Mar. 19, 2010 to office action dated Nov. 19, 2009 for U.S. Appl. No. 12/218,501, 8 pages.
Office Action dated Apr. 2, 2010 from U.S. Appl. No. 12/218,501, 12 pages.
Office Action Response submitted Jun. 30, 2010 to office action dated Apr. 2, 2010 for U.S. Appl. No. 12/218,501, 9 pages.
Notice of Allowance dated Jul. 28, 2010 for U.S. Appl. No. 12/218,501, 6 pages.
Request for Continued Examination (RCE) submitted Aug. 24, 2010 for U.S. Appl. No. 12/218,501, 11 pages.
Office Action dated Jun. 26, 2008 from related European Application No. 01987887.5, 5 pages.
Office Action Response dated Jan. 6, 2009 from related European Application No. 01987887.5, 17 pages.
International Preliminary Examination Report dated Apr. 7, 2003 from related PCT Application No. PCT/US01/40996, 10 pages.
File History for U.S. Appl. No. 11/804,217.
File History for EP Application No. 08845074.7 as retrieved from the European Patent Office Electronic File System on Mar. 24, 2011, 68 pages.
File History for U.S. Appl. No. 11/804,310.

\* cited by examiner

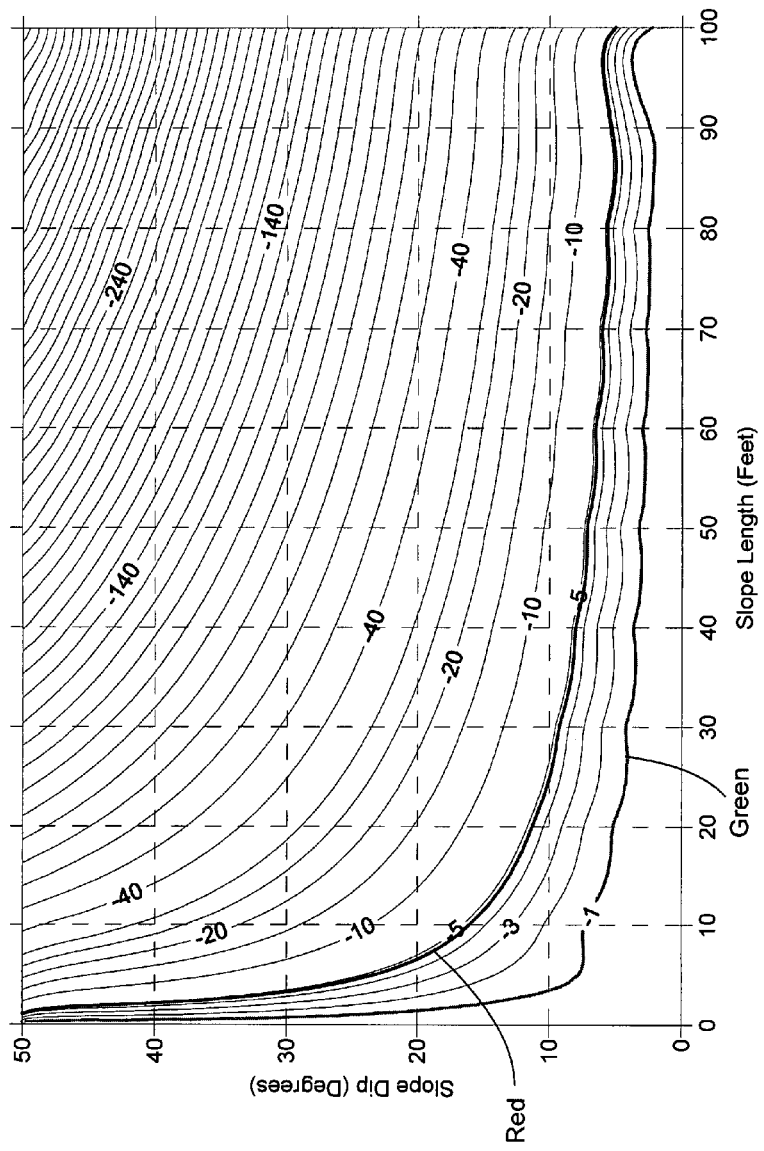

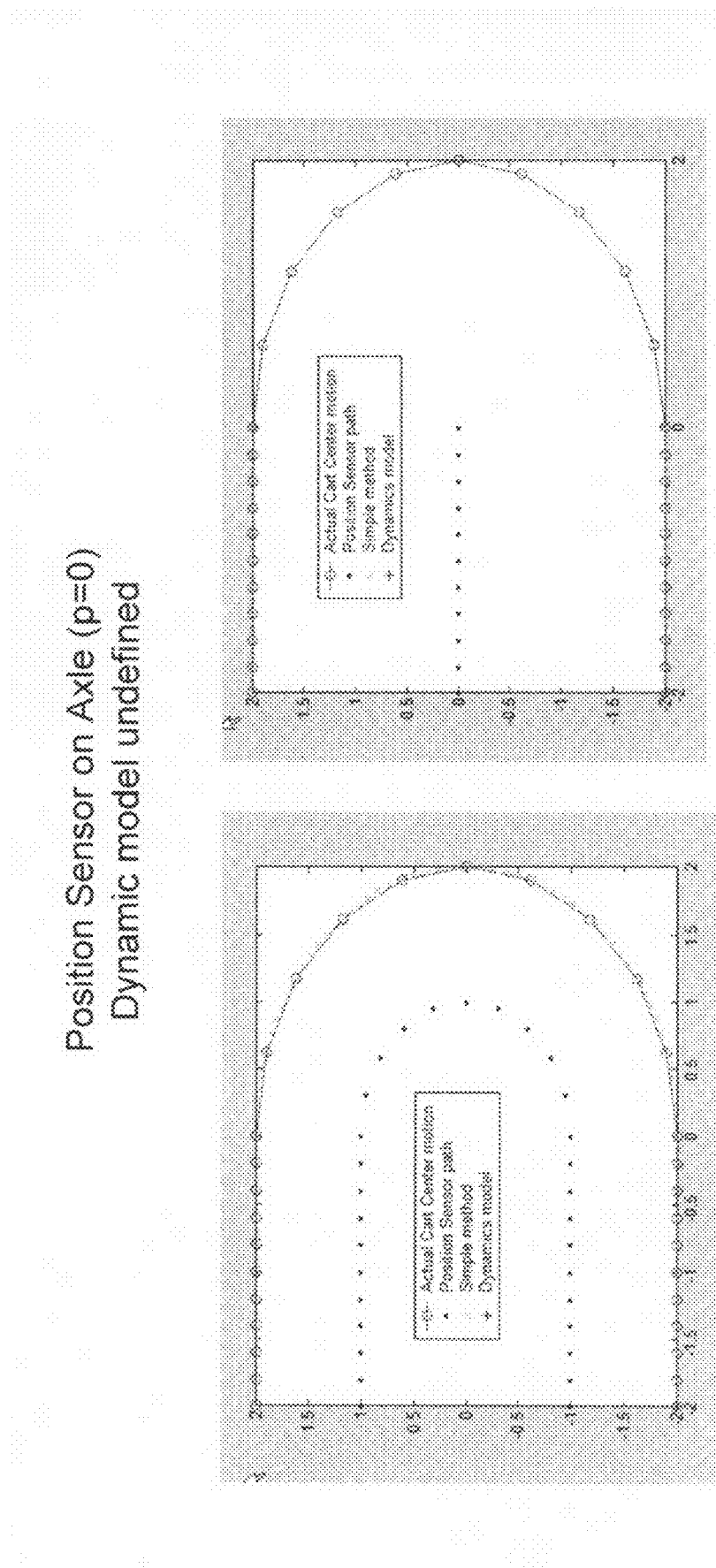

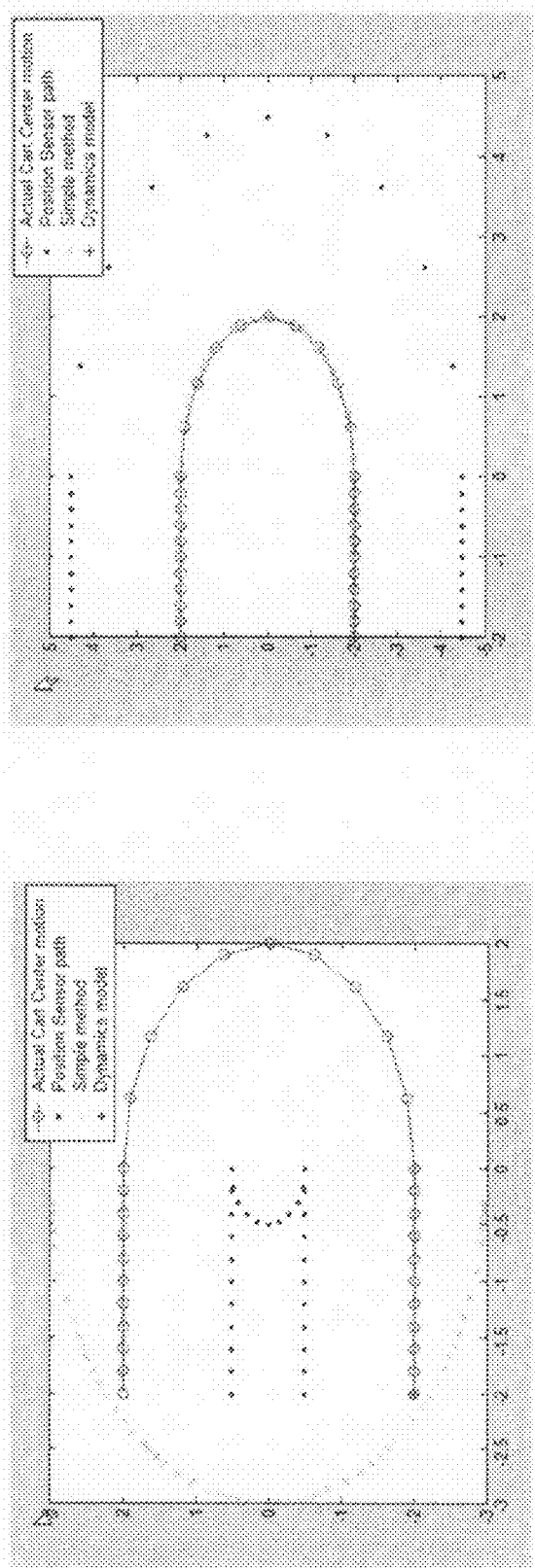

Position Sensor off Axle (p>0)
Dynamic model defined

Case 5: p=1, q=1, Position sensor on inside of curve ahead of cart center.
q < radius of curvature
Curved track not followed by simple model Case 6: p=1, q=2, Position sensor on inside of curve ahead of cart center.
q = radius of curvature
Curved track not followed by simple model.

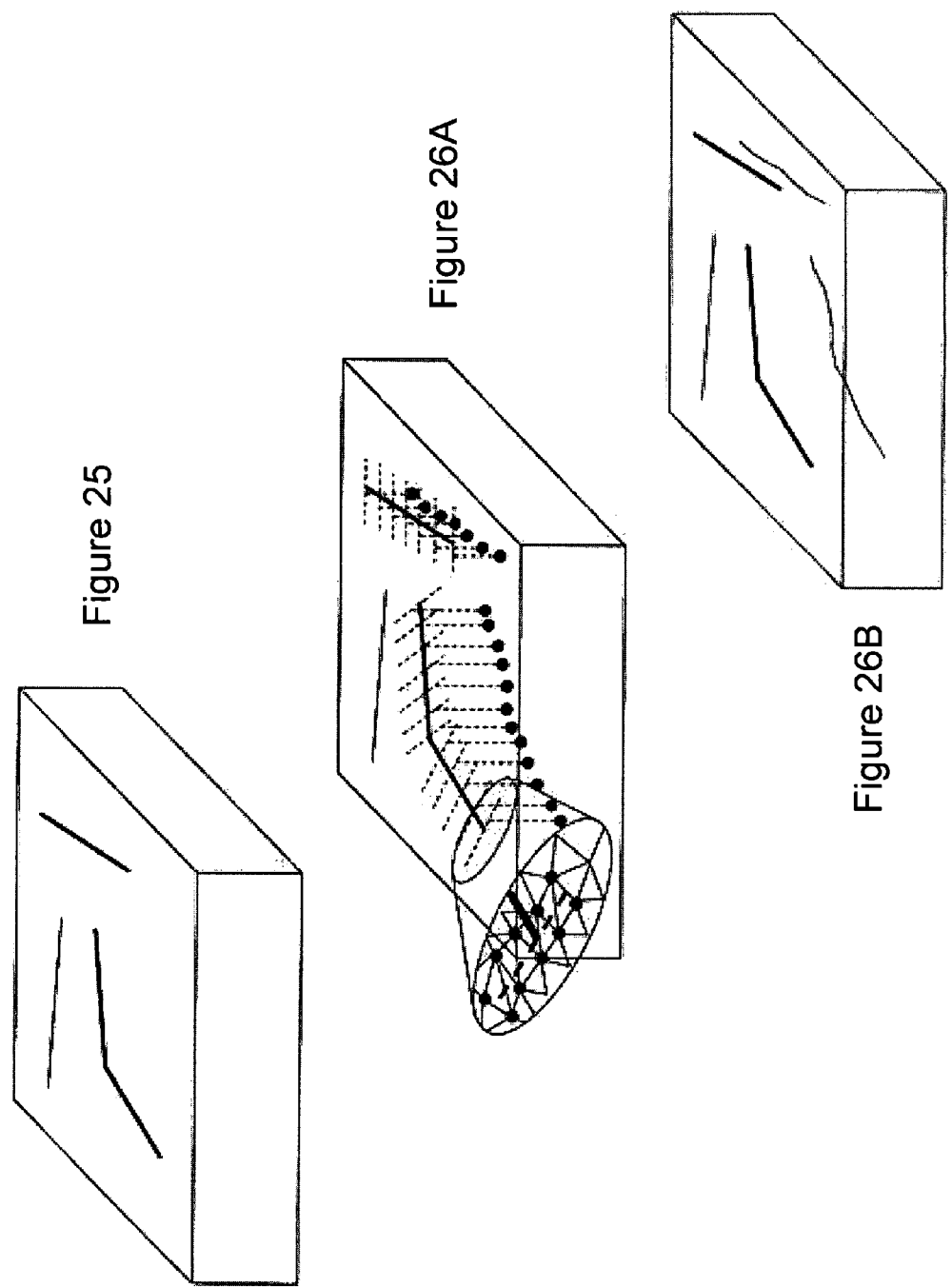

| SPADE | Feature Formed from joining picks | |
|---|---|---|
| 1808416 | 513456.4 | 0 |
| 1808496 | 513457.9 | 0 |

| SPADE | EM inversion of spd66 | |
|---|---|---|
| 1808416 | 513455.6 | -5.25837 |
| 1808432 | 513456.2 | -5.60767 |
| 1808448 | 513457 | -4.71131 |
| 1808464 | 513457.1 | -6.81979 |
| 1808480 | 513457.1 | -3.21467 |
| 1808496 | 513457.6 | -2.73319 |

| SPADE | Feature Formed from joining picks | |
|---|---|---|
| 1808416 | 513456.4 | 0 |
| 1808496 | 513457.9 | 0 |

| SPADE | EM inversion of spd66 | |
|---|---|---|
| 1808410 | 513470.1 | -5.12325 |
| 1808420 | 513479.3 | -4.63789 |
| 1808429 | 513489 | -4.34724 |
| 1808438 | 513498.4 | -4.27993 |
| 1808448 | 513507.5 | -3.76816 |
| 1808458 | 513516.9 | -3.79054 |
| 1808467 | 513526.5 | -3.4405 |
| 1808476 | 513536.3 | -3.43647 |
| 1808485 | 513546 | -2.84178 |
| 1808495 | 513555.6 | -2.74846 |
| 1808504 | 513565.3 | -2.85 |

Figure 27C

SYSTEM AND METHOD FOR VISUALIZING MULTIPLE-SENSOR SUBSURFACE IMAGING DATA

RELATED APPLICATION

This application claims the benefit of Provisional Patent Application Ser. No. 60/800,874 filed May 16, 2006, to which priority is claimed pursuant to 35 U.S.C. §119(e) and which is hereby incorporated herein by reference.

FIELD OF THE INVENTION

The present invention relates generally to the field of underground utility and object detection, and, more particularly, to systems and methods for visualizing data acquired by a multiplicity of disparate sensors configured to acquire subsurface imaging and geophysical data.

BACKGROUND OF THE INVENTION

Various techniques have been developed to detect and locate underground utilities and other manmade or natural subsurface structures. It is well understood that before trenching, boring, or otherwise engaging in invasive subsurface activity to install or access utilities, it is imperative to know the location of any existing utilities and/or obstructions in order to assist in trenching or boring operations and minimize safety risks. Currently, utilities that are installed or otherwise discovered during installation may have their corresponding physical locations manually recorded in order to facilitate future installations. However, such recordation is not particularly reliable, as only a certain percentage of the utilities are recorded, and those that are recorded may have suspect or imprecise location data. As such, currently-existing location data for buried utilities is often incomplete and suspect in terms of accuracy.

One known utility detection technique involves the use of ground penetrating radar (GPR). GPR, in general, is a very good sensor for utility detection purposes, in that GPR is easy to use and provides excellent resolution. However, GPR has problems detecting utilities in certain soil types and conditions that limit GPR's use in many areas of the United States and the world, such as much of southwest United States (e.g., Arizona). GPR data is typically difficult to interpret, and is typically analyzed by highly skilled users.

Use of GPR and other sensors has been proposed, particularly in regions where GPR's use is limited. Although use of other sensors in combination with GPR can yield meaningful subsurface information, such multi-sensor systems produce massive data sets. For example, scanning a 30 foot×50 mile right of way with multiple sensors can generate about one-quarter of a terabyte of raw data. Moreover, multi-sensor system data must be properly analyzed in the context of position data in order to fully and accurately evaluate a given region of the subsurface. Those skilled in the art readily appreciate the complexity and time commitment associated with properly integrating data from multiple sensors with position data when evaluating a given subsurface using a multi-sensor system.

SUMMARY OF THE INVENTION

The present invention is directed to systems and methods for visualizing data acquired by a multiplicity of sensors configured to acquire subsurface imaging and geophysical data. A number of inventive aspects described in the disclosure are contemplated. These aspects are merely a representative listing of useful features that provide advantages over the prior art. The description of these features and cooperation between features is not exhaustive nor limiting as to other features and combinations thereof that are contemplated. Those skilled in the art will understand that combinations of various disclosed features not specifically recited in this summary provide advantages over the prior art.

According to embodiments of the present invention, systems and methods may be implemented that involve use of a processor and user interface comprising a display. A plurality of sensor data sets are acquired or provided each representative of signals associated with one of a plurality of sensors configured for sensing of a subsurface. At least some of the sensors are configured for subsurface sensing in a manner differing from other sensors of the plurality of sensors. A graphical user interface is provided for displaying of a graphical representation of each of the sensor data sets within a volume depicted on the display. The graphical representations of the sensor data sets are individually viewable within the volume and displayed in a geometrically correct relationship within the volume.

In accordance with embodiments of the present invention, a user interface comprising a display provides for displaying of a plurality of sensor data sets representative of signals associated with a plurality of sensors configured for sensing of a subsurface. At least some of the sensors are configured for subsurface sensing in a manner differing from other sensors of the plurality of sensors. Each of the sensor data sets comprises sensor data samples each associated with geographic position data. Embodiments of the present invention may provide for displaying a graphical representation of each of the sensor data sets overlaid within a volume depicted on the display. The graphical representations of the sensor data sets are individually viewable within the volume and displayed in geographical alignment relative to one another within the volume in accordance with the geographic position data of the sensor data samples of each of the sensor data sets.

The geographic position data of the sensor data samples typically comprises x and y geographic locations for each of the sensor data samples. The geographic position data of the sensor data samples for at least one of the sensor data sets comprises a depth value for each of the sensor data samples. The graphical representations may be displayed within the volume relative to a fixed geographic reference. For example, the geographic position data may be associated with x and y locations of a global reference frame, a local reference frame, or a predefined reference frame.

Displaying the graphical representations may involve aligning sensor data samples of each of the sensor data sets by their respective x and y geographic locations. For example, displaying the graphical representations may involve receiving position sensor data comprising the geographic position data for a plurality of discrete geographic locations subject to subsurface sensing, and assigning the geographic position data to the sensor data samples of each of the sensor data sets.

A data fusion function may be performed on one or more features in the geographically aligned sensor data sets. A graphical indication of the one or more features may be produced based on the data fusion function performed on the geographically aligned sensor data sets. The one or more features on which the data fusion function is performed may be identified manually, semi-automatically, or algorithmically in a fully automated manner. For example, algorithmically identifying the one or more features in a fully automotive manner preferably involves comparing the one or more features to a library of feature templates, the feature templates comprising response characteristics for a plurality of known features.

Field note data representative of one or more known or manually observed features within the subsurface may be provided, and a graphical or textual representation of the field note data may be displayed within the volume. The field note data may comprise associated x and y geographic location data, and the graphical or textual representation of the field note data may be displayed within the volume at one or more locations corresponding to the associated x and y geographic location data.

Feature data representative of one or more features within the subsurface may be provided or identified. A graphical or textual representation of the feature data may be displayed within the volume. Point marker data (e.g., picks objects) may be provided that is representative of one or more points manually picked from images of data from any or all of the plurality of sensors used within the subsurface. A graphical or textual representation of the point marker data may be displayed within the volume.

The graphical representations may be displayed in an overlain fashion within the volume. The graphical representations may be displayed within the volume relative to a fixed geographic reference. For example, each of the sensor data sets comprises sensor data samples each associated with x and y geographic locations. Displaying the graphical representations may involve aligning sensor data samples of each of the sensor data sets by their respective x and y geographic locations. These geographic locations may alternatively be UTM coordinates, lat/long coordinates, local grid coordinates, etc.

The volume depicted on the display may be defined by a length, a width, and a depth. The length and width may be respectively representative of a length and a width of each of a plurality of scan regions of earth subjected to sensing by use of the plurality of sensor. One or more of the graphical representations may be selected for viewing or hiding within the volume depicted on the display. For example, one of the graphical representations may be selected, and the selected graphical representation may be altered in a manner that enhances visual perception of the selected graphical representation relative to non-selected graphical representations within the volume. Altering the selected graphical representation may involve adding or altering one or more of a color, grey scale, line style, shading, hatching, or marker of the selected graphical representation. User developed indicia data may be provided, such as one or more of annotations, axis labels, legends, and textual information. The indicia data may be added to the display comprising the graphical representations.

A volume location may be selected, and a two-dimensional view of the graphical representations at the selected volume location may be generated. The volume may, for example, have a longitudinal axis, and the two-dimensional view may be generated along a plane transverse to the longitudinal axis. One or more of the graphical representations may be selected to generate the two-dimensional view.

The plurality of sensor data sets may comprise one or more ground penetrating radar data sets, one or more electromagnetic sensor data sets, and/or one or more shallow application seismic sensor data sets. The plurality of sensor data sets may comprise one or more geophysical sensor data sets, such as data sets developed from use of a magnetic field sensor, a resistivity sensor, a gravity sensor or other geophysical sensor.

In accordance with various embodiments, systems of the present invention may include an input for receiving signals representative of a plurality of sensor data sets associated with a plurality of sensors configured for sensing of a subsurface, at least some of the sensors configured for subsurface sensing in a manner differing from other sensors of the plurality of sensors. Each of the sensor data sets preferably comprises sensor data samples each associated with geographic position data. Systems of the present invention also include a display and a processor coupled to the input and the display. The processor is configured to cooperate with the display to present a graphical representation of each of the sensor data sets overlaid within a volume depicted on the display. The graphical representations of the sensor data sets are individually viewable within the volume and displayed in geographical alignment relative to one another within the volume in accordance with the geographic position data of the sensor data samples of each of the sensor data sets.

The processor may be configured to align sensor data samples of each of the sensor data sets by their respective x and y geographic locations. The processor may be configured to receive position sensor data comprising the geographic position data for a plurality of discrete geographic locations subject to subsurface sensing, and to assign the geographic position data to the sensor data samples of each of the sensor data sets.

The processor may be configured to perform a data fusion function on one or more features in the geographically aligned sensor data sets, and to generate a graphical indication for presentation on the display of the one or more features based on the data fusion function performed on the geographically aligned sensor data sets. The processor may be configured to algorithmically identify the one or more features on which the data fusion function is performed.

The input may be configured to receive field note data representative of one or more known or manually observed features within the subsurface, and the processor may be configured to cooperate with the display to present a graphical or textual representation of the field note data within the volume. The field note data preferably comprises associated x and y geographic location data, and the graphical or textual representation of the field note data are displayed within the volume at one or more locations corresponding to the associated x and y geographic location data.

The input may be configured to receive one or both of feature data representative of one or more features within the subsurface and point marker data representative of one or more points manually picked from images of data developed using one or more of the subsurface sensors. The processor may be configured to cooperate with the display to present one or both of a graphical or textual representation of the feature data within the volume and a graphical or textual representation of the point marker data within the volume. The plurality of sensor data sets preferably comprises at least two of ground penetrating radar data sets, electromagnetic sensor data sets, and seismic sensor data sets.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF FIGURES

FIG. 8 is a plot of horizontal error due to slope projection onto a reference surface associated with conventional sensor positioning approaches;

FIGS. 12-17 show various scenarios of a sensor cart that facilitate an understanding of a cart dynamics algorithm according to embodiments of the present invention;

FIGS. 25 and 26A-26B show visualizations of EMI sensor data and an EM inversion process that provides for depth determinations in accordance with embodiments of the present invention;

FIGS. 27A-C show a visualization of EMI sensor data obtained from implementation of an automated EMI inversion function in accordance with embodiments of the present invention;

Figure 1A:
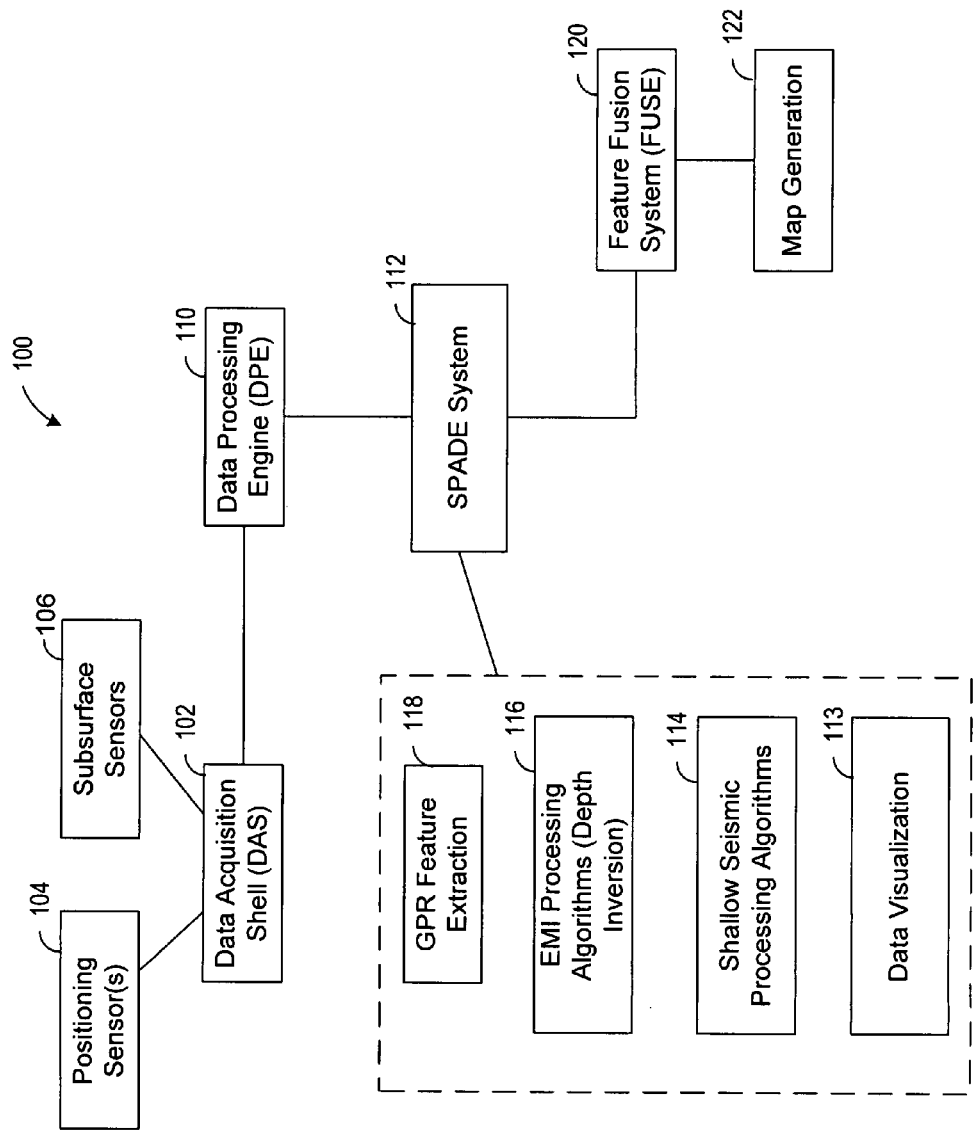
FIG. 1A shows a system for evaluating a subsurface in accordance with embodiments of the present invention.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

The present invention is directed to systems and methods for integrating and interpreting data acquired during subsurface imaging of a site. Aspects of the present invention are directed to enhanced data visualization tools that facilitate efficient and intuitive understanding of subsurface features, objects, utilities, and obstructions. Improved visualization quality is achieved by presenting data in a readily understandable format, and allows relationships between sensor data to be seen. All sensor data, field notes, CAD features, etc. are preferably presented in a single display.

Aspects of the present invention are directed to a graphical user interface (GUI) that provides an integrated display of two-dimensional and three-dimensional sensor data, field notes, CAD features, and other data, preferably in "true geometry." This true geometry refers to very accurate positioning and co-registration of all data sets, which is achieved in part through use of a unique mathematical model that allows sensor position to be accurately determined from GPS or other position sensor data.

Aspects of the present invention allow for enhanced image processing and feature extraction, including semi-automated and automated feature extraction. Automated feature extraction may be implemented for rules-based execution and provides for image processing primitives (IPPs) and feature extraction primitives (FEPs), for example. A structured architecture effectively "de-skills" the feature extraction process according to the present invention.

Referring now to FIG. 1A, there is shown a system for evaluating a subsurface in accordance with embodiments of the present invention. The system 100 includes a number of sub-systems that perform useful and unique functions. These sub-systems include a data acquisition shell (DAS) 102, a data processing engine (DPE) 110, a data visualization tool (SPADE system) 112, and a feature fusion system (FUSE) 120, which may include a map generation sub-system 122. The subject matter of the present application is directed primarily the SPADE system 112, which may be configured to incorporate features of one or more of the other sub-systems shown in FIG. 1A.

As is shown in FIG. 1A, DAS 102 receives data acquired from one or more positioning sensors 104 and two or more subsurface imaging or detection sensors 106. Typical positioning sensors 104 include mobile and fixed GPS sensors, and a positioning sensor. Typical sensors 106 include GPR (e.g., 14 channel GPR), multi-unit electromagnetic imaging (EMI) sensor, and a high frequency shallow application seismic sensor. It is understood that other geophysical or subsurface sensors may be employed to facilitate subsurface and soil geology/soil mechanics evaluation, including a multiple-unit magnetic field sensor, resistivity sensor, gravity sensor, for example. Data from such other sensors may also be ported to DAS 102, and that such data may also be tagged with positioning data.

DAS 102 operates as an umbrella or shell for the various sensors 104, 106. DAS 102 provides a number of functions, including navigation of a site. In a typical system deployment, DAS 102 may receive multiple GPS sensor data, multiple (e.g., three) EMI sensor data, GPR sensor positioning data, EMI sensor positioning data, and positioning sensor data. In this regard, DAS 102 collects separate, asynchronous data streams for the various subsurface imaging or detection sensors 106 and positioning sensor 104, such as one or more GPS sensors. DAS 102 may also be configured to implement a cart dynamics algorithm and provides very accurate positioning and co-registration of all data sets, thus allowing for alignment of such data for presentation in true geometry, although this function is preferably performed by DPE 110. During data collection, real time sensor location can be plotted on an uploaded geo-referenced map or photograph. DAS 102 also provides for EMI sensor calibration and survey control, a battery monitor, remote sensor evaluation, preliminary sensor data processing, and a full on-line help facility.

DPE 110 provides a processing engine for data reduction and production of files appropriate for other analysis software. DPE 110 is preferably configured to implement a cart dynamics model algorithm to compute sensor locations based on a single position sensor control. DPE 110 converts collected positions to any of a plurality of global reference frames, and assigns an accurate x, y, z position to every sensor data point. Multiple position sensors and formats are supported by DPE 110, including both straight and curvilinear data tracks. DPE 110 supports operation of ground penetrating radar in both single and multiple antenna formats, and reduces the time from data collection to the analysis stage from hours to minutes.

Figure 1B:
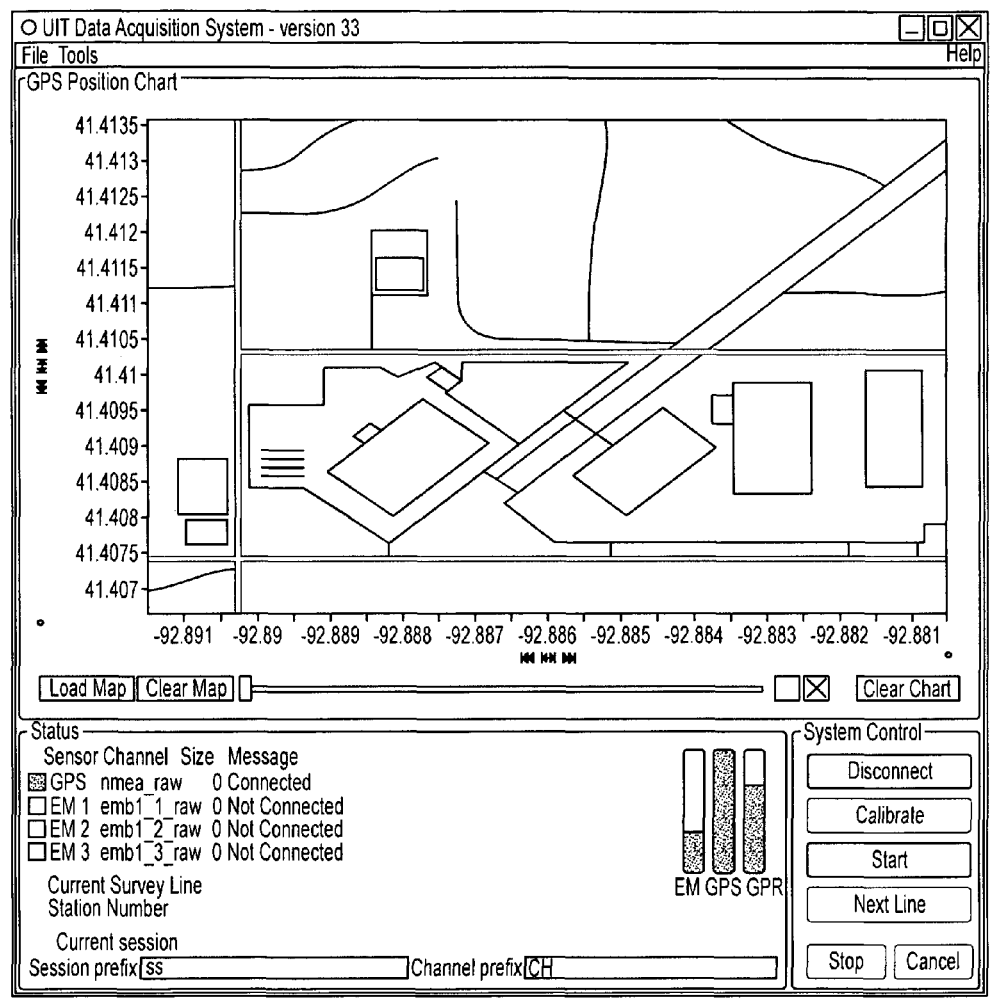
FIGS. 1B and 1C show screen images provided to a user via a graphical user interface (GUI) in accordance with embodiments of the present invention.
Figure 1C:
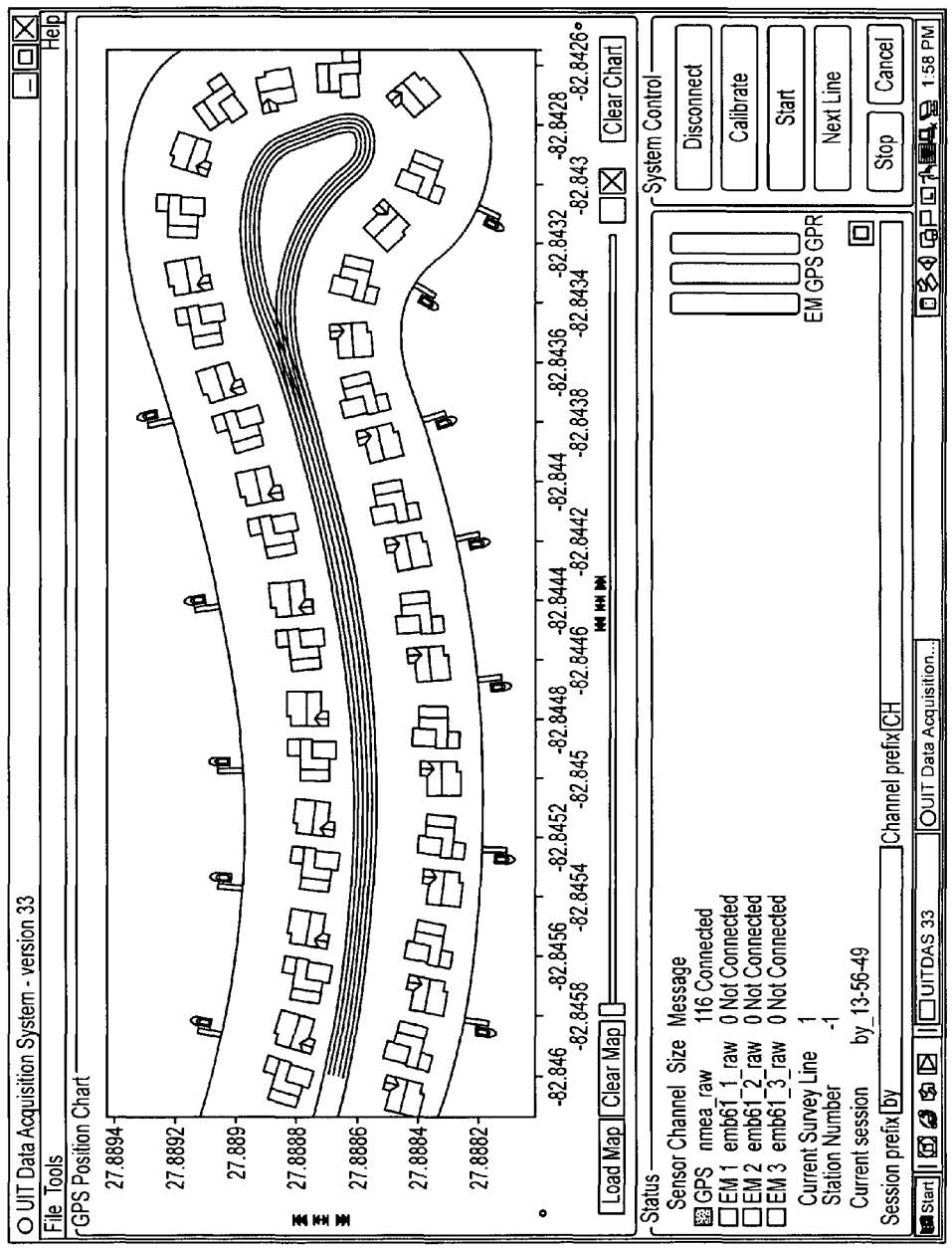

FIGS. 1B and 1C show screen images provided to a user via a graphical user interface (GUI) of DAS 102. FIGS. 1B and 1C show aerial views of different sites imported to DAS 102, with GPS position markers for the site indicated along the X and Y axes. Tracks of GPS acquired for the site shown in FIG. 1C are plotted along a curved residential street. A variety of maps may be imported into DAS 102, including aerial, satellite, topographical, cultural, utility, structural, or any other map type (or combination of same) providing information of importance to the survey. Battery status of the various sensors, including EMI, GPR, GPS, and high frequency seismic sensors, for example, may be provided in the GUI of DAS 102.

Figure 2:
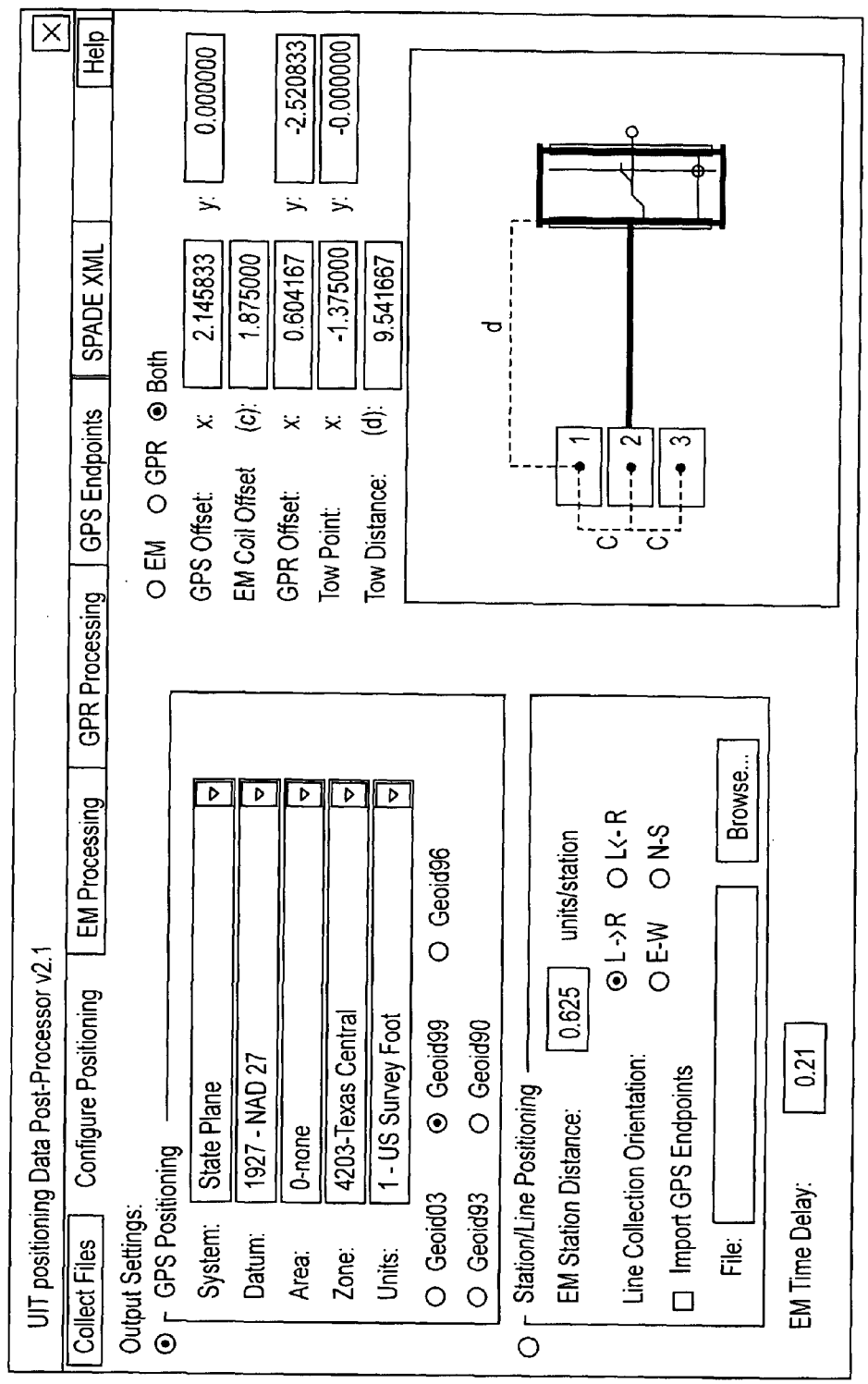
FIG. 2 shows a screen image provided to a user via a GUI of data processing engine in accordance with embodiments of the present invention.

FIG. 2 shows a screen image provided to a user via a GUI of data processing engine 110. DPE 110 performs a number of operations on the data received from DAS 102 and other data. DPE 110, for example, performs sorting of EMI sensor data received from DAS 102, and handles GPS to UTM or State Plane conversion. DPE 110 also sorts GPR sensor and positioning data received from the GPR sensor and GPS sensor associated with the GPR sensor. This sorting entails merging all sensor data sets into a single file with all data points correctly associated with a position. These positions may be in any of a plurality of global reference frames, depending upon the requirements of the individual survey.

As can be seen in FIG. 2, configuration parameters associated with a cart that is used to transport the various sensors at a site may be established by the user. The cart configuration screen shown in FIG. 2 allows the user to set up the geometry of the sensors of the sensor carts relative to the position of the antenna of the GPS sensor. The values of X and Y offsets of the GPR and EMI sensors relative to the antenna position may be input. Values for the tow point and tow distance may also be input. A unique cart dynamics algorithm, which is discussed in detail hereinbelow, uses the sensor geometry parameters shown in FIG. 2 to very accurately determine the position of each sensor relative to a single reference (e.g., a single GPS antenna). Using this approach, the cumulative errors that can occur when using a conventional "tangent" method are altogether avoided. It is noted that such errors can be 1 or several meters, particularly when the cart is navigating curves. Such errors may be acceptable is some applications, but may be wholly unacceptable in others.

Returning to FIG. 1A, DPE 110 creates files for direct import to the SPADE system 112. DPE 110 has the capability to handle multiple positioning scenarios, including full GPS, GPS end points, surveyed end points, straight lines, and curved lines. A full on-line help facility for DPE 110 is available to the user.

SPADE 112 provides a number of capabilities, including feature extraction 118, EMI sensor data processing 116 (e.g., inversion of EMI sensor data for depth computations), shallow application seismic sensor data processing 114, and a variety of data visualization capabilities 113. SPADE 112 also provides for the import/input of field notes, context notes, and cultural features (and any related positioning data) concerning the site. A feature fusion system 120 provides for feature fusion, confidence measure, and mapping functions. This data fusion function takes the features identified in SPADE 112 by the separate sensor platforms, and performs a data fusion function. Thus, the product of this step is a fused set of feature locations and identifiers, each with a higher confidence of detection probability than any sensor used alone. The point of this step is to provide a map with higher probability of detection and lower false alarm rates than is possible if any single sensor were used independently.

Figure 3:
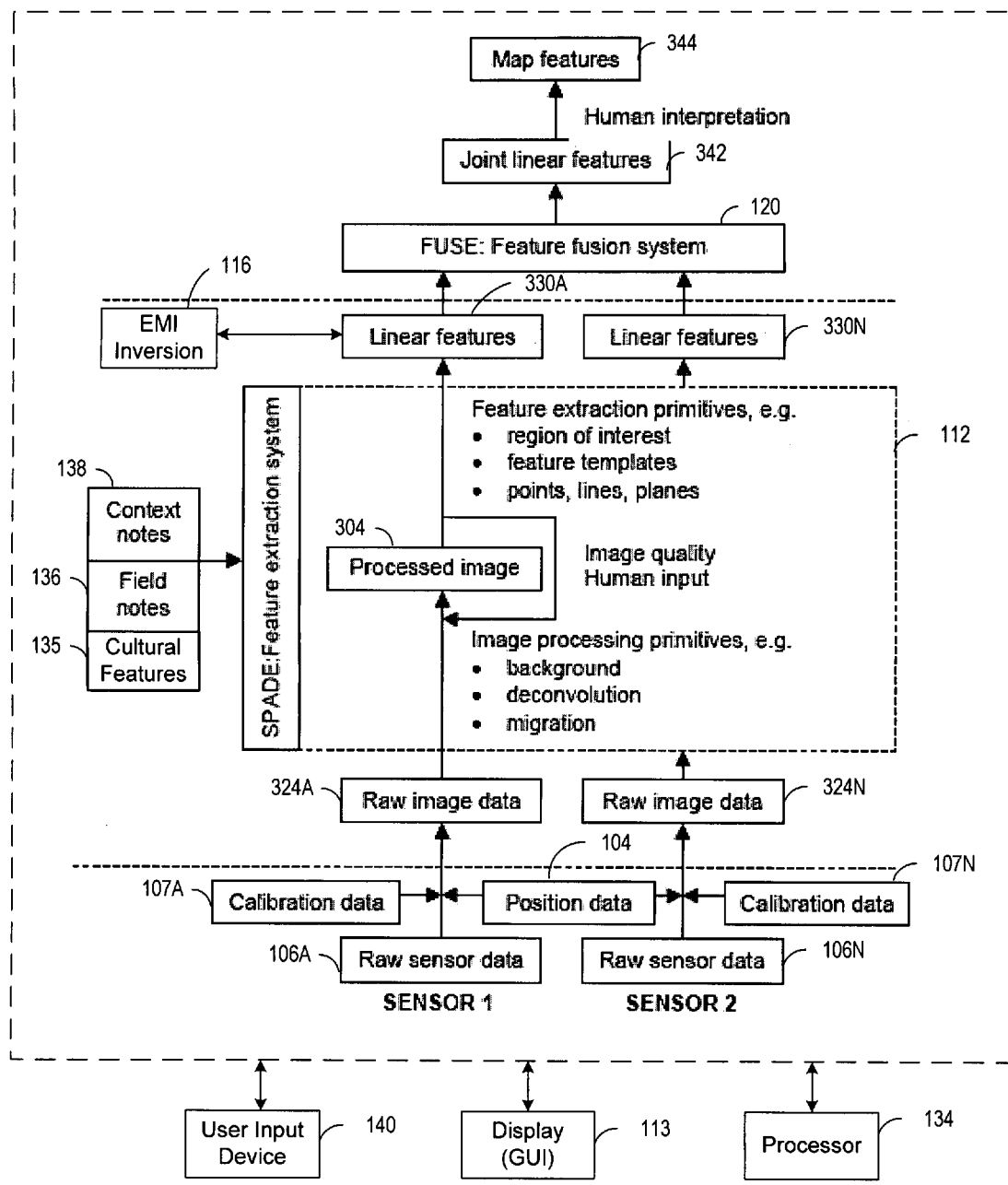
FIG. 3 shows details of a system for processing subsurface and position data that includes feature extraction in accordance with embodiments of the present invention.

FIG. 3 shows additional details of SPADE 112 in accordance with embodiments of the present invention. As is shown in FIG. 3, SPADE functionality may be implemented using a processor 134 coupled to a display that supports a GUI for SPADE 112. A user input device 140 (e.g., keyboard, mouse, trackball, touch stylus for a touch sensitive display 113, microphone for voice activated I/O) is also coupled to the processor 134 to facilitate user interaction with SPADE 112.

Raw sensor data is acquired by a number of sensors 106A-106N, such as those described above. The raw sensor data, any associated calibration data 107A-107N, and position data 104 for each of the sensor 106A-106N is processed to form raw image data 324A-324N for each of the raw sensor data sets. The processing of raw sensor data 106A-106N, calibration data 107A-107N, position data 104 and raw image data may be handled by DAS 102 and DPE 110 discussed above with reference to FIG. 1A. Also, the position data 104 associated with each sensor 106A-106N may be acquired using a positioning sensor dedicated to each sensor or a positioning sensor common to two or more sensors. For example, high accuracy GPS position data may be acquired for two or more sensors (e.g., GPR and EMI sensors) in accordance with a unique cart dynamics algorithm discussed below.

The raw image data 324A-324N is ported to SPADE 112. For GPR sensor data, the raw image data may include a file of GPR sensor data plus a mapping data text file giving the global (X,Y) coordinates for each scan and channel. For EMI sensor data, the raw image data may include a text file giving, for each coil at each station, the global (X,Y) coordinates of the coil and EMI sensor data for the various time gates. For seismic sensor data, the raw image data may include a file of seismic sensor data plus a text file giving the global (X,Y) coordinates for each scan and channel. This makes SPADE 112 independent of how the various sensor data was collected. SPADE 112 may also receive context notes 138, field notes 136, and cultural feature data 135 for a user input device 140 or via an interface to an external system (e.g., text files). SPADE 112 may also export various data, including features, as a text file, and images, such as in an internal Matlab format or other application program format.

According to one embodiment, a typical GPR data set may include a GPR data file and a mapping data file, which is a text file containing the global (X,Y) coordinates of each scan and channel in the GPR data file. One possible format for the mapping file is:

Line 1 contains #channels=C, #scans=N;

Line i+1 contains X(i,1), Y(i,1), X(i,2), Y(i,2), . . . X(i,C), Y(i,C), where X(i,j) is the X coordinate of the i-th scan and j-th channel, and Y(i,k) is the corresponding Y coordinate.

To import the GPR data set, the user is prompted to specify:

The name of the GPR data file and mapping data file;

The number of time samples per scan (e.g., default may be 512) and channels (e.g., default may be 14);

The vertical distance between consecutive time samples in a scan;

A name for the Matlab or other application variable that will store the 3D image.

If more that one file is selected for import, SPADE 112 merges the corresponding 3D images into a single image by resampling the GPR data onto a regular (X,Y) grid. The orientation of the grid with respect to the (X,Y) axes and the spacing of the grid is determined automatically. The resampling process may use a nearest neighbor algorithm, and where images overlap. Regions in the combined image not covered by an input image have data values set to zero.

For EMI sensor data, this data is provided as a text file. One possible format is:

The first line contains #coils=C, #time gates=G, #scans=N;

Each subsequent line contains X,Y,V(1), . . . V(G), where X,Y are global coordinates of a coil and V(1), . . . V(G) are the signals obtained by that coil at each time gate.

Apart from the first line, the data can appear in any order in the file. For example, there is no need for a particular ordering by coil or by scan. There is no requirement for the X,Y coordinates to follow any geometric pattern. If multiple EMI files are selected for import, the corresponding data sets are simply concatenated together to make a single data set.

Field notes may be stored in an XML format. Each field note may contain the following data:

Identifier: a short text string that uniquely identifies the field note;

Physical type: a text string, selected from a set of possible strings, that could be used by SPADE 112 to provide for automated feature extraction (e.g., manhole, wire drop, sewer drain, etc.);

Display type: a text string, selected from a set of possible strings, that determines how the field note is displayed in the SPADE GUI (e.g., water, electricity, gas);

Polyline: an N×3 array of numerical values, where each row gives the global X,Y,Z coordinates of a point in a polyline that describes the geometry of the filed note object;

Annotation: a text string that is displayed to the user in the SPADE GUI (e.g., for navigational purposes).

Features can be imported or exported either in DXF or XML format. In DXF format, each feature is represented by a polyline. In the XML format, each feature contains the following data:

Polyline: an N×3 array of numerical values, where each row gives the global X,Y,Z coordinates of a point in a polyline that describes the geometry of the feature;

Source: a text string, selected from a set of possible strings, to indicate the source of the feature (e.g., user, RADAN, Surfer, SPADE, or other source);

Explanation: a text string that can be used to assist the feature fusion process performed by FUSE 120.

When a DXF file is imported, the user is prompted to specify a Source and Explanation that will be applied to all the features in the file.

SPADE 112 operates on the raw image data 324A-324N to extract features of interest. Features as defined or utilized by SPADE 112 may include any object or area of interest as interpreted either within SPADE 112 or from any external software or data visualization program. Typical features include utilities, trenches, archeological or forensic objects, geologic boundaries or items of interest, items in road analysis such as delaminations, roadbed boundaries, rebar locations, etc. Features are any item that give rise to a geophysical signature that is of interest to the survey, client or interpreter.

Features may be identified via SPADE generated image processing primitives (IPPs) and feature extraction primitives (FEPs) for GPR and EMI sensor data, for example. Examples of FEPs may include a region of interest, feature templates, points, lines, and planes. IPPs of interest may be identified by use of background removal, deconvolution, and migration. Features may also be entered in an external file that is imported into SPADE 112, and then displayed or visualized within the SPADE GUI for further evaluation. A user may also participate actively in the production of a processed image 304 via SPADE 112.

For each sensor data set 324A-324N, SPADE 112 identifies features 330A-330N of interest. Inversion of EMI data may be performed 116 to obtain depth data for identified features. The linear feature output data produced by SPADE 112 may be ported to FUSE 120, which may perform a feature fusion operation on this data. Joint linear features 342 may be identified, which may involve user interpretation. Features identified by SPADE 112 may be mapped 344 by FUSE 120.

Figure 4:
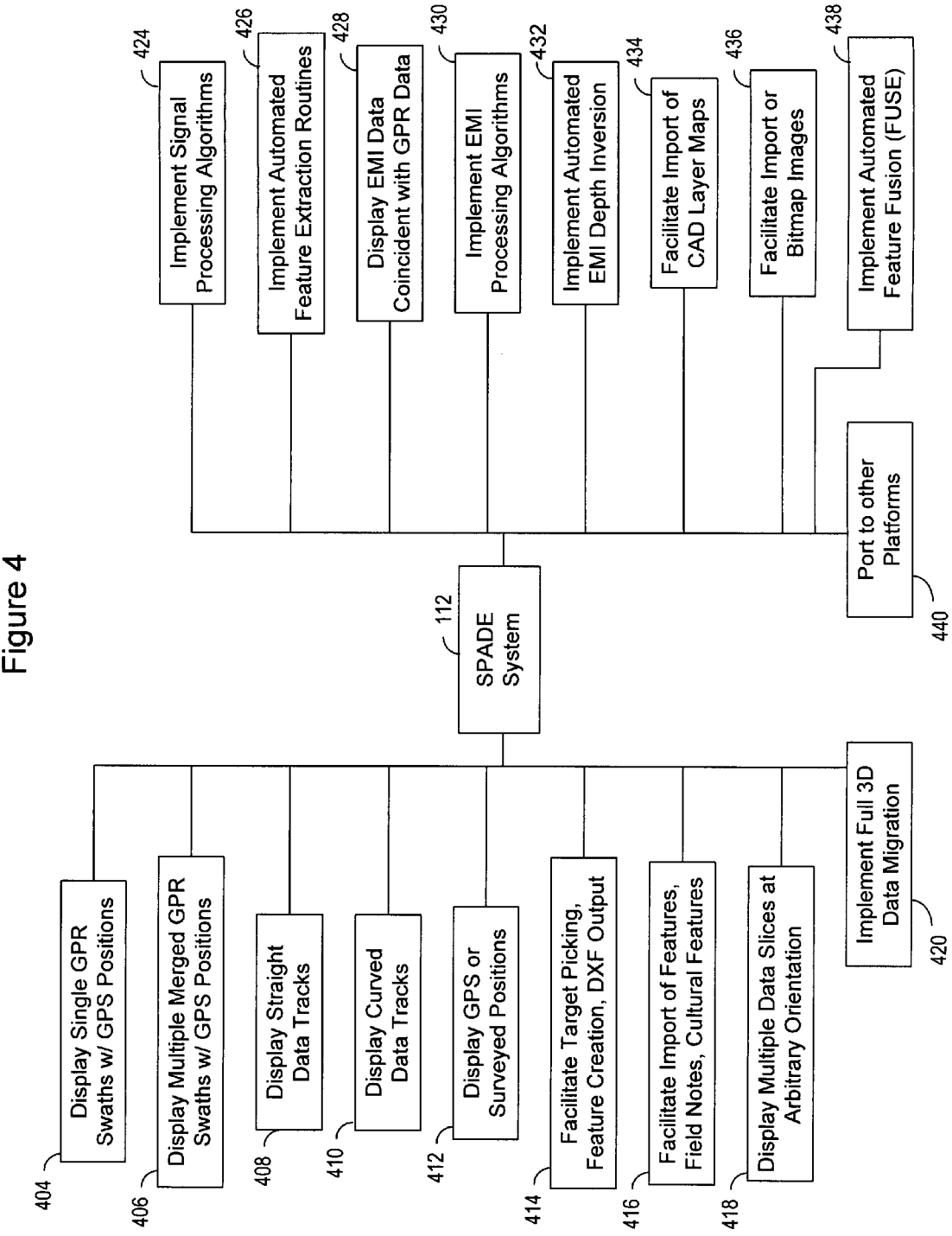
FIG. 4 shows features of a system for processing subsurface and position data in accordance with embodiments of the present invention.

FIG. 4 shows additional features of SPADE 112 and various data visualizations produced by the SPADE GUI. SPADE 112 can be configured to display single GPR swaths with GPS positions 404 or display multiple merged GPR swaths with GPS positions 406. SPADE 112 can be also configured to display straight data tracks 408, curved data tracks 410, and GPS or surveyed positions 412. SPADE 112 can be configured to facilitate target picking, feature creation, and provide DXF output 414, as previously discussed. Also, as previously discussed, SPADE 112 can be configured to facilitate import of features, field notes, context notes, and cultural features 416.

SPADE 112 can be configured to display multiple data slices at arbitrary orientations 418. SPADE 112 can be configured to implement full 3D data migration 420 for any of the processes of blocks 404-418. SPADE 112 can be configured to implement various signal processing algorithms 424 and automated feature extraction routines 426. SPADE 112 can be configured to display EMI data coincident with GPR data 428 (and further with seismic data). Various EMI processing algorithms may be implemented 430 by SPADE 112, including automated EMI depth inversion 432. SPADE 112 can be configured to facilitate import of CAD layer maps 434 and import of bitmap images 436. SPADE 112 may be implemented using Matlab (e.g., Matlab version 7), as in the embodiment described hereinbelow, or in other platforms, such at VTK, C++, Java or other platforms.

SPADE 112 can also be configured to implement automated feature fusion via FUSE 120 438. FUSE 120 may be configured to perform a data fusion function on one or more features in geographically aligned sensor data sets, where the sensor data sets are developed from disparate subsurface or other geophysical sensors. A graphical indication of the one or more features may be presented on the SPADE GUI based on the data fusion function performed on the geographically aligned sensor data sets. The features on which the data fusion function is performed may be identified manually, semi-manually or algorithmically. Any of the information of processes 424-438 can be ported to other platforms 440.

FUSE 120 may facilitate algorithmic feature identification for SPADE 112 on geographically aligned sensor data sets in a number of ways. According to one approach, a library or catalog of feature templates may be accessed by FUSE 120 (or SPADE 112). The feature templates may be developed for any number of known subsurface features, including structural features, material features, or geological features (e.g., obstructions, geological strata or transitions).

For example, a suite of feature templates may be developed by performing subsurface evaluation of pipes (plastic and metal), cables, containers, etc. of known type and dimension. Data derived from these evaluations may be reduced to image data and/or other data that characterizes the known object in a manner useful for performing automated feature identification by FUSE 120 or SPADE 112. These feature templates may be stored, updated, and made accessible to FUSE 120 when analyzing subsurface data via SPADE 112. Various types of algorithms and techniques may be performed for comparing feature templates to geographically aligned sensor data sets in SPADE 112, such as pattern recognition, K-nearest neighbor or clustering algorithms, feature correlation, neural networks, principal component analysis, and Bayesian analysis, holographic associative memory techniques, for example.

Features identified by SPADE 112 may be highlighted or otherwise indicated in the SPADE GUI for further evaluation by the user. Automated feature extraction or identification by SPADE 112 significantly reduces the time to identify features of interest in fused sensor data and, importantly, effectively "de-skills" the feature extraction process so that a wider population of users can perform this function (e.g., users of lower technical ability relative to experienced geophysicists who typically perform this analysis).

Figure 20A:
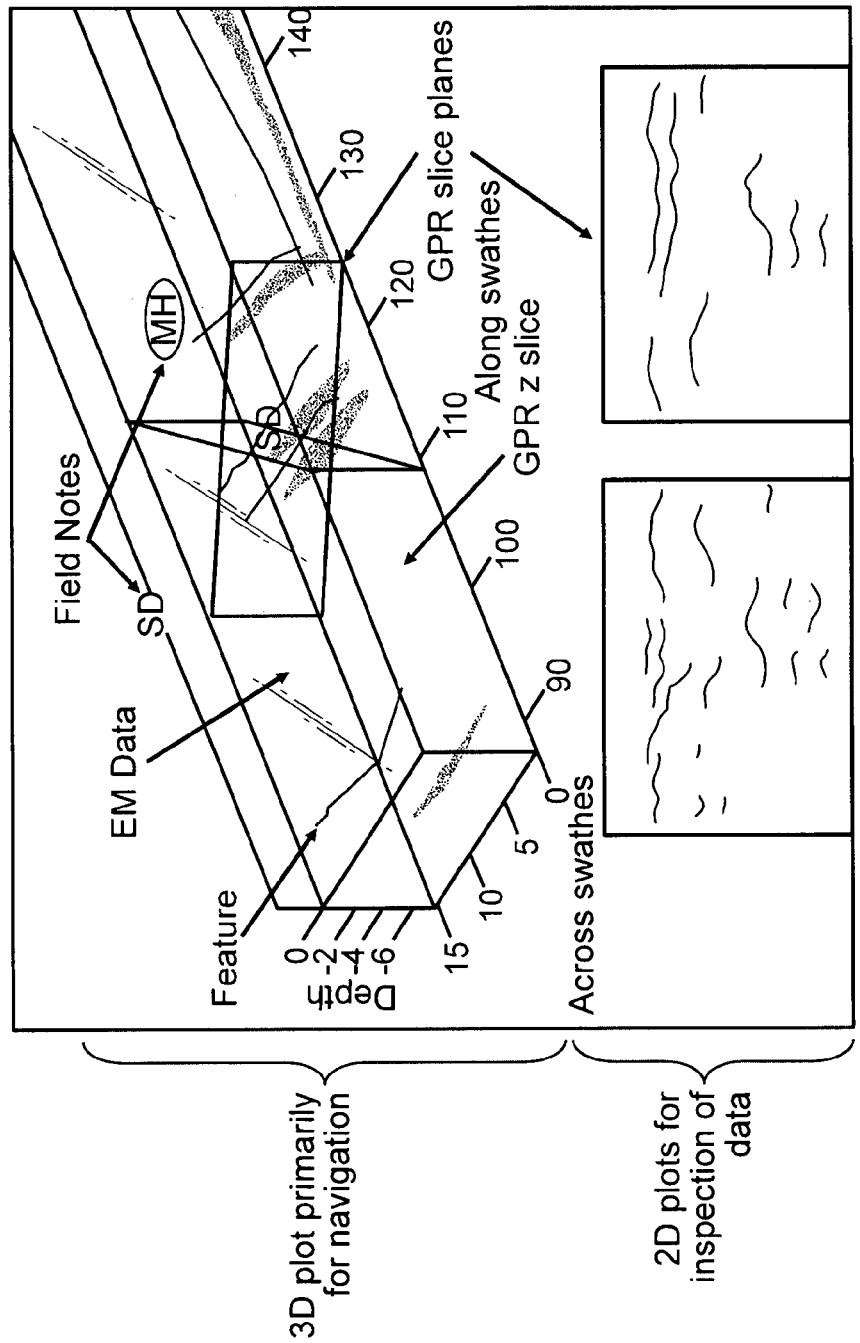
FIG. 20A-20C show images of a graphical user interface screen that provide an accurate and efficient visualization of overlaid sensor data, positioning, field and context notes, and feature data on a single screen for a selected subsurface volume in accordance with embodiments of the present invention.
Figure 20B:
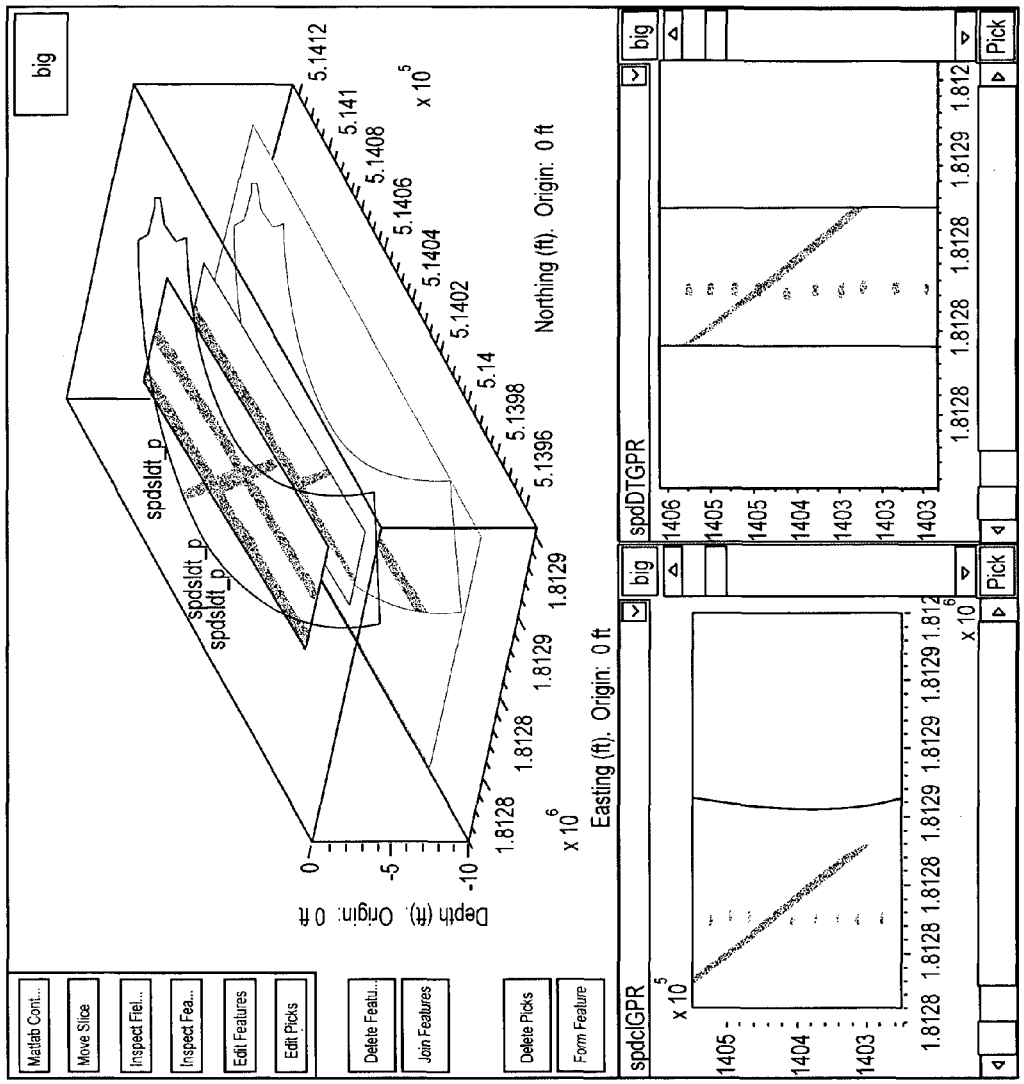
Figure 20C:
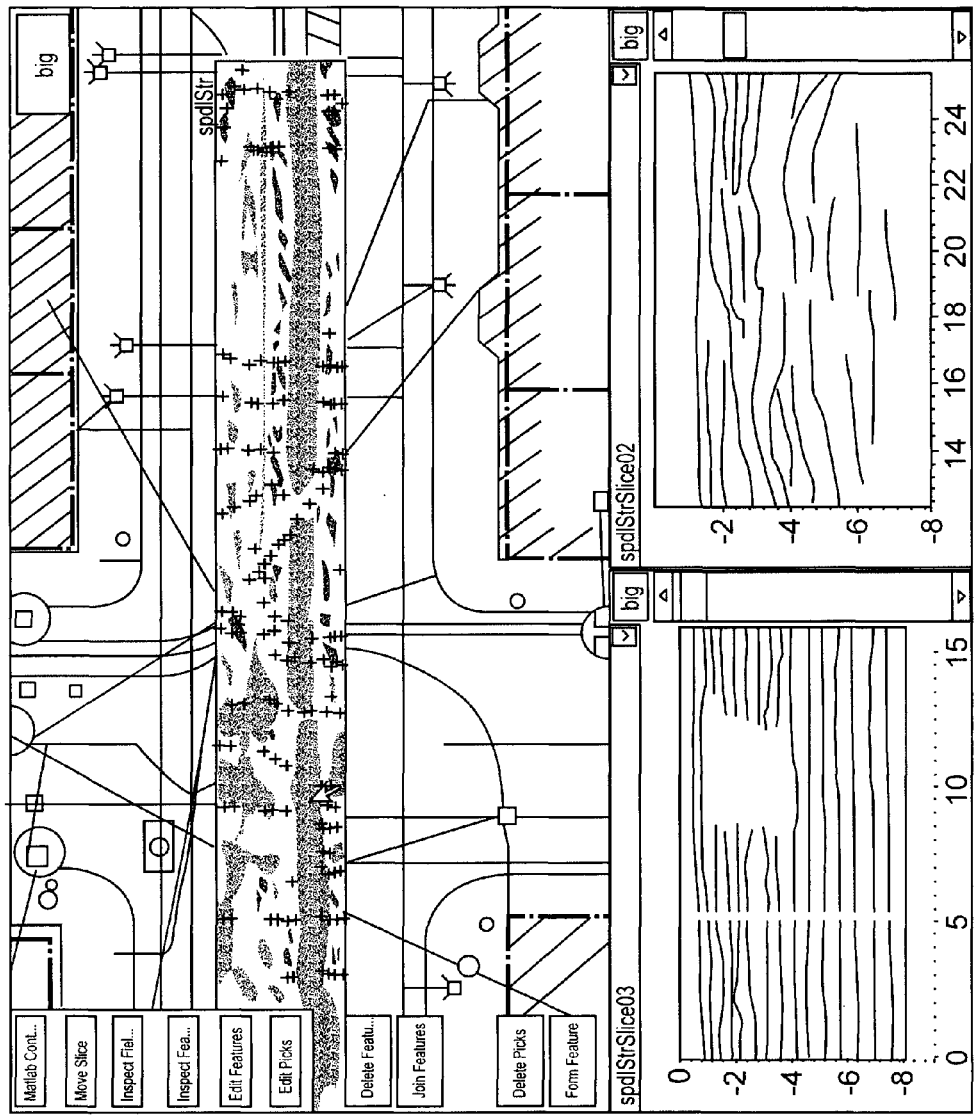

Turning now to FIGS. 20A-20C, there is shown different images of a GUI screen for SPADE 112 that may be made available to the user. The GUI screens shown in FIGS. 20A-20C provide an accurate and efficient visualization (2D and 3D) of overlaid sensor data, positioning, field and context notes, CAD or other imported maps, and feature data on a single screen for a selected subsurface volume heretofore unavailable using conventional systems and approaches. For example, FIG. 20B shows multiple-sensor data (GPR, EMI) simultaneously displayed in the SPADE GUI for a volume of subsurface in true geometry. FIG. 20C shows simultaneous use of GPR plan and section views, target picks, and existing CAD "as-built" map for a city survey project.

According to one embodiment, the SPADE GUI is implemented as a standard Matlab figure window. This automatically provides a wide range of functions, such as the ability to save and export the figure window, navigation of 2D and 3D plots (pan, zoom, rotate, etc.), control of properties of graphics objects (colors, markers, line styles, etc.), and add annotations, axis labels, legends, etc.

The main components of the SPADE GUI shown in FIGS. 20A-20C and other figures include a menu for selecting various operations (e.g., data import, export, etc.). The GUI also includes an object list, which contains a list of the objects that SPADE 112 can manipulate (images, field notes, features, etc.) and allows the display of those objects in the 3D plot to be configured. The GUI further includes the 3D plot, which is intended for overall navigation of the data. The GUI also includes two or three 2D plots, each of which can show one or any of the 2D image objects in the system, and which are intended for detailed inspection of the data. A set of button are also provided that enable various means for interacting with the 2D and 3D plots using the mouse or other input device. A command line textbox is also provided for executing Matlab commands. A detailed discussion of these and other menus, view, and operations involving the SPADE GUI are provided hereinbelow.

As previously discussed, SPADE 112 includes a graphical user interface that provides an integrated display of two-dimensional and three-dimensional sensor data, field notes, CAD features, and other data, preferably in "true geometry." Very accurate positioning and co-registration of all sensor data sets in SPADE 112 is achieved in part through use of a cart dynamics model (typically implemented by DPE 110) that allows sensor position to be accurately determined from high accuracy positioning data, such as that provided by a GPS sensor arrangement, and associated with data samples for each of a multiplicity of subsurface and/or geophysical sensors.

Surveys are typically performed on straight level roads and parking lots, often by use of a combination of dead reckoning, calibrated survey wheel distances, and global positioning satellite (GPS) sensors. Such conventional techniques generally yield accuracies on the order of up to a foot. Although inaccuracies on the order of 10 to 12 inches may be acceptable in some application, such large positioning errors can render subsurface surveys of underground utilities, for example, suspect or unusable.

Fundamental limitations that impact the accuracy by which an underground target can be located are associated with the antenna and scan spacing. For example, a given antenna array may have receivers that are spaced at 12 cm. In this case, the closest one can locate a target cross track is ±6 cm (2.4 inches). A similar limitation occurs in the direction of travel. For example, if the scan spacing is 2.54 cm (1.0 inch), then the location accuracy limit is ±1.27 cm (0.5 inch). Finally, due to the wavelength of the radar, there is an accuracy limit in the vertical direction, which may be about ±7.5 cm (3 inches), for example.

A number of different errors arising from different sources negatively impact the accuracy of conventional surveys. Many of these errors are either ignored or inadequately accounted for using conventional positioning techniques, thereby reducing the accuracy of the resulting survey.

Figure 5:
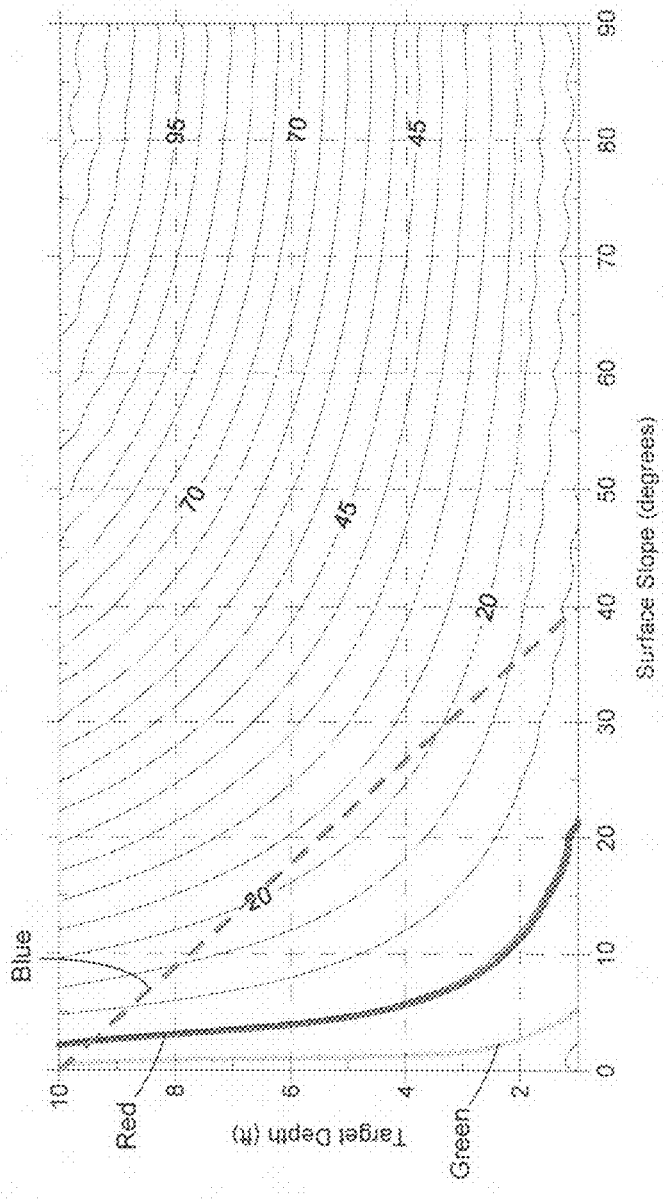
FIG. 5 is a graph showing horizontal position error versus surface slope and target depth associated with conventional sensor positioning approaches.

One category of errors are those that are due largely to surface slope. There are at least two different error sources relating to surface slope. The first is a depth dependent error. This error is caused by the tilt of the sensor cart relative to the ground. For example, a GPR (ground penetrating radar) sensor may be mounted on a cart that facilitates movement of the GPR sensor along a survey path. The radar return is due to a target located beneath the cart, on a line normal to the ground surface that is not vertical (shortest path from source to target). The radar data are plotted as if it were vertically below the antenna, giving rise to a horizontal error that depends on the target depth and ground slope. This error may occur whether the survey lines are along or perpendicular to contours. A graph of this error versus surface slope and target depth is shown in FIG. 5.

Figure 7:
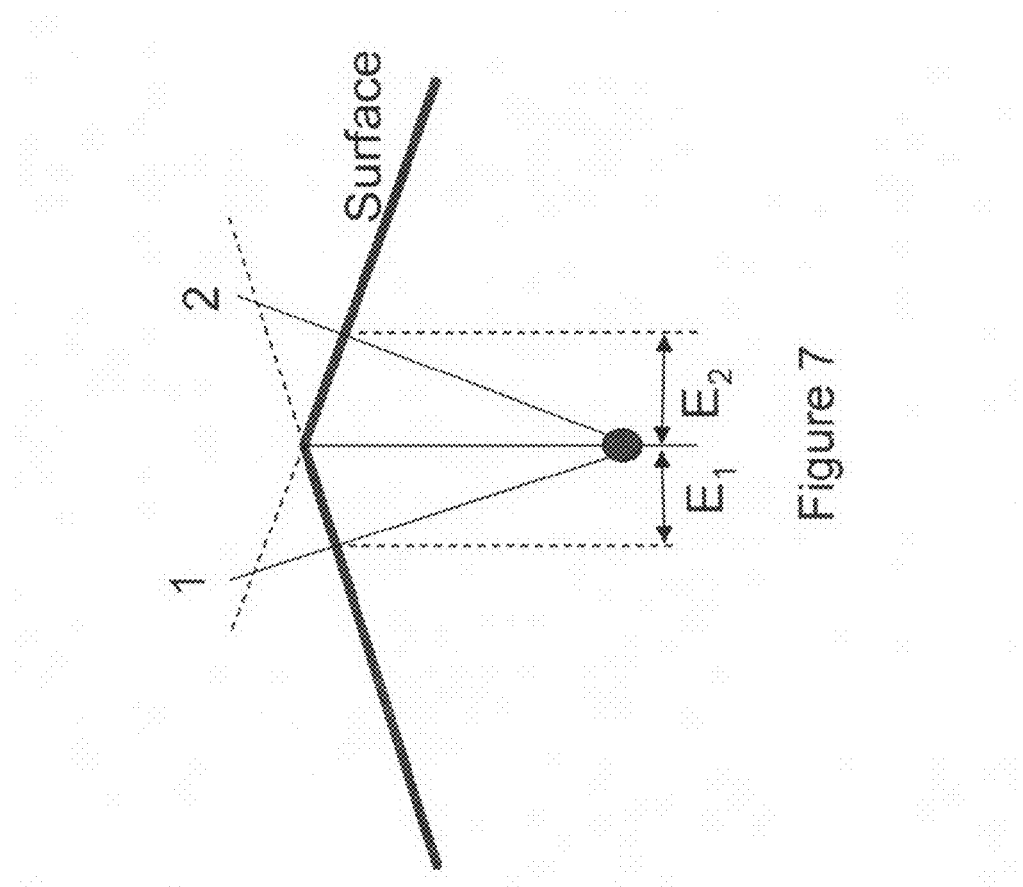
FIGS. 6 and 7 are depictions of a sensor cart situated on a slope and how depth dependent errors arise from such an orientation of the sensor cart in accordance with conventional sensor positioning approaches.
Figure 6:
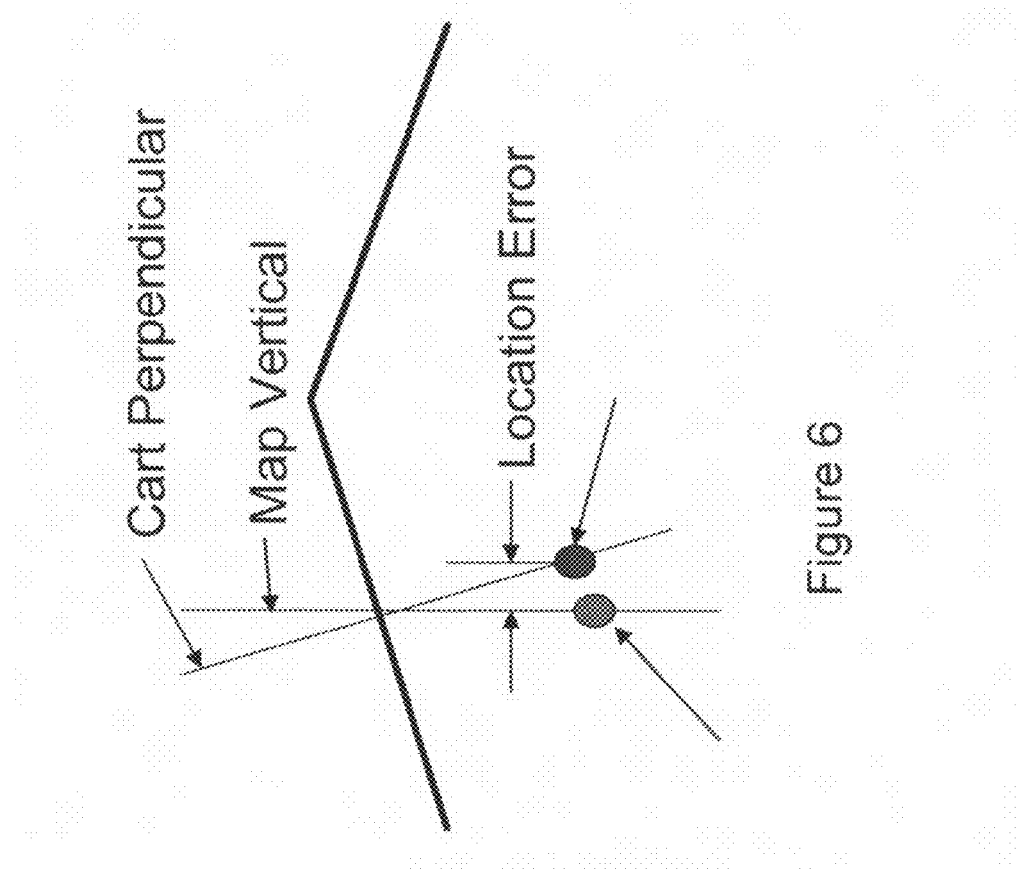

FIGS. 6 and 7 are depictions of a sensor cart situated on a slope and how depth dependent errors arise from this orientation of the sensor cart. If, for example, a target is 5 feet deep beneath a surface with a slope of 10 degrees, there is a horizontal location error of about 10 inches. For both accuracy of results and operational issues, slopes should generally be less than 40 degrees.

Another category of errors arises using conventional techniques that rely on use of a survey wheel on a sloped surface. Here, the error is due to the fact that the line length projected on a horizontal reference plane is shorter than the length on the ground. Without using a more accurate approach to survey control, such as that provided by GPS positioning, this results in an error that accumulates with the length of the slope and depends on the slope angle. A plot for this error is shown in FIG. 8. From the plot of FIG. 8, it can be seen that the horizontal error after traveling 20 feet on a 10 degree slope is about 4 inches. It is important to realize that this error does not exist when using a GPS survey control technique for sensor locating (e.g., radar scan locations) in accordance with embodiments of the present invention.

When traveling downhill, the two errors discussed above are additive. For example, the total error possible after traveling 20 feet downhill on a 10 degree slope and detecting a target at 5 foot depth is about 14 inches. However, the error traveling uphill is the difference of these two values and so would be 6 inches. In a significant percentage of survey, surface slopes ranging from 0 degrees to nearly 15 degrees are often encountered. So, the potential horizontal error could range to about 24 inches.

A third category of error is an error in line length due to cart and wheel encoder 'crabbing.' In this case, an error occurs if the cart is not tracking correctly behind the tow vehicle. For example, if the cart is being towed along a contour line of a slope, and the cart begins to slip downhill while it is being pulled forward by the tow vehicle (an ATV for example), the distance measured by the wheel encoder will be different than the actual line length, because the wheel is slipping or crabbing.

Figure 9:
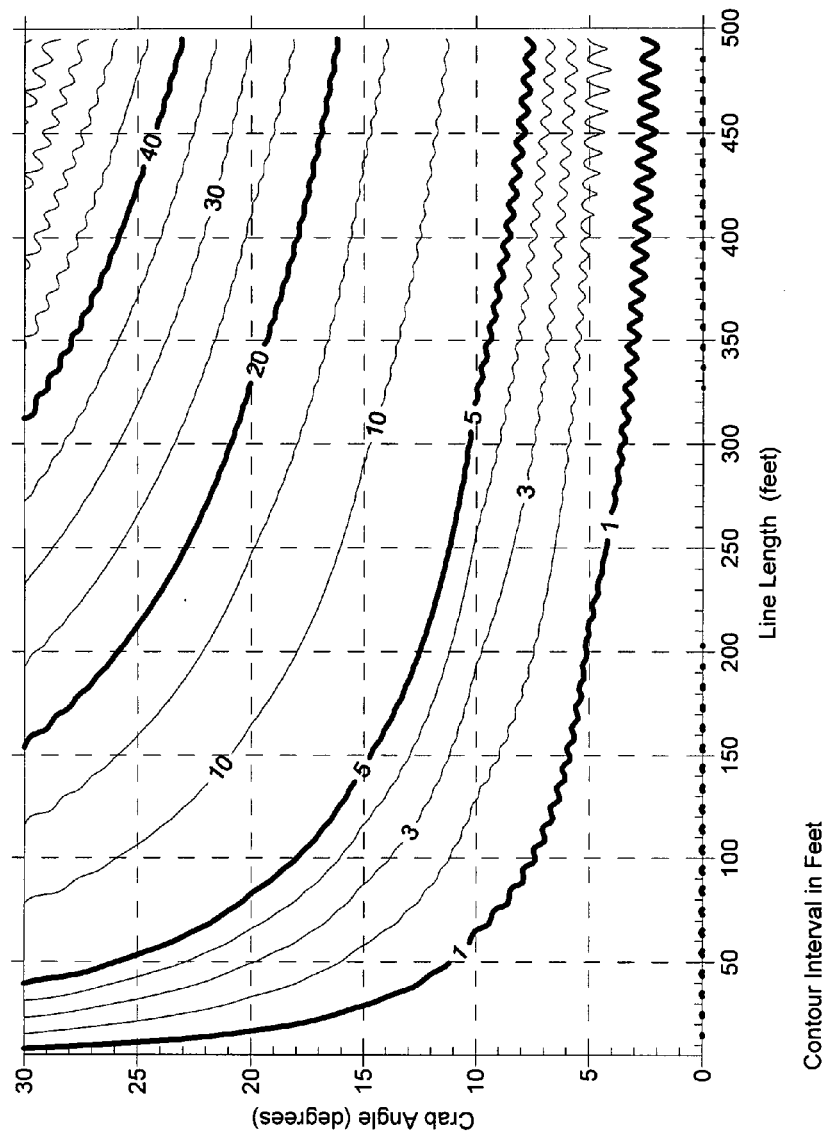
FIG. 9 is a plot showing the effect of wheel encoder crabbing on line length associated with conventional sensor positioning approaches.

Discrepancies have been found between the line length recorded by the wheel encoder and that computed from the GPS positions along the survey line. Experimentation has revealed differences between the wheel encoder and GPS of between 0.2 feet and 12 feet, with the wheel encoder distance always being shorter. The plot provided in FIG. 9 shows the computed differences in line length due to crabbing as a function of crab angle (or the angle between the direction of travel and the plane of the encoder wheel). This crabbing error dynamic turns out to be a potentially major source of error. Where the other errors are measured in inches, this error can easily be on the order of feet. However, if an accurate GPS position is obtained and used, the only error resulting from this source is a different radar firing interval from the design interval.

A surveying approach in accordance with embodiments of the present invention provides for sensor data that is associated with geometrically correct position data for one or more sensors configured for subsurface sensing. Embodiments of the present invention advantageously avoid or render negligible the aforementioned errors that negatively impact the accuracy of subsurface surveys produced using conventional techniques.

Figure 10:
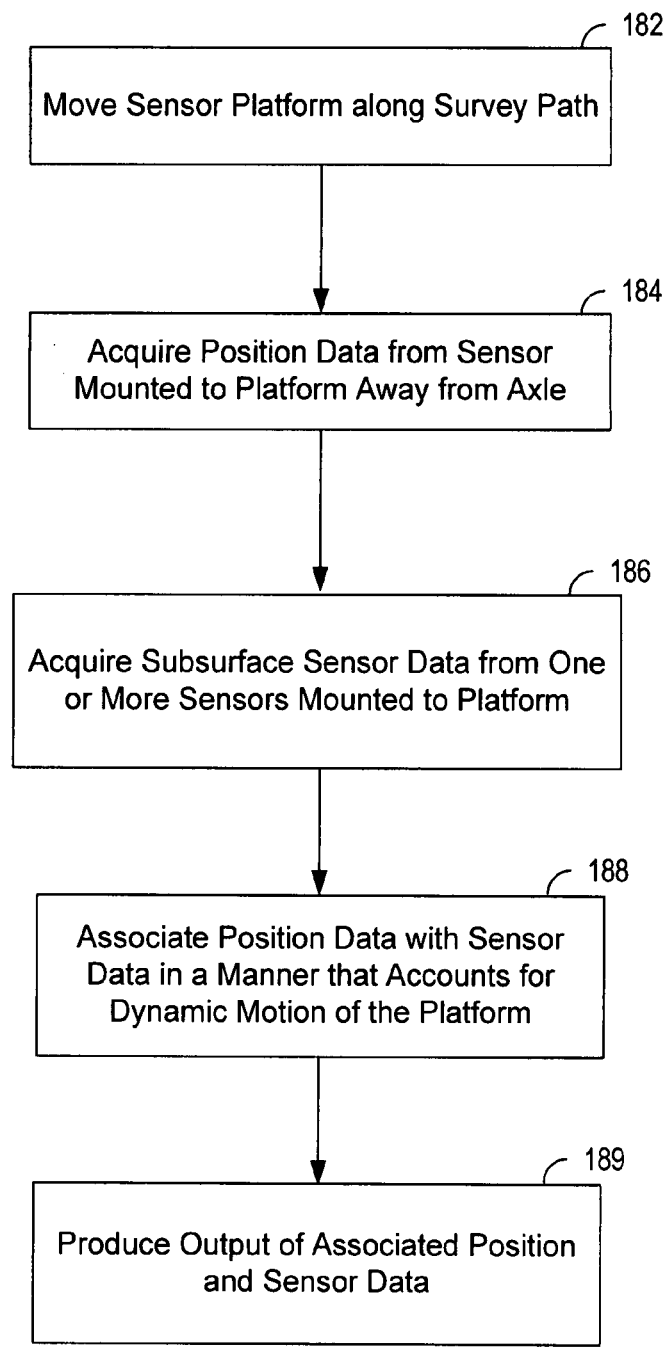
FIG. 10 shows processes for performing a survey of a subsurface in accordance with embodiments of the present invention.

FIG. 10 shows processes for performing a survey of a subsurface in accordance with embodiments of the present invention. According to the embodiment of FIG. 10, a cart equipped with one or more sensors is moved 182 along a survey path. Position data is acquired 184 using a sensor that is mounted to the cart. The position sensor that is mounted to the cart is preferably a GPS sensor. The mounting location of the position sensor in or on the cart is important so that errors associated with conventional positioning techniques are avoided and highly accurate positioning data can be acquired in accordance with techniques of the present invention.

In particular, position data is acquired using a position sensor mounted to the cart away from the axle (e.g., at a cart location in front of or behind the wheel axle). In general, it is convenient to mount the position sensor on or in the sensor cart. However, it is understood that the position sensor may be mounted elsewhere on the movable structure that includes the sensor cart. The position sensor may be affixed on the cart at a location laterally offset relative to a centerline of the sensor arrangement or a centerline of the cart. For example, the positing sensor may also be affixed at an elevation differing from that of the subsurface sensor(s).

A cart dynamics model of the present invention advantageously accounts for dynamic motion of the sensor platform that has heretofore been ignored (i.e., assumed not to be present or errors introduced by same tolerated) by known positioning and surveying systems and methods. A cart dynamics modeling approach of the present invention, for example, accounts for velocity and orientation of the sensor platform. Positioning data that is assigned to discrete sensor data samples is geometrically correct, as dynamic motion errors that adversely affect conventional positioning and surveying systems and methods are accounted for by a cart dynamics modeling technique of the present invention.

A cart dynamics model of the present invention accounts for positional offset between the positioning sensor and each of the subsurface sensing devices (e.g., a single device or individual sensing elements of an arrayed sensing device). The cart dynamics model may account for X and Y coordinate offsets (and Z coordinate if desired), as well as offsets associated with a tow point and tow distance for sensor carts that are hitched to a tow vehicle. For example, a sensing system according to embodiments of the present invention may include two sensor carts. A first sensor cart may support a GPR sensor arrangement and a position sensor, and a second sensor cart may support an EMI sensor arrangement. The second cart is generally mechanically coupled to the movable cart, at a tow point and a tow distance relative to a hitch location at the first sensor cart. A processor configured to implement a cart dynamics model of the present invention associates the sensor data provided by the GPR sensor arrangement and the EMI sensor arrangement with geometrically correct position data, preferably relative to a reference frame.

Subsurface sensor data is acquired 186 from one or more sensors mounted to the cart. Useful sensors that may be used individually or, preferably, in combination include a ground penetrating radar sensor arrangement, an electromagnetic induction sensor arrangement, and a shallow application seismic sensor arrangement. Other sensors that can be deployed include one or more of a video or still camera, magnetic fields sensor arrangement (e.g., magnetometers), among others. Position data may be acquired for each of the various sensors in a manner consistent with the present invention.

The position data is associated 188 with the subsurface sensor data acquired over the course of the survey path in a manner that accounts for dynamic motion of the platform. In this manner, the subsurface sensor data acquired over the course of the survey path is associated with geometrically correct position data, typically relative to a reference frame that may be local or global. An output of the associated position and sensor data is produced 189.

Other forms of information, such as manual survey data, field notes, and CAD features, may be acquired or otherwise associated with the subsurface sensor data. Each of these other information sources may include data that has associated positioning data obtained from a reliable source or highly accurate device (e.g., GPS sensor). Collection of subsurface survey data using a multiplicity of disparate sensors and positioning data for the sensors in this manner provides for geometrically true positioning and co-registration of sensor data and other forms of information or data, such as those discussed above. Highly accurate positioning and co-registration of all data sets is achieved through use of a unique mathematical model that allows sensor position to be accurately determined as the sensor arrangement traverses a survey path.

Figure 11:
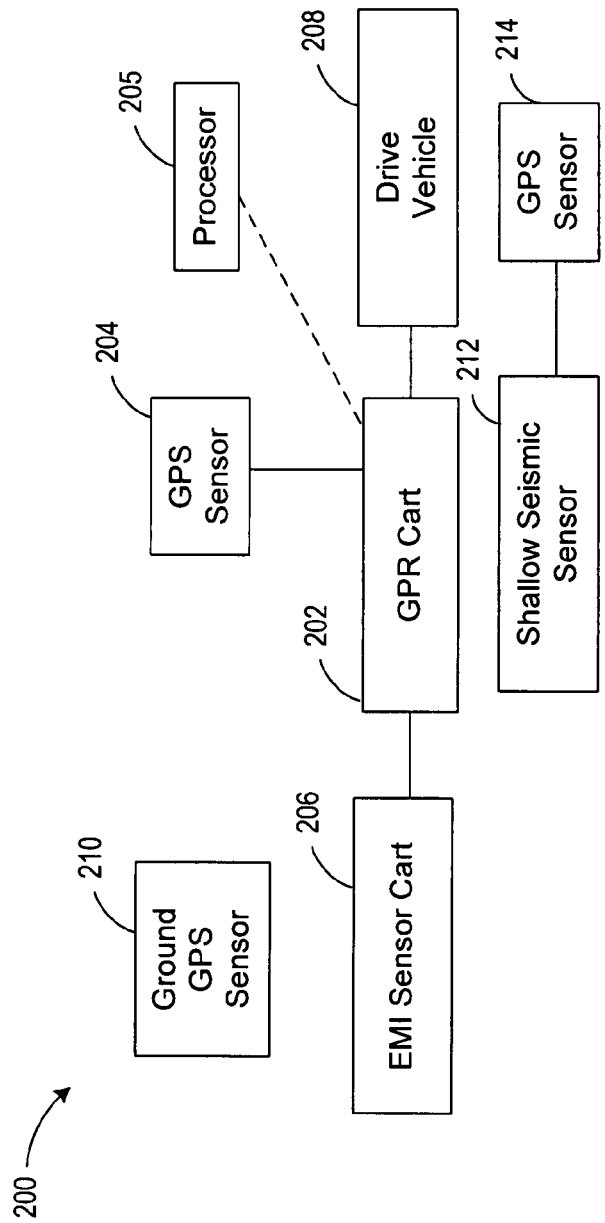
FIG. 11 is a block diagram of a sensor transport cart configuration in accordance with embodiments of the present invention.

FIG. 11 is a block diagram of a sensor transport cart configuration 200, which includes a drive vehicle 208, such as a small tractor or ATV, to which is hitched a GPR cart 202. An EMI sensor cart 206 is shown hitched to the GPR cart 202. A GPS sensor 204 is mounted on the GPR cart 202, at a location in front of or behind the GPR cart axle. A fixed ground GPS sensor or tracking system 210 is preferably used that cooperates with the GPS sensor 204 mounted to the GPR cart 202, although a laser position sensor and system may be employed.

The configuration shown in FIG. 11 also includes a shallow application seismic sensor 212 and associated GPS sensor 214. The shallow application seismic sensor 212 is typically transported over the site separately from the EMI and GPR sensors, primarily due to the need to mechanically couple the seismic sensor 212 to the ground when performing seismic imaging of a subsurface. An exemplary seismic sensor 212 to use in the context of the present invention is disclosed in commonly owned co-pending U.S. Provisional Patent Application Ser. No. 60/789,698, filed on Apr. 6, 2006 which is hereby incorporated by reference.

As discussed previously, the position sensor 204 is preferably supported by the sensor cart 202 or 206 in a spaced-apart relationship relative to the sensor or sensors that are configured to acquire subsurface measurements. It is understood, however, that the cart dynamics model of the present invention that allows sensor position to be accurately determined as the sensor arrangement traverses a survey path may be employed for subsurface sensors that have an integrated position sensor. For example, the cart dynamics model of the present invention allows sensor position to be accurately determined in three dimensions (e.g., X and Y surface coordinates and an elevation coordinate, Z), irrespective of whether the subsurface sensing arrangement is mounted at the position sensor location or other location spaced apart from the position sensor location.

However, the cart dynamics model of the present invention finds particular applicability in survey system deployments that have two or more spaced-apart sensors or arrays of sensors and a single position sensor (or where the number of position sensors is less than the number of spaced-apart sensors). For example, highly accurate positioning data may be determined using a cart dynamics model of the present invention for a sensor arrangement that includes a multi-channel sensor arrangement.

An on-board or external processor 205 (e.g., PC or laptop) is preferably configured to associate (in real-time or in batch mode) multiple channels of sensor data developed by the multi-channel sensor arrangement with geometrically correct position data relative to a reference frame. The multi-channel sensor arrangement may include one or more of a multi-channel ground penetrating radar and a multi-unit electromagnetic imaging sensor. The sensor arrangement may also include a multiplicity of disparate sensors that provide disparate subsurface sensor data, and the processor may be configured to associate the disparate sensor data developed by the multiplicity of disparate sensors with geometrically correct position data relative to the reference frame. The disparate sensors may include two or more of a ground penetrating radar, an electromagnetic imaging sensor, and a shallow application seismic sensor.

Figure 12:
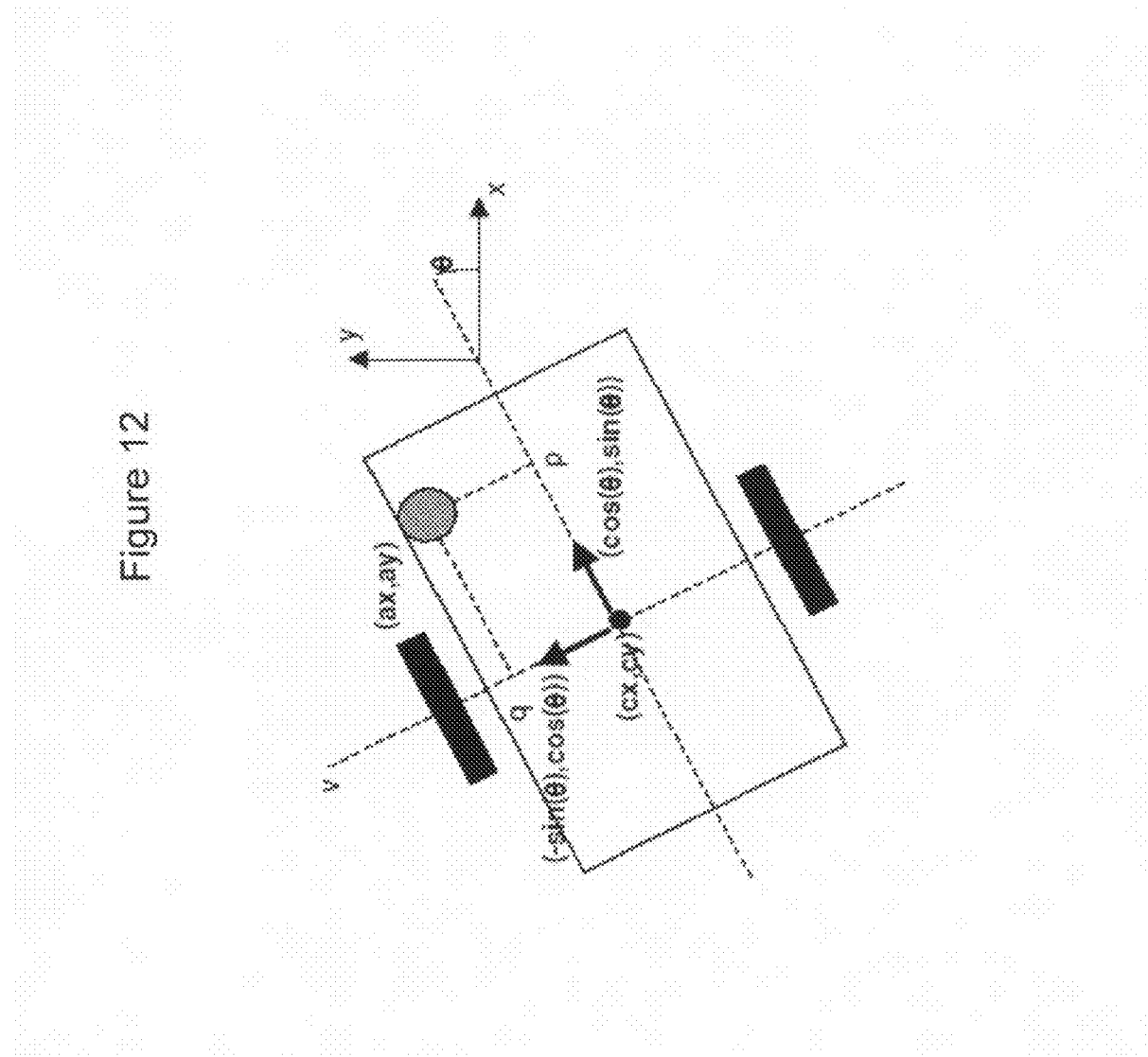
Figure 15A:
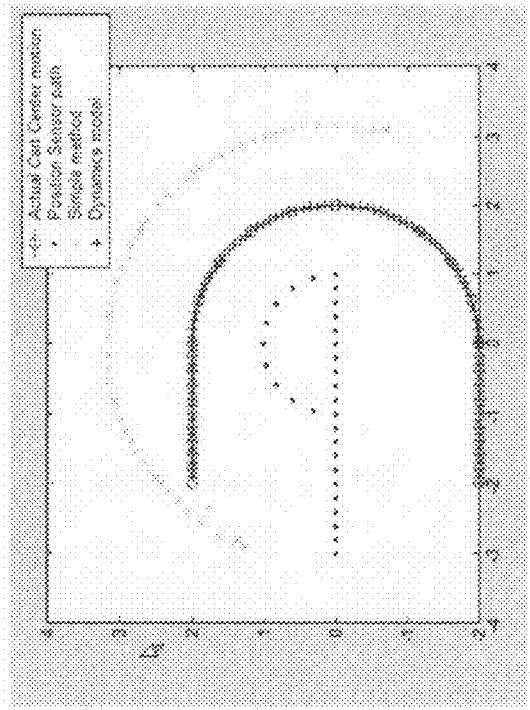
Figure 15B:
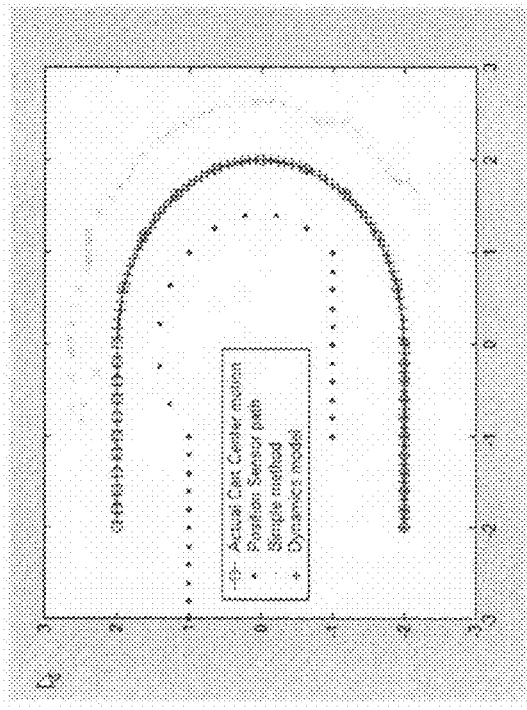
Figures 16A, 16B:
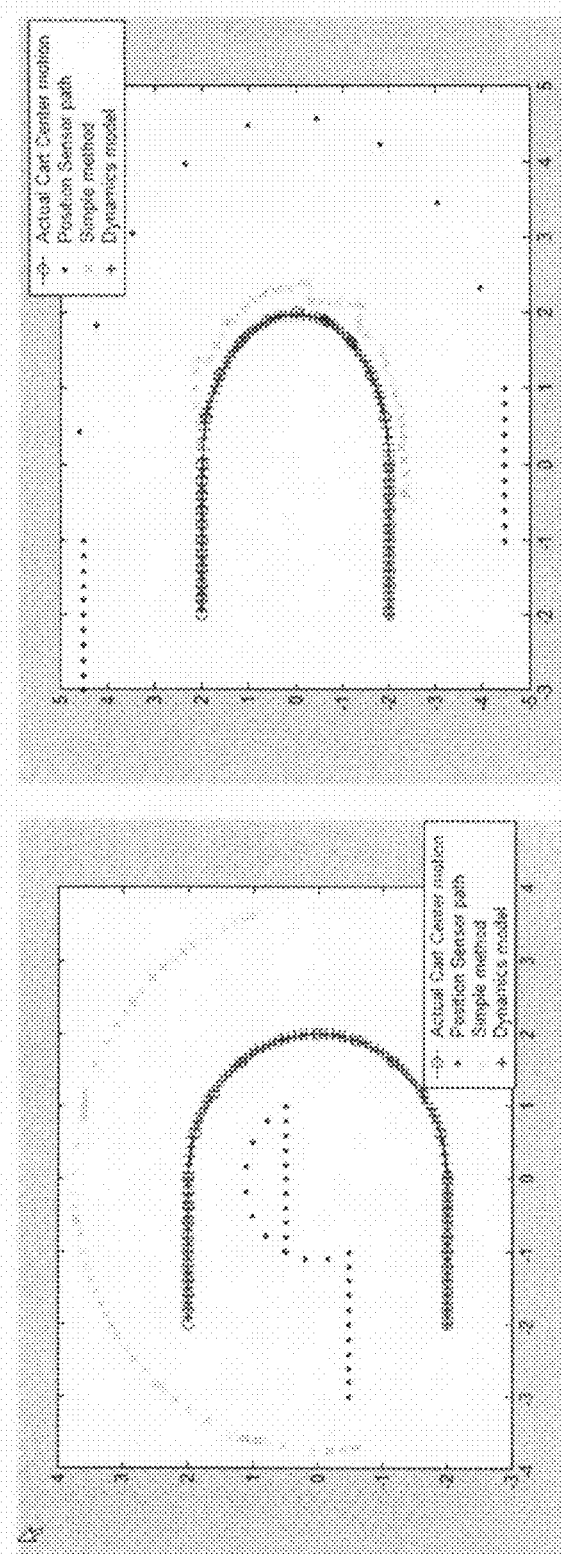
Figure 17:
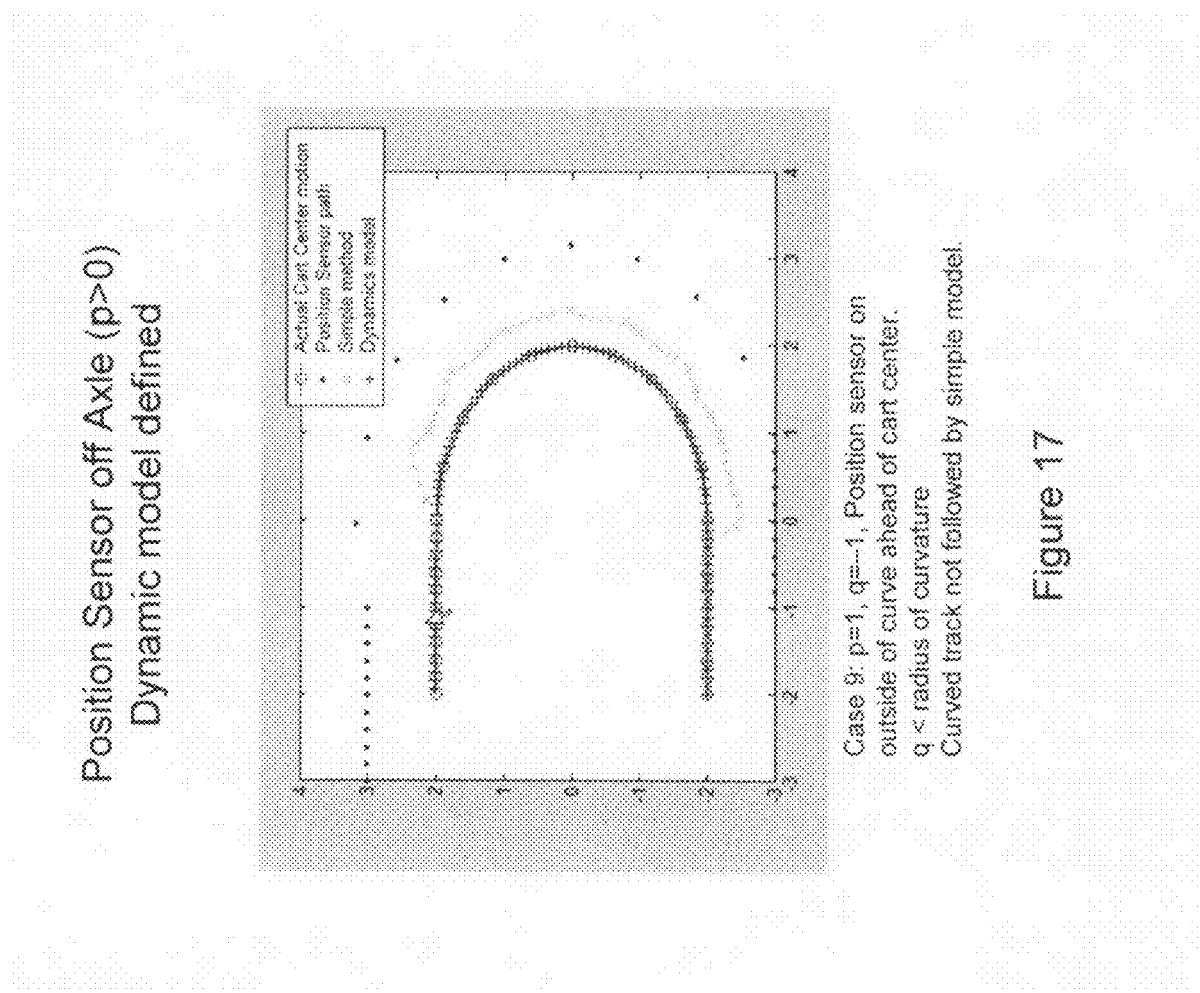

FIGS. 12-17 show various scenarios of a sensor cart that facilitate an understanding of a cart dynamics algorithm according to embodiments of the present invention. With reference to FIG. 12, let (x,y) be the global coordinate system. Let (u,v) be a local coordinate system for the cart. The cart geometry is defined by:

the center of the cart axle at (u,v)=(0,0), and the axle is parallel to the v-axis;
the GPS antenna is located at (u,v)=(p,q).

Suppose the global trajectory of the antenna is (ax(t), ay(t)). The cart trajectory is defined by the path of the cart center (cx(t), cy(t)) and the angle that the cart's u-axis makes relative to the global x-axis, θ(t). The motion of the cart is determined by two factors. Firstly, the antenna position can be calculated from the cart position and orientation:

$$\begin{pmatrix} ax \\ ay \end{pmatrix} = \begin{pmatrix} cx \\ cy \end{pmatrix} + \begin{pmatrix} \cos(\theta) & -\sin(\theta) \\ \sin(\theta) & \cos(\theta) \end{pmatrix} \begin{pmatrix} p \\ q \end{pmatrix}$$

Secondly, the cart center cannot move parallel to the axle—this involves the wheels sliding sideways—which translates to:

$$\begin{pmatrix} c\dot{x} \\ c\dot{y} \end{pmatrix} \cdot \begin{pmatrix} -\sin(\theta) \\ \cos(\theta) \end{pmatrix} = 0$$

Differentiating the first equation with respect to time and imposing the second condition yields a set of ordinary differential equations for the cart motion:

$$\dot{\theta} = \frac{1}{p} \begin{pmatrix} a\dot{x} \\ a\dot{y} \end{pmatrix} \cdot \begin{pmatrix} -\sin(\theta) \\ \cos(\theta) \end{pmatrix}$$

$$\begin{pmatrix} c\dot{x} \\ c\dot{y} \end{pmatrix} = \begin{pmatrix} a\dot{x} \\ a\dot{y} \end{pmatrix} - \begin{pmatrix} -\sin(\theta) & -\cos(\theta) \\ \cos(\theta) & -\sin(\theta) \end{pmatrix} \begin{pmatrix} p \\ q \end{pmatrix} \dot{\theta}$$

The antenna speed (ax˙, ay˙) can be calculated from a smooth (e.g., spline) fit to the discrete set of measured antenna positions and times. The initial cart position and orientation can be calculated by assuming that the cart's u-axis is parallel to the initial antenna speed, and then the differential equations above can be integrated (e.g., using a Runge-Kutta scheme) to give the cart trajectory.

FIGS. 13A-17 show different scenarios for mounting the sensor relative to the axle of the cart. It has been determined that the position of the sensor relative to the axle dictates whether or not the dynamic is defined (i.e., valid) or becomes undefined (i.e., not valid). FIGS. 13A-14B demonstrate that the cart dynamics model becomes undefined when the position of the sensor (p) is on the axle (p=0). FIGS. 15A-17 demonstrate that the cart dynamics model is defined for sensor positions located ahead of the axle (i.e., p>0). Although not shown in these Figures, the cart dynamics model is also defined for sensor positions located in back of the axle (resulting in a simple change in the sign from positive to negative in the p term of the equations above).

FIGS. 15A-17 demonstrates that the dynamic model very accurately tracks the actual cart center motion when the sensor is positioned ahead of the axle. Conversely, FIGS. 15A-17 clearly demonstrate that the conventional simple "tangent" method poorly tracks the center of cart motion. Using a conventional simple tangent method, an error is unavoidable on any curve when the sensor is not positioned on the axle. This error on the curve grows larger as the distance between the axle and sensor position increases when using a conventional simple tangent method.

Figure 18:
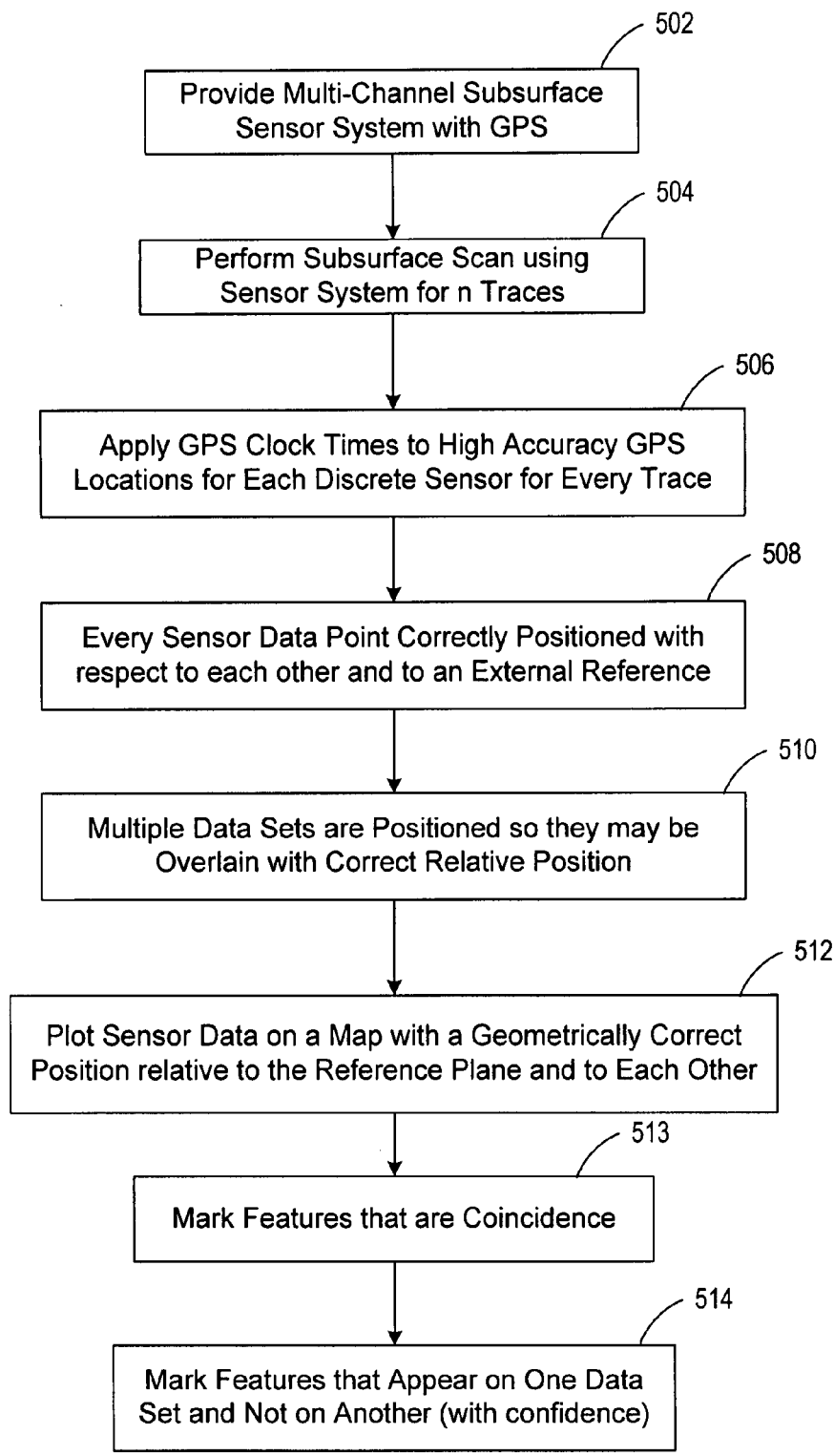
FIG. 18 is a flow chart of various processes associated with the acquisition and processing of position sensor data and data from one or more subsurface survey sensors in a manner consistent with a cart dynamics modeling approach in accordance with embodiments of the present invention.

FIG. 18 is a flow chart of various processes associated with the acquisition and processing of position sensor data and data from one or more subsurface survey sensors in a manner consistent with a cart dynamics modeling approach in accordance with embodiments of the present invention. A multi-channel subsurface sensor system is preferably provided with a GPS positioning capability 502, such as the system shown in FIG. 11, and is used to perform a subsurface scan 504 for n traces. GPS clock times are applied to high accuracy GPS locations for each discrete sensor for every trace 506.

It is understood that the clock times that are correlated with the scan number of the GPR data file or other sensor data file may be generated by appropriate clock sources other than a GPS source, such as an internal clock time of a computer or PC. It is further noted that the position sensor may be of a type different from a GPS sensor, such as a laser tracking sensor or system, and that clock times derived from an appropriate clock source may be applied to locations indicated by such other position sensor for each discrete sensor for every trace.

Every sensor data point is correctly positioned with respect to each other and to an external reference 508. Multiple data sets are positioned so they may be overlain with correct relative position 510. Sensor data is plotted on a map with a geometrically correct position relative to the reference frame and the each other 512. Features are marked that are coincident 513. Features that appear on one data set but not on another are marked 514, and a confidence value may be applied to such marks.

Figure 19:
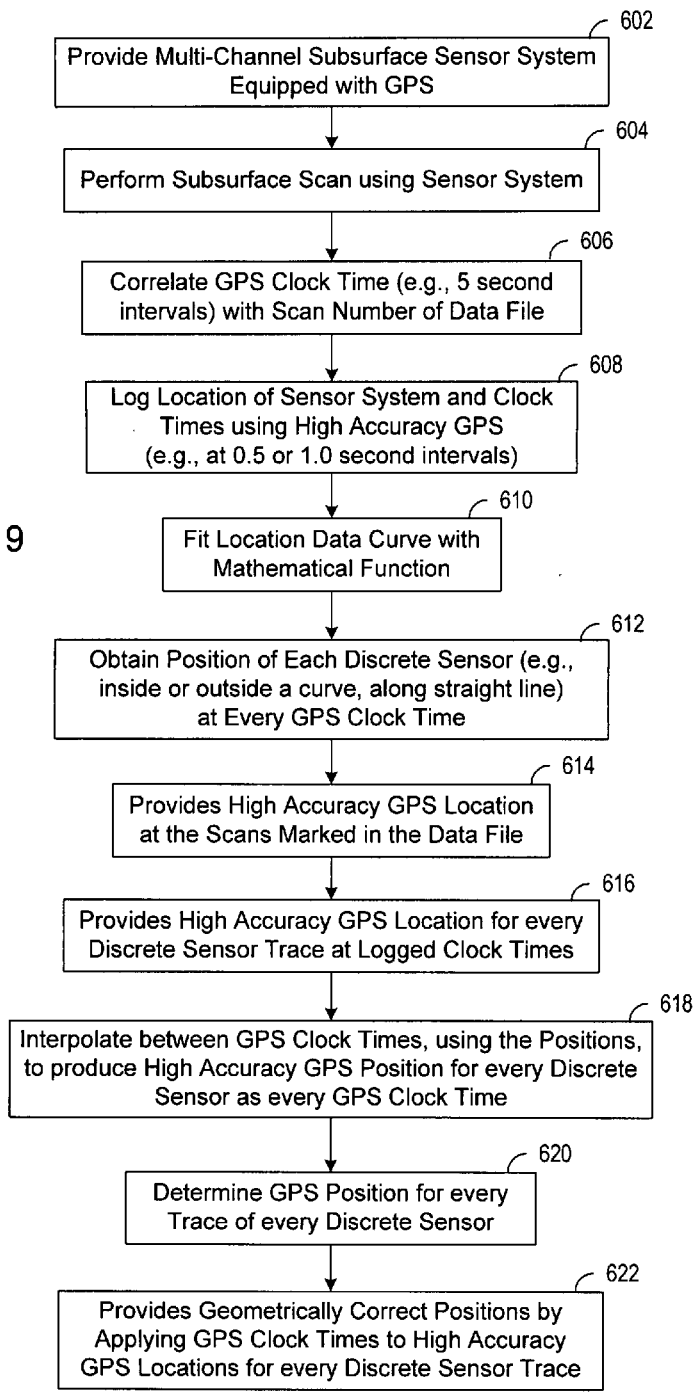
FIG. 19 is a flow chart of various processes associated with the acquisition and processing of position sensor data and data from one or more subsurface survey sensors in a manner consistent with a cart dynamics modeling approach in accordance with embodiments of the present invention.

FIG. 19 is a flow chart of various processes associated with the acquisition and processing of position sensor data and data from one or more subsurface survey sensors in a manner consistent with a cart dynamics modeling approach in accordance with embodiments of the present invention. A multi-channel subsurface sensor system equipped with a GPS positioning capability 602 is used to perform a subsurface scan 604. GPS clock times (e.g., 5 second intervals) are correlated with the scan number of the GPR data file 606. The location of the sensor system and clock times are logged using high accuracy GPS (e.g., at 0.5 or 1.0 second intervals) 608. A location data curve developed from the data is fitted with a mathematical function 610. The position of each discrete sensor, whether at an inside or outside curve location or straight line location, is obtained at every GPS clock time 612. The provides a high accuracy GPS location at the scans marked in the data file 614. This also provides a high accuracy GPS location for every discrete sensor trace at logged clock times 616. Using the positions obtained in block 612, a high accuracy GPS position is obtained for every discrete sensor at every GPS clock time by interpolating between GPS clock times 618. The GPS position for every trace of every discrete sensor is determined 620. This process provides for geometrically correct positions by applying GPS clock times to high accuracy GPS locations for every discrete sensor trace 622.

It is understood that the clock times that are correlated with the scan number of the GPR data file or other sensor data file may be generated by appropriate clock sources other than a GPS source, such as an internal clock time of a computer or PC. It is further noted that the position sensor may be of a type different from a GPS sensor, such as a laser tracking sensor or system, and that clock times derived from an appropriate clock source may be applied to locations indicated by such other position sensor for each discrete sensor for every trace.

The "trueness" of the geometry that provides for geometrically correct positions for the various subsurface sensor data is based in part on supplying a geo-referenced position to each and every sensor trace, such as every GPR trace. According to one approach, a high stability, high accuracy GPS clock time is logged. This time is correlated with a scan number of the GPR data file. Also collected is high accuracy GPS or other position sensor data at 0.5 or 1.0 second intervals. The location data curve is fit with a mathematical function, and the cart dynamics algorithm previously discussed is used to obtain the position of each antenna at every GPS clock time (or clock time from another suitable clock time source).

The dynamics of the sensor cart are tracked so that the location of the GPS antenna on the inside or outside of the curve can be determined, which is evident if the data points are compressed or rarified as the cart goes around a corner. A high accuracy GPS location is thus obtained for each antenna at all GPS clock times, thus providing a high accuracy GPS position at the scans marked in the GPR data, and a high accuracy position for every antenna trace at these times. A processor then interpolates between the GPS clock times, using the positions, to obtain a high accuracy GPS position for every antenna, at every GPS clock time. These data is used to obtain a GPS position for every trace of every antenna, using the cart dynamics algorithm to compute the positions.

The geometrically correct positions are thus derived from applying clock times (e.g., GPS clock times) to high accuracy position sensor locations (e.g., GPS locations), for every trace. This results in high accuracy positions for a 2D, irregular grid of the surface position of every trace. For example, if there are 3 swaths of 14 channels, over a length of 50 feet, at 1 scan per inch, a position file with the locations of 25,200 GPR traces is thus generated—all positioned correctly with respect to an external reference and to each other. The same calculations are made for every data point collected with the EMI sensor system, except that only a single scalar value is obtained rather than the 3D block with a depth that is obtained from the GPR sensor. The positioning algorithm applies to the EMI sensor data and to seismic sensor data, which is more like the GPR data.

By way of example, if an acre of data is obtained with a trace every 4 square inches, at total of 1,568,160 locations need to be managed. If one only surveys the start and end points and assumes a straight line, one essentially does the same calculation to again get the positions of the 25,200 traces, except that now the lines are straight and not potentially curved.

Every data point has now been positioned correctly with respect to each other and to an external reference, which may be an external reference in latitude and longitude format or in state plane coordinates, for example. The data may be plotted on a map on a graphical user interface with a geometrically correct position to the reference frame, and as importantly, to each other. Thus, multiple data sets are positioned so they may be overlain with the correct relative position, and features that are coincident may be marked, along with those that appear on one data set and not on another. This provides the user with confidence that one really can see features that appear on one data set and not on another. If there is uncertainty in the relative positions, the user would not know if the feature is seen on one sensor and not the other (i.e., 2 distinct features) or if they are the same feature but there has been a mis-location between the two data sets (1 distinct feature with relative mis-location).

A cart dynamics model of the present invention may be embodied in a variety of ways of varying complexity. For example, cart dynamics modeling software may be implemented by a processor of a movable survey system, such as those discussed above. Cart dynamics modeling software may also be implemented as part of a more comprehensive system, such as that illustrated in FIGS. 1A, 3 and 4, for example, and may be implemented subsequent to completion of a survey. It is understood that the cart dynamics modeling approach of the present invention is not limited to application in the disclosed systems, by find applicability in a wide variety of implementations where accurate association of sensor data to sensing location is required, particularly where a multiplicity of disparate sensor data is to be co-registered. Additional details of a cart dynamics modeling approach as described herein are disclosed in co-pending U.S. Patent Application Publication No. 2010/0259438, which is incorporated herein by reference.

Figure 21:
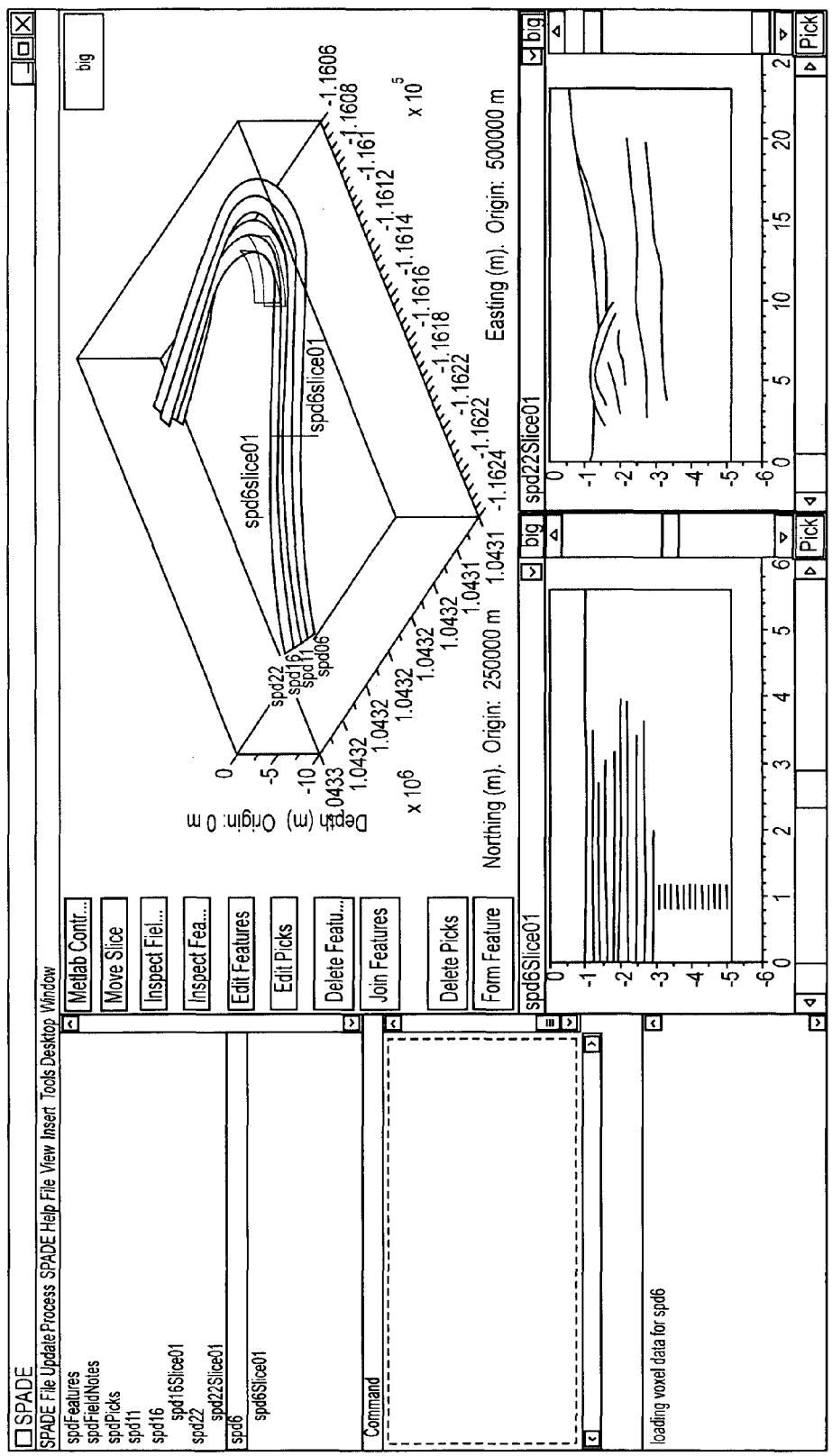
FIG. 21 shows a 3D visualization of GPR data graphically depicted within a subsurface volume, and 2D slice views of the GPR data in the lower panels in accordance with embodiments of the present invention.
Figure 22:
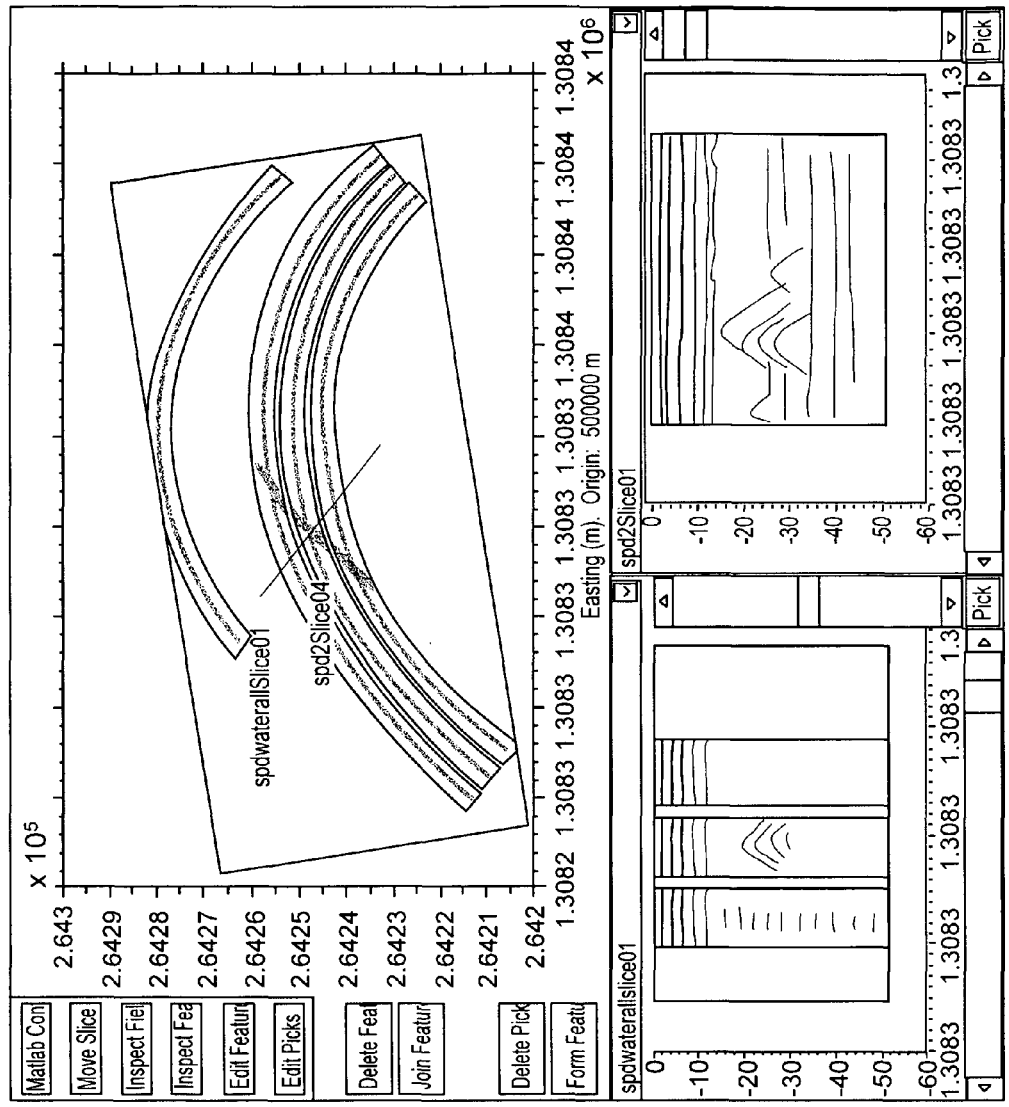
FIG. 22 shows another visualization of GPR data in accordance with embodiments of the present invention.
Figure 23:
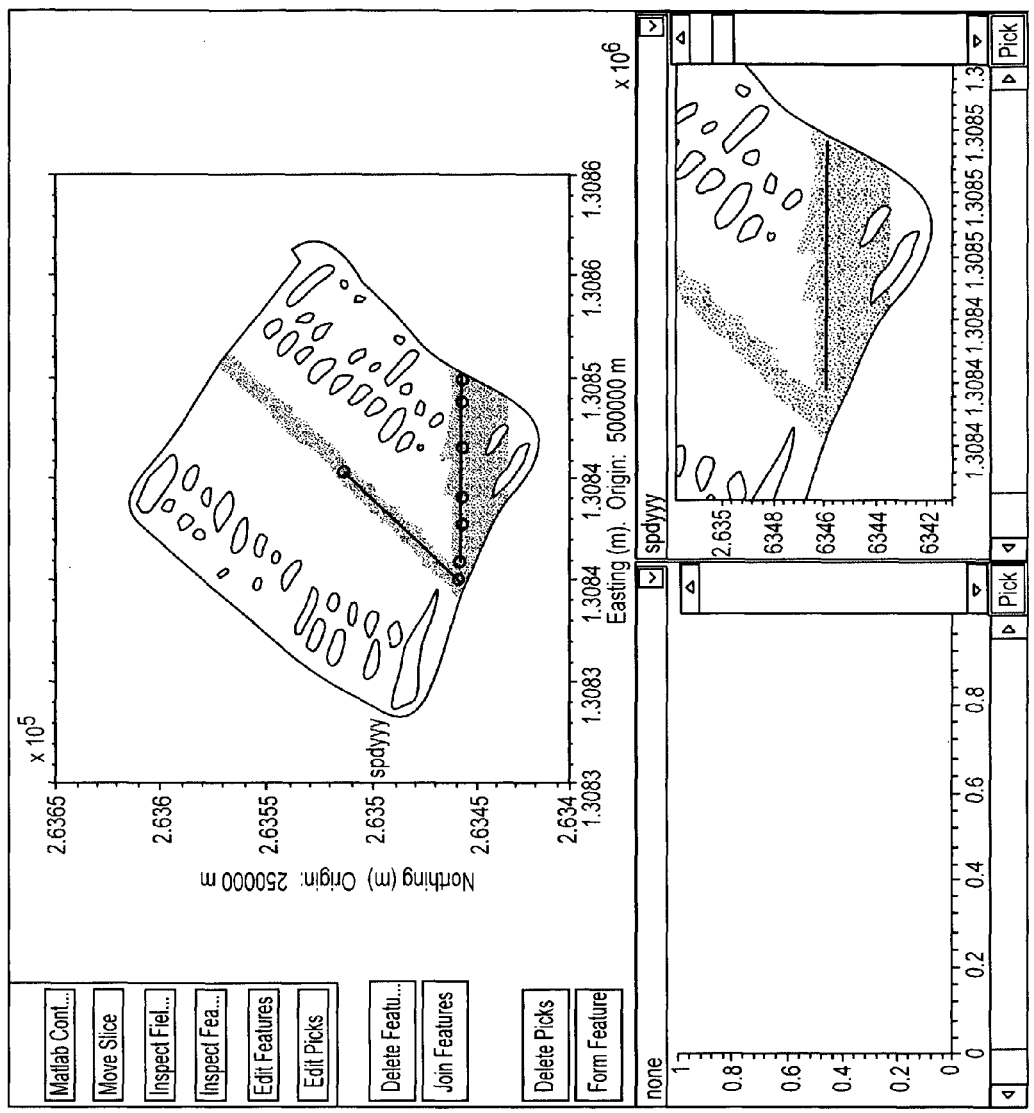
FIG. 23 shows a visualization of EMI sensor data in accordance with embodiments of the present invention.
Figure 24:
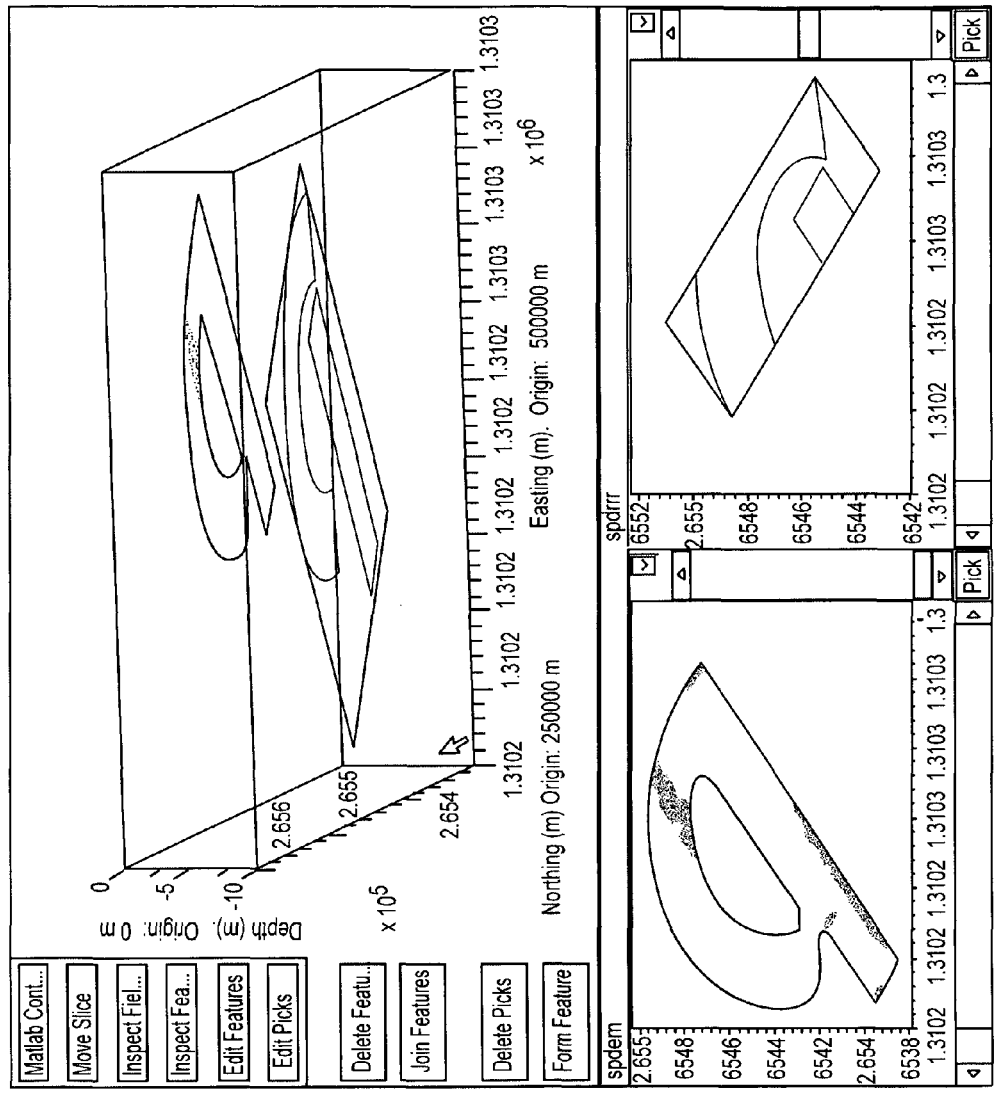
FIG. 24 shows a visualization of both GPR and EMI sensor data in accordance with embodiments of the present invention.

FIGS. 21-34 provide an overview of various processes and screen images that may be initiated by, or presented to, a user via the SPADE GUI. One skilled in the art will readily appreciate the usefulness and advantages of the data visualization capability of SPADE. FIG. 21 shows 3D visualization of GPR data graphically depicted within a subsurface volume, and 2D slice views of the GPR data in the lower panels. FIG. 22 shows another visualization of GPR data. FIG. 23 shows a visualization of EMI sensor data. FIG. 24 shows a visualization of both GPR and EMI sensor data.

Figure 27A:
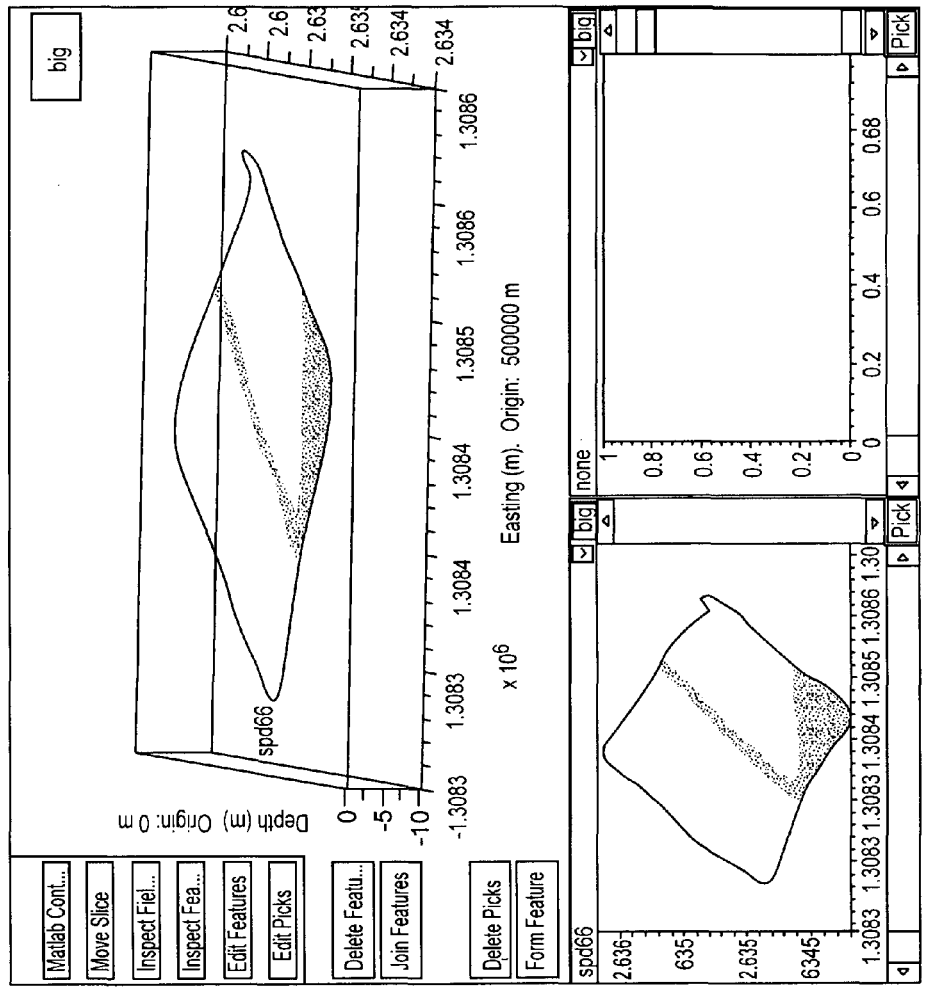
Figure 27B:
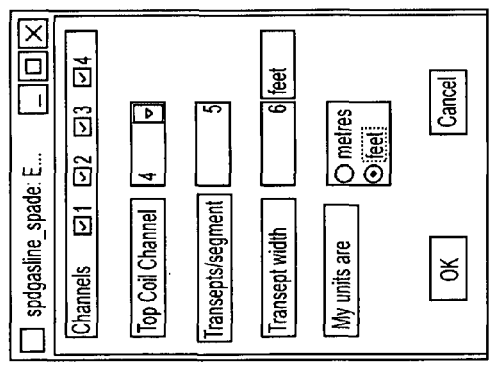

FIGS. 25 and 26A-26B show visualizations of EMI sensor data and an EM inversion process that provides for depth determinations. FIGS. 27A-C, in particular, show a visualization of EMI sensor data obtained from implementation of an automated EMI inversion function. According to one approach, EMI inversion is automated so that after a map of an area is produced, linear features can be picked, and a depth to an anomaly computed automatically. First, a map of the EMI data is created within SPADE using the import image command. The user can then pick endpoints of any linear feature. These endpoints define the feature that can be created with the 'Create Feature' command. The user selects how many profiles are to be created between the start and end points of each linear segment on the feature.

SPADE then creates this number of profiles perpendicular to the linear feature segment. For example, if there are two segments in the feature and the user selects 5 profiles per segment, 5 depth inversions will be performed on each segment for a total of 10 depths on the complete feature. The user also selects the length of the profile created perpendicular to the segment. After these steps are performed, a button initiating the inversions is clicked, and the program automatically steps through each profile, computing a depth at the central point of each. This inversion is based on an algorithm expressly derived for the EM response of a linear 2D target embedded in a dielectric medium. As each depth is computed, it is plotted on the 3D view of the EMI data within SPADE to allow the user a view of the 3D configuration of the target. After the inversion is complete, the feature coordinates can be exported to a comma separated variable, DXF format, or XML format file for import to CAD drawings or other presentation formats.

Figures 28A, 28B:
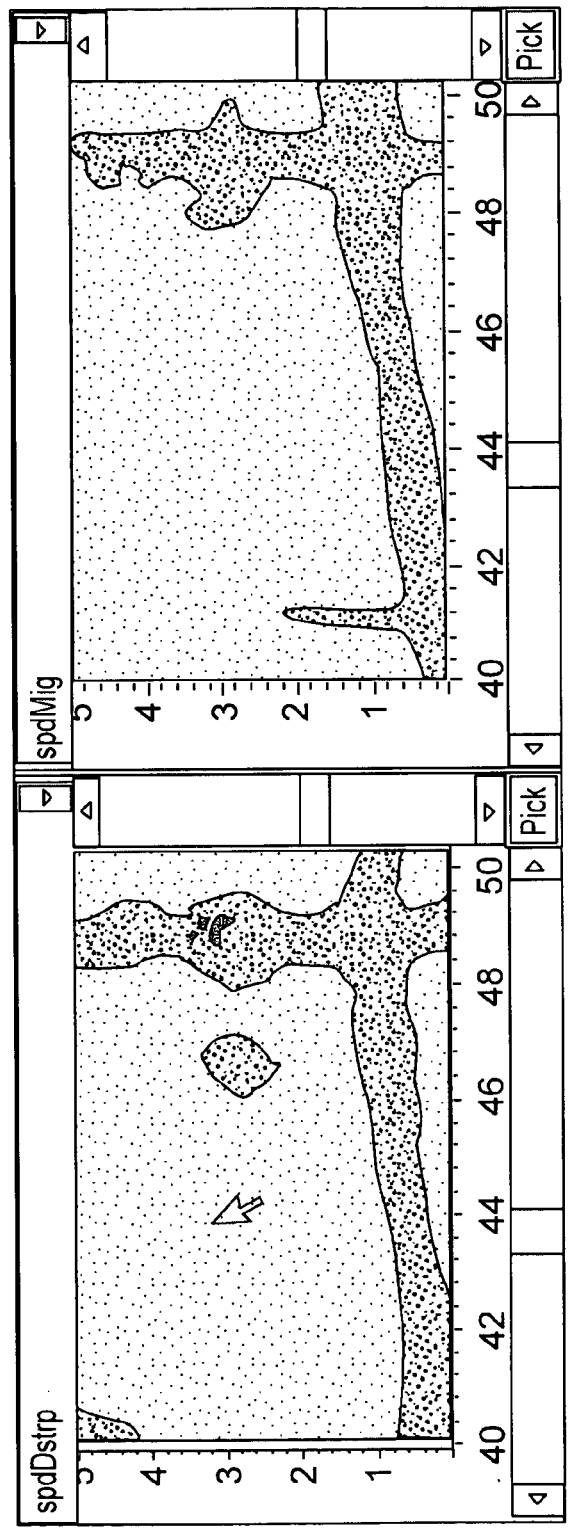
FIGS. 28A and 28B show results of 3D migration performed by SPADE in accordance with embodiments of the present invention.
Figure 29:
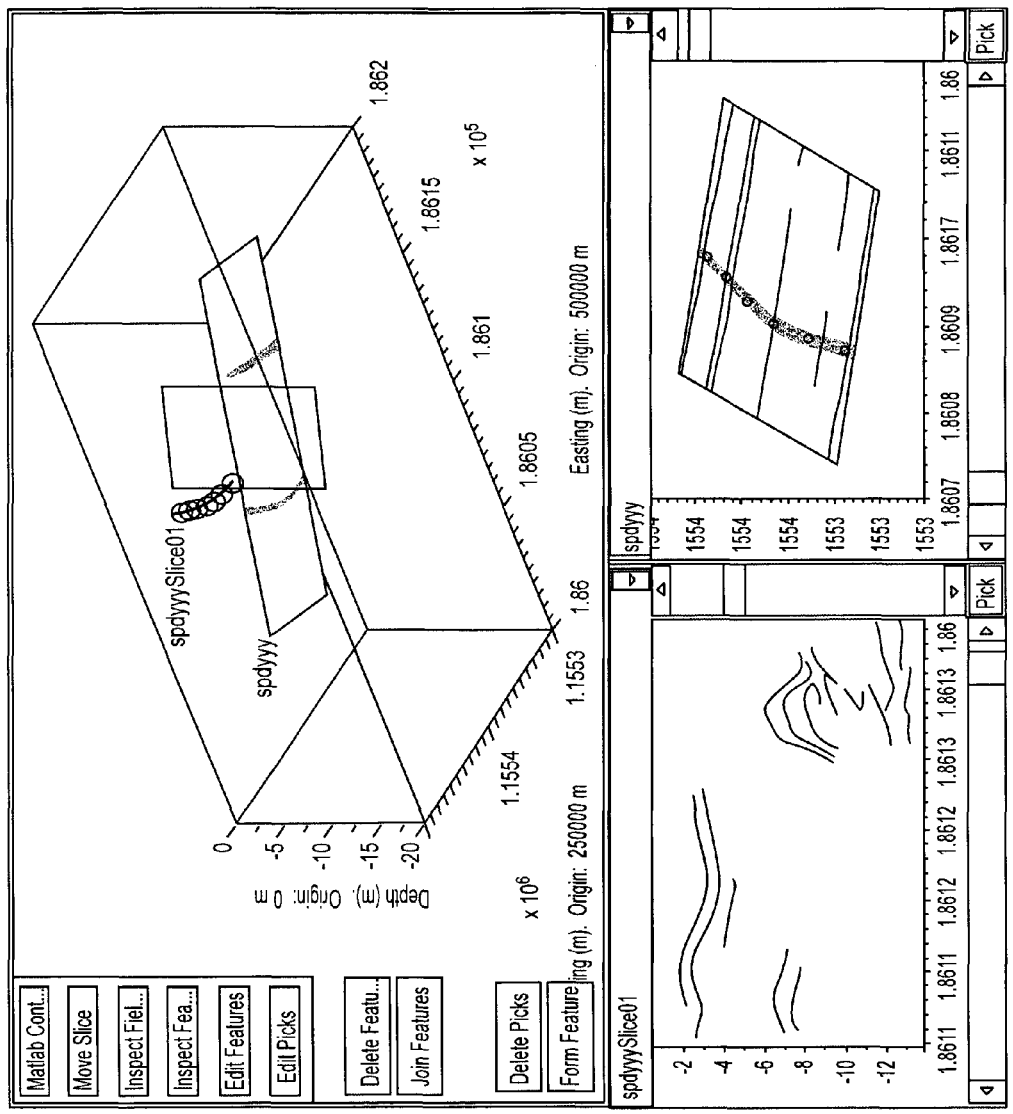
FIG. 29 shows feature identification performed by SPADE in accordance with embodiments of the present invention.
Figure 30A:
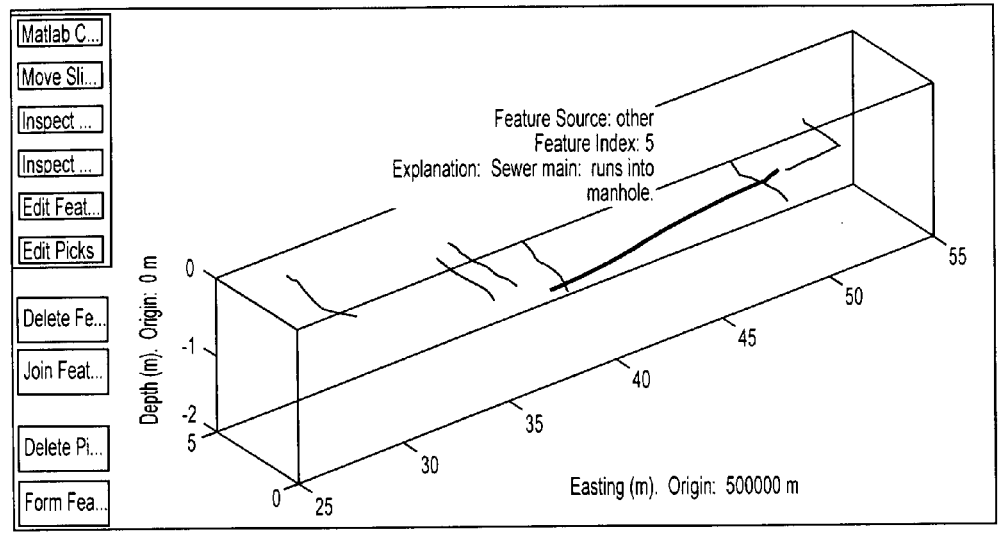
FIGS. 30A and 30B show field notes and descriptions incorporated into a data visualization via SPADE in accordance with embodiments of the present invention.
Figure 30B:
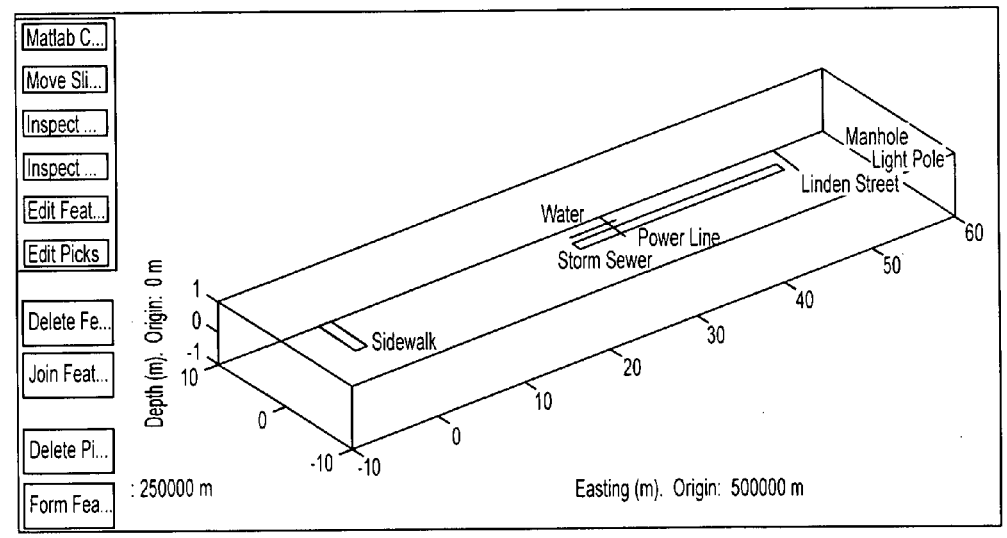

FIGS. 28A and 28B show results of 3D migration performed by SPADE. FIG. 29 shows feature identification performed by SPADE. FIGS. 30A and 30B show field notes and descriptions incorporated into a data visualization via SPADE. FIG. 30A also shows a picks object selected by moving the cursor over the object using the mouse. A picks object refers to placing the screen cursor over a point on the data image (from any of the plurality of sensors or the field notes, either in combination or singly) and selecting that point (usually via mouse click) for inclusion as an interpreted object. That object might be the location of a pipe, the boundary of a grave, a geologic boundary, etc. The picked or selected point is then written to a file that can be manipulated further either within SPADE, FUSE, or any other external software. When the points are picked, they are displayed in SPADE so the user can see the overall location of the 'utility' and how it might lie in relation to other objects or field notes.

Figure 31:
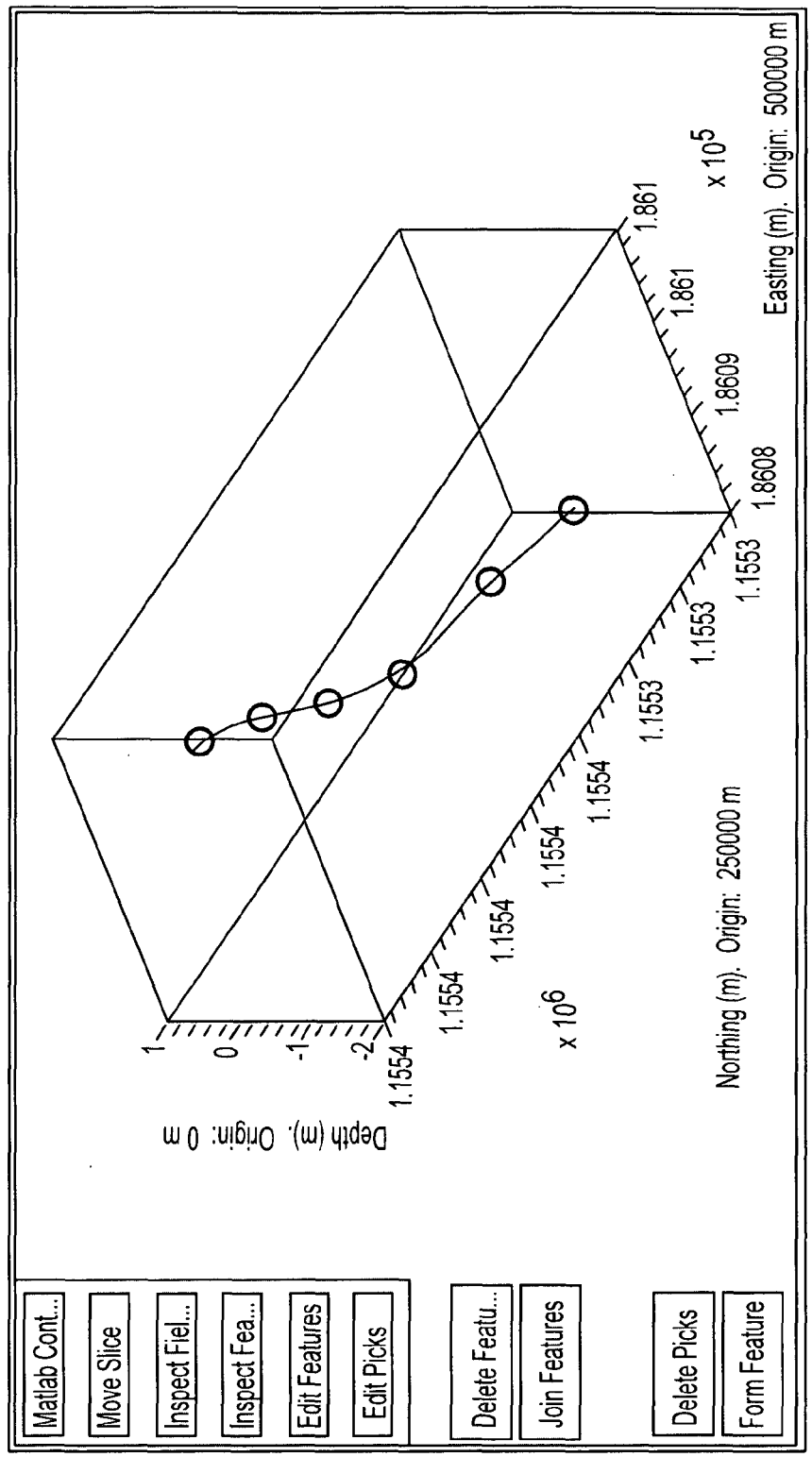
FIG. 31 shows aspects of feature visualization via SPADE in accordance with embodiments of the present invention.
Figure 32B:
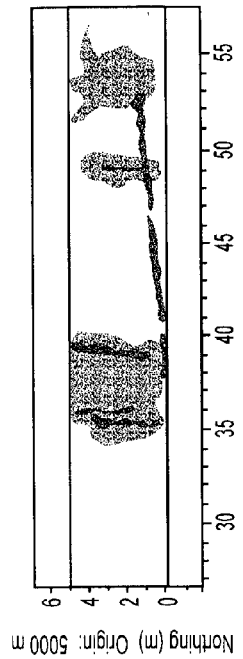
FIGS. 32A and 32B show visualizations of automated feature extraction resulting from volume contouring by SPADE in accordance with embodiments of the present invention.
Figure 32A:
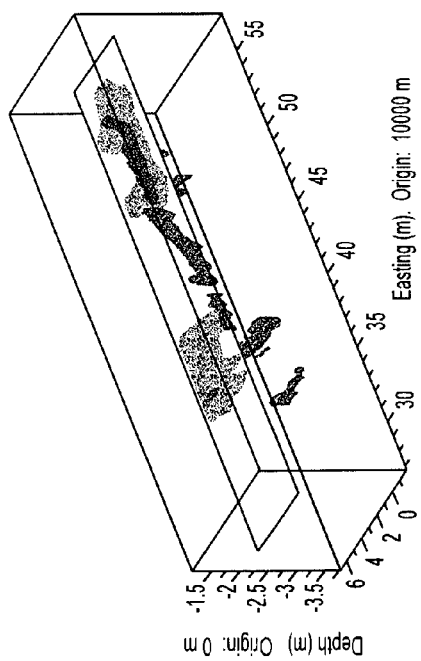
Figure 33:
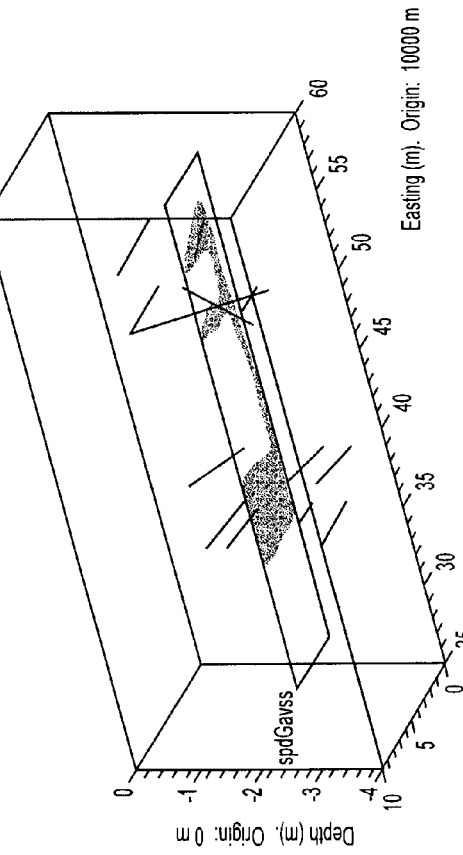
FIG. 33 shows a visualization of automated feature extraction resulting from a Radon transform operation by SPADE in accordance with embodiments of the present invention.
Figure 34:
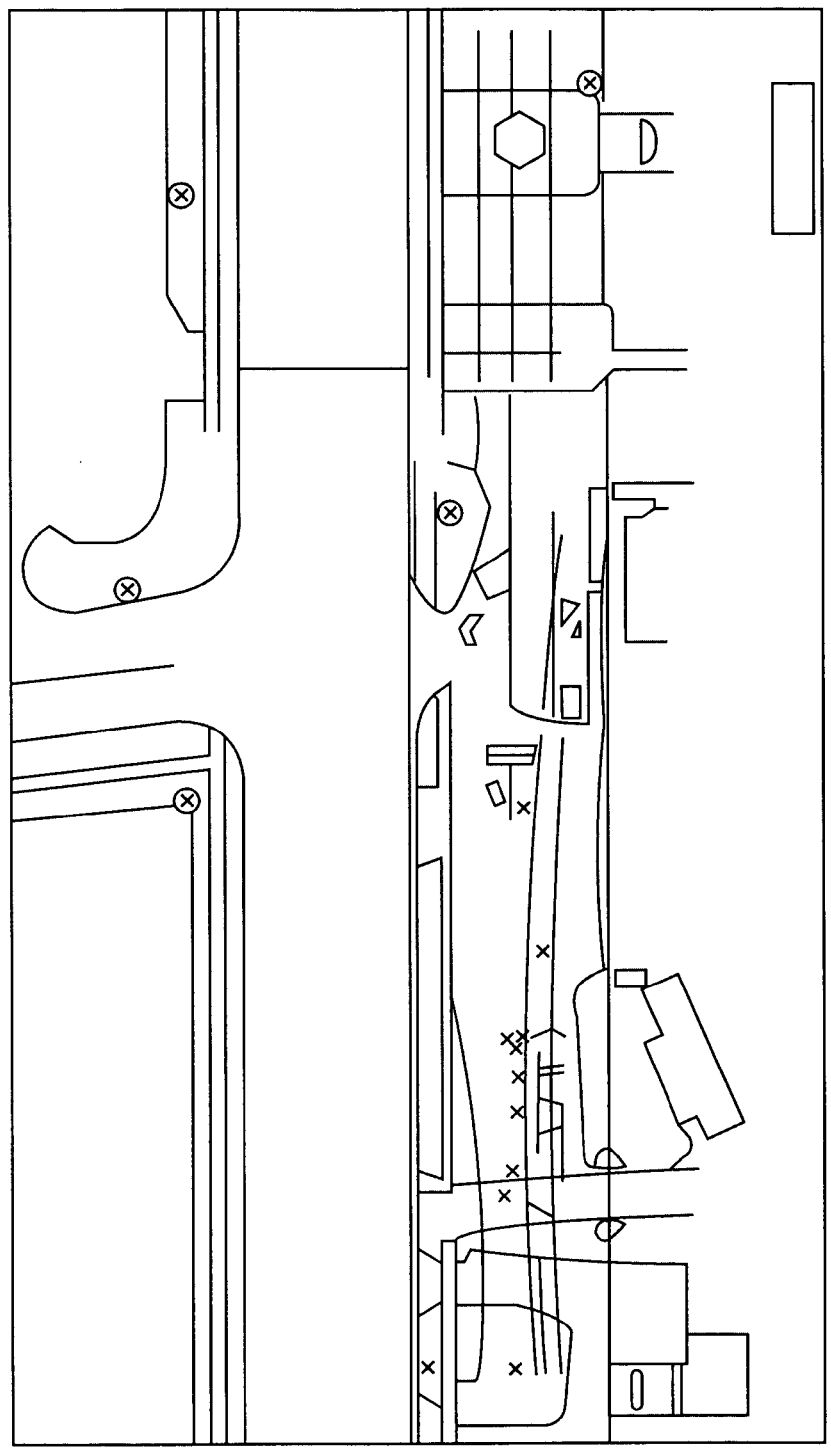
FIG. 34 is a CAD engineering drawing of a mapping of underground utilities generated from use of SPADE in accordance with embodiments of the present invention.

FIG. 31 shows aspects of feature visualization via SPADE. FIGS. 32A and 32B show visualizations of automated feature extraction resulting from volume contouring by SPADE. FIG. 33 shows a visualization of automated feature extraction resulting from a Radon transform operation by SPADE. FIG. 34 is a CAD engineering drawing of a mapping of underground utilities generated from use of SPADE. Other data may be imported and integrated in SPADE, such as a bitmap image of a city map.

The following discussion is directed to aspects of the SPADE GUI. The SPADE GUI described below is representative of one embodiment of a useful GUI, and is not to be construed as limiting the scope of the inventive aspects of SPADE or GUI associated with SPADE.

Two Dimensional (2D) Images

Two dimensional can accommodate any number of channels, although only one channel is typically displayed at any one time. When a 2D Image is imported it is displayed in the 3D plot. It may also be displayed in either of the 2D plot windows, if desired. The display properties of the 2D Image can be modified via a dialog box.

Figure 35:
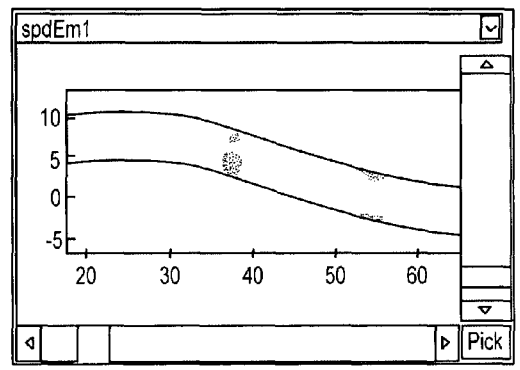
FIG. 35 shows that a 2D Image can be plotted in a 2D plot via the SPADE GUI in accordance with embodiments of the present invention.

A 2D Image, such as that shown in FIG. 35, can be plotted in a 2D plot by selecting its object name from the pick list of the relevant 2D plot window. In the case of a 2D image in a 2D plot, the sliders to the right and below the plot window have no effect. Additional details on the functionality available in 2D plots is provided below in the section concerning 2D Plot.

Figure 36:
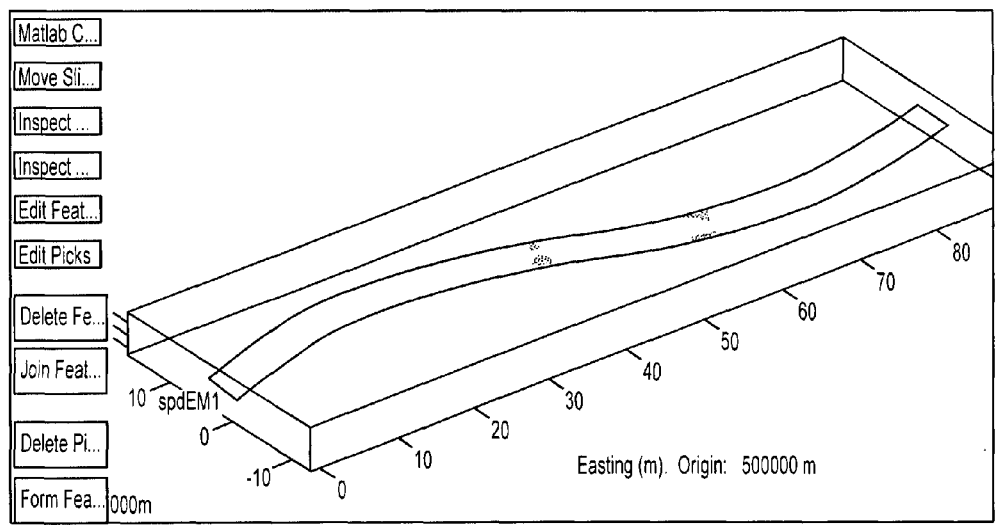
FIG. 36 shows that a 2D image is always present in the 3D plot via the SPADE GUI in accordance with embodiments of the present invention.

The 2D image is always present in the 3D plot, as is shown in FIG. 36, as long as the object remains. The display properties for the 2D image can be modified by double-clicking on the relevant 2D image object in the object list. A 2D Image dialog box controls the appearance of the selected 2D image in both the 2D plot(s) and 3D plot. The 2D Image dialog box may provide a variety of controllable features. Such features may include a 'Channel' pick-list that selects the channel of the 2D image to display, a 'Color Bar' pick-list that selects the desired color bar for the 2D image, a 'Color Map' 'Launch' button that opens a color map dialog box to edit the color map for the 2D image, a 'Show ID' checkbox that enables or disables the text string describing the 2D Image in the 3D plot, a 'Zplot' slider that controls the depth (z coordinate) at which the 2D image is plotted in the 3D plot, and an 'Alpha' slider that controls transparency of the 2D image in the 3D plot.

Data may be extracted from a 2D Image. A menu provides options that allow the user to define a region in terms of x and y limits and to create a new 2D image from data lying within this region. The x and y limits take into account the origin. The same functionality (as well as the ability to define more complicated regions) is available using a Plot Channels menu option. A number of 2D image functions are available, including a function to imports the data in a mapfile in a new object with variable name, a function to delete a 2D Image, and a draw function that draws a 2D image. A merge function makes a new 2D image from multiple 2D images by concatenating their data and calculating a new triangulation object. This object is displayed in the 3D plot and a variable created in the base workspace. Another function updates the 3D and 2D plots of the 2D image with new display settings, providing the variable name of the 2D image and one or more of the object's display parameters.

Each 2D Image imported is stored in a individual object. When 2DImage is imported, a new variable is created in the base workspace. The object will be shown in the Object List. A 2D image object is a structure with the following fields:

| Variable | Field | SubField | Type |
| --- | --- | --- | --- |
| spd2DImage. | type | | enumSpadeType = '2DImage' |
| | ID | | string = variable name |
| | data(:,[X Y C1 C2 ... Cn]) | | double |
| | triangle(:,3) | | |
| | display. | channel | int [0=no channel] |
| | | showID | enumOnOff |
| | | zPlot | double |
| | | alpha | double |
| | | colorBar | enumColorBar |
| | | colorMap. | colorMap |
| | handles3D | patch | handle |
| | handles2D | patch | handle |

The field triangle is the triangulation data, e.g., triangle(10, 2), and specifies the index into data of the 2nd vertex of the 10th triangle in this example. No application data is stored with handles3D.patch or handles2D.patch. The vertex data can be taken straight from data, according to which channel is selected; display.colorBar and display.colorMap determine how to convert this to the Cdata property for handles3D.patch and handles2D.patch.

The SPADE GUI allows for plotting channels of a 2D image. Each data point of a 2D image (of EMI data, for example) has six parameters: position x; position y; value of channel 1; value of channel 2; value of channel 3; and value of channel 4.

A menu option allows the user to plot each of these parameters against any of the others in a principal component analysis or PCA. For example, and with reference to FIG. 37, channel 3 (x axis) has been plotted against channel 2 (y axis). The z axis can also be used to plot another parameter and the figure then rotated so the z axis becomes visible. The color of each data point can be used to indicate a 4th parameter.

If the mouse is dragged, a blue rectangle will appear. When the mouse button is released any point within the rectangle will be selected (or deselected depending on whether the Mouse Selects or Mouse Deselects radio button is active). Selected points are indicated by filled circles. By successive mouse drags, complicated regions of data selection can be built up. Once the user is satisfied that all required data points have been selected, these data points can be saved to form a new image (or just removed).

Figure 38:
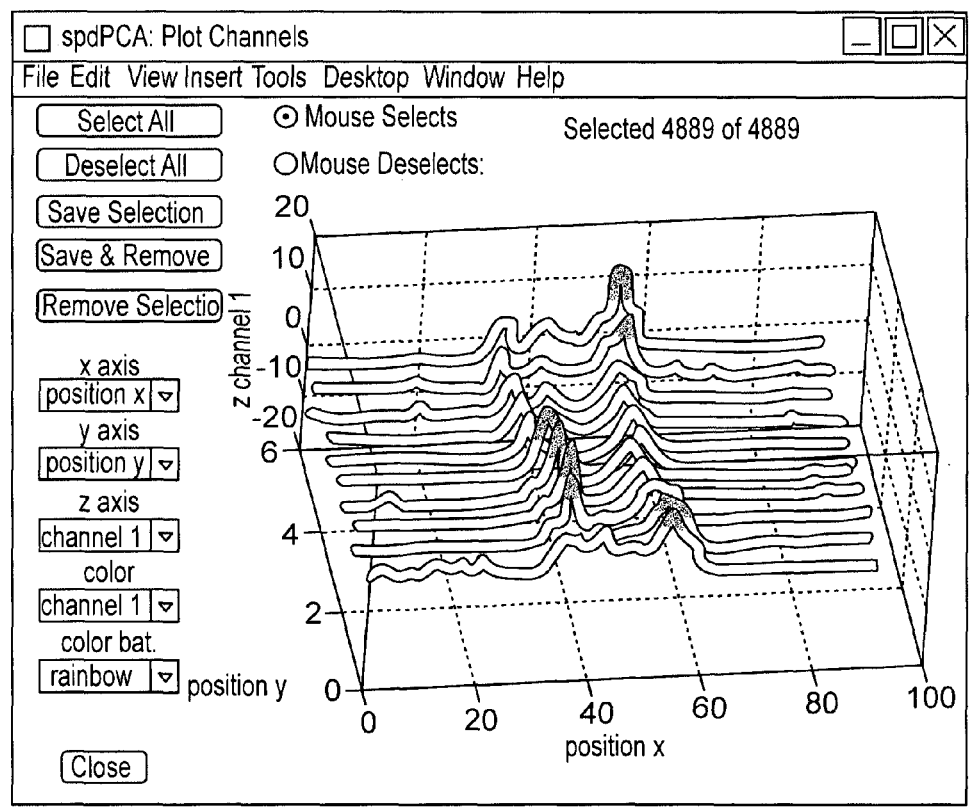
FIG. 38 shows a plot channel function that can used to plot the data as a function of position in accordance with embodiments of the present invention.

The plot channel function can also be used to plot the data as a function of position, as is shown in FIG. 38. The x and y values take into account the origin. By selecting rectangles of points, the user can extract regions of data which are of more complicated shape than those allowed by an ExtractRegion command.

A 2D Image Scale/Transform menu option allows the user to scale the data or to transform it, including principal component analysis. The scaled/transformed image is saved to a file. For example, using the Scale/Transform menu, the user may decide to transform the data such that: channel 1 is unchanged, channel 2 is the difference between channel 4 and channel 1, channel 3 is the ratio of channel 4 to channel 1, and channel 4 is the average of all 4 channels.

Figure 39:
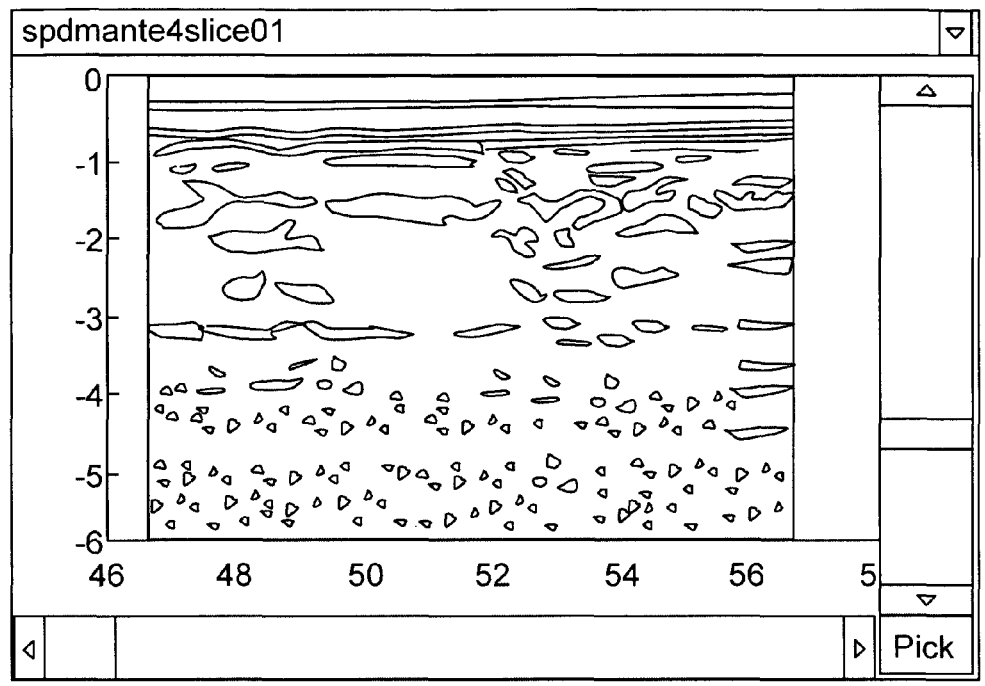
FIG. 39-62 show screens of a SPADE GUI that allows the user to inspect and interact with data in detail in accordance with embodiments of the present invention.

The SPADE GUI includes two 2D plots and can be configured to have more. Each 2D plot typically shows one SPADE object at a time. The 2D plots, such as that shown in FIG. 39, are intended to allow the user to inspect data in detail and select picks. Each 2D plot has a pull-down menu that allows an object to be selected for the plot. The user may select 'none' to clear the plot.

Each 2D plot has a horizontal and vertical slider that allow some navigation of the object in the 2D plot. Details of how each object is shown in the 2D plot and the action of the sliders for 3D Images, 2D Slices, and 2D Images are as follows. Each 2D plot has a 'Pick' toggle button that allows picks to be created. Picks can be deleted and edited from within the 3D plot window. Underlying application controls, such as Matlab Figure controls, can be used to pan and zoom the 2D plot.

A 2D slice object belongs to a 3D image object. It describes a planar slice through the 3D data of the image. More particularly, the slice is planar in the pixel coordinates of the image, not the world coordinates. The outline of the slice plane is shown in the 3D plot—this will be curved, according to how the 3D image is curved in world coordinates. The 3D image data intersected by the 2D slice is shown in a separate 2D plot. A 2D slice is always oriented vertically and can be rotated about the Z axis. It extends over the full depth of the 3D image but its lateral extent can be controlled. It can also be repositioned within the 3D image.

Figure 40:
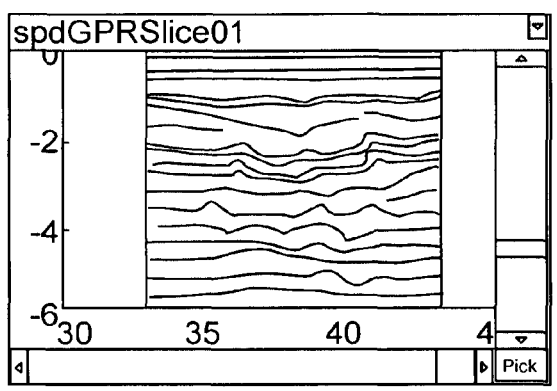

Below are details on how to work with 2D Slices, including the following: creating 2D Slices, 2D slice interaction in the 3D plot, 2D slice interaction in the 2D plot, 2D slice dialog box, spd2DSlice object, and Matlab functions for 2D Slices. A 2D plot of a 2D slice, such as that shown in FIG. 40, shows a slice through the 3D image as depicted by the wire-frame outline shown in the 3D plot. The vertical slider shown in FIG. 40 adjusts the position of the slice plane in the direction normal to the slice plane. The horizontal slider adjusts the rotation of the slice plane about the Z axis. When the horizontal slider is adjusted, the vertical slider will be repositioned to its central position. When either slider is used, the position of the slice wire-frame will be updated in the 3D plot. The range of the vertical slider is limited to avoid memory issues. Note that repositioning the 2D slice within the 3D plot and then reselecting the slice into a 2D plot will allow other parts of the image to be seen.

Figure 41:
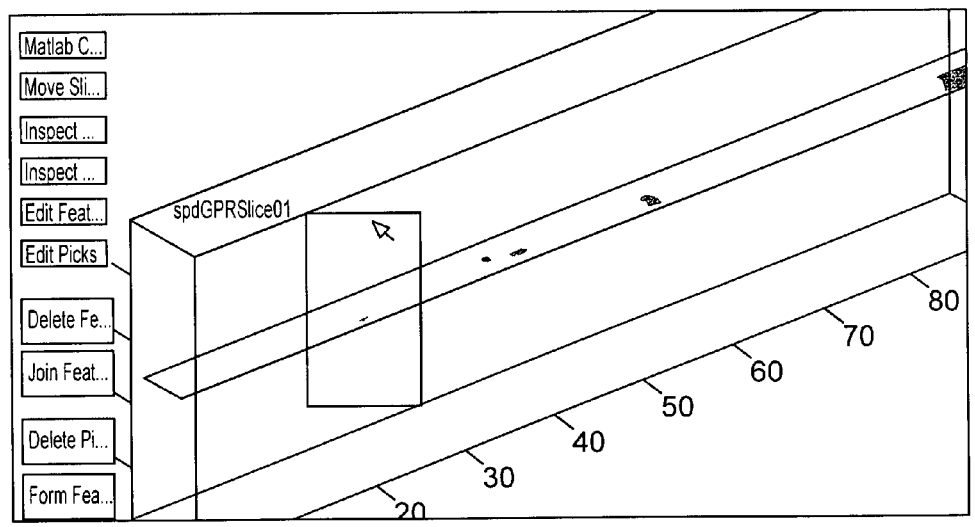

Features concerning 2D slices in the 3D plot will now be described with reference to FIG. 41. Selecting the 'Move slice' button (as is partially shown in FIG. 41 in the upper left hand region) allows the following interactions with the 3D plot. Clicking down and holding the left mouse button near either of the vertices on the top edge of the slice plane in the 3D plot allows it to be dragged, changing the rotation and lateral extent of the slice plane. Clicking down and holding the left mouse button near the center of the top edge of the slice plane in the 3D plot allows it to be dragged, changing the (X,Y) position of the slice plane. When a 2D slice is moved, it will be removed from any 2D plot in which it is shown. This will enable the 2D slice to be repositioned rapidly, perhaps in several steps, without the user being slowed down by reloading the slice into the 2D plot.

Figure 42:
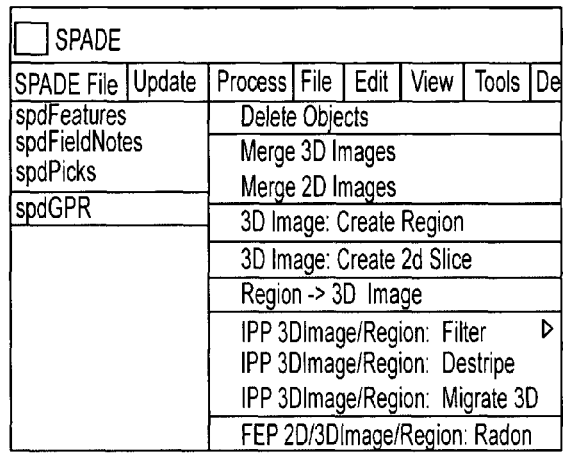
Figure 43:
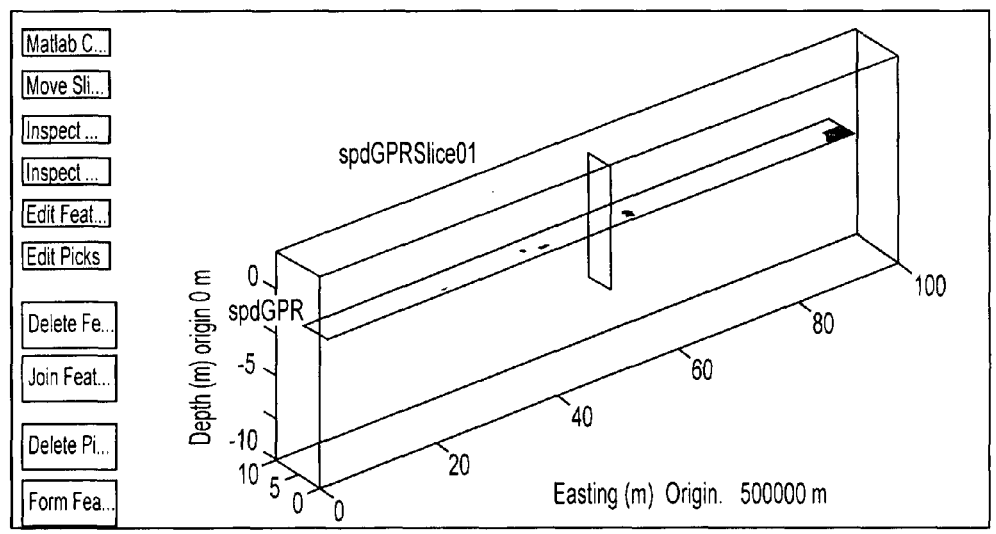

2D Slices can be created either through the menu shown in FIG. 42 or by the command spd2DSliceCreate, which is discussed below. If created through the menu of FIG. 42, the slice will be created in the center of the 3D plot, as is shown in FIG. 43. Only the outline and name of the slice are shown in the 3D plot. The data in the slice can be viewed in a 2D plot. The position and orientation of the slice can be changed either by dragging the outline in the 3D plot or by the sliders of a 2D plot.

A 2D Slice dialog box controls the appearance of the selected 2D slice in both the 2D plot(s) and 3D plot, in the following ways. A 'Show Identifier' checkbox enables or disables the text string describing the 2D Slice in the 3D plot. A 'Show Slice' checkbox enables or disables plotting of the slice wire-frame in the 3D plot. A 'Color Bar' pick-list selects the desired color bar for the 2D Slice in the 2D plot. Clicking a 'Color Map' 'Launch' button opens a color map dialog box to edit the color map for the 2D Slice. This color map affects the 2D slice 2D plot.

As was discussed above, 2D Slices can be created by a particular command, spd2DSliceCreate in this example. The 2D slices function invoked the command spd2DSliceCreate creates a new 2D slice object that includes a name, a variable name of the parent 3D image, and an axis, which is a 2×1 array with the pixel coordinates of the top-centre of the slice. Other 2D slices functions include delete, draw, update data, and update display functions.

Each 2D Slice is stored in a individual spd2DSlice object. When a 2DSlice is created, a new variable is created in the base workspace. The object will be shown in the Object List as a sub-object of the 3D Image to which is belongs. Generally, GUI actions that affect 2D Slices can also be performed by application (e.g., Matlab) function calls. The structure of the spd2Dslice object is as follows:

| Variable | Field | SubField | Type |
| --- | --- | --- | --- |
| spd2DSlice. | type | | enumSpadeType = '2DSlice' |
| | ID | | string = variable name |
| | parent | | string |
| | data | axis(2) | double |
| | | extent | double |
| | | angle | double |
| | | x(:) | double |
| | | y(:) | double |
| | | z(#sample) | double |
| | display. | showID | enumOnOff |
| | | showSlice | enumOnOff |
| | | color | enumColor |
| | | colorBar | enumColorBar |
| | | colorMap | colorMap |
| | handles3D | outline | handle |
| | | ID | handle |
| | handles2D | slice | handle |

Parent is the variable name of the 3D object to which the 2D Slice belongs, data.axis, data.extent and data.angle describe the geometry of the slice in pixel coordinates for the parent image, and data.x and data.y give the x,y coordinates of the points along the top edge of the slice. Note that display.color is inherited from the parent 3D image. When a 2D slice is shown in a 2D plot, the following application data is stored with handles2D.slice:

| | |
| --- | --- |
| voxel(#scan,#channel,#sample) | double |
| x(#scan,#channel) | double |
| y(#scan,#channel) | double |
| z(#sample) | double |
| axisInit(2) | int |
| axisInit(2) | int |

| | | |
|---|---|---|
| axisVoxel(2) | | int |
| slice(:,:) | | double |

Voxel is a buffer of data taken from the parent 3D image, axisInit is the value of data.axis at the time of starting the 2D plot, axisVoxel is the voxel i,j co-ords corresponding to axisInit, slice is the slice data to be plotted; display.colorBar and display.colorMap determine how to convert this to the Cdata property for handles2D.slice. When a slice is being dragged around the 3D plot, a temporary object is added to spade to keep track of its state:

| | | | |
|---|---|---|---|
| spade. | 2DSliceMove. | sliceName | string = variable name of 2D Slice |
| | | motion | enumMotion |

Three Dimensional (3D) Images

Three dimensional images are images generated from sensors for which there is depth information, for example data from GPR sensors. When a 3D Image is imported, it is displayed in the 3D plot. It may also be displayed in either of the 2D plot windows, if desired. The display properties of the 3D Image can be modified via the dialog box. Below are details on how to work with 3D Images, including importing 3D images, 3D Image interaction in the 3D plot, 3D Image interaction in the 2D plot, 3D Image dialog box, spd3DImage object, Matlab functions for 3D Images, loading SPADE generated 3D Images, information about file storage for 3D Images, memory issues and data storage, image processing and feature wxtraction, and an example of a 3D Image session.

The shadow of a 3D image can be plotted in a 2D plot by selecting its object name from the pick list of the relevant 2D plot window. The 2D plot of the 3D image, such as that show in FIG. 44A, will show the shadow in a range of x,y values around the center of those shown in the 3D plot and the outline of the data displayed in the 2D plot will appear in the 3D plot. The shadow in the 2D plot is typically not downsampled, unlike the shadow in the 3D plot.

Figure 44A:
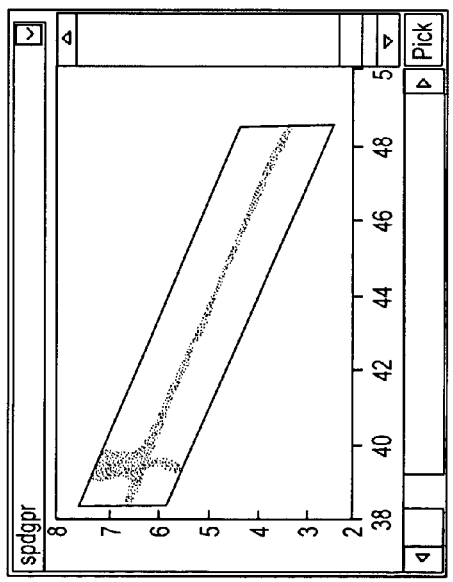

The vertical slider shown in FIG. 44A controls the Zmid value, and the horizontal slider will control the Zthick value. Together these values control the depth (z-axis direction) over which the shadow is calculated. The shadow is calculated over [Zmid−0.5*Zthick, Zmin+0.5*Zthick]. The values used for Zmid and Zthick can be obtained by hovering the mouse cursor over the slider handle in each case (as demonstrated in FIG. 44A).

Figure 44B:
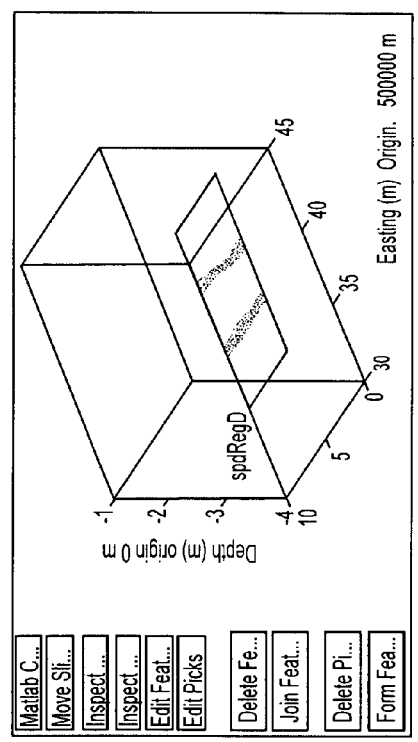

The 3D image, such as that shown in FIG. 44B, is always present in the 3D plot as long as the object remains. The display properties for the 3D image can be modified by can be double-clicking on the relevant 3D image object in the object list. Note that the shadow of the 3D image displayed in the 3D plot has been down-sampled to reduce memory requirements.

A 3D Image/Region Copy menu allows the user to make a copy of a 3D image (or if a region is selected, the part of the 3D image defined by the region). This menu provides three options: Straight copy—useful if the user wishes to extract a small part of an image for processing; Copy with absolute values, for example if we are only interested in the magnitude of the signal; Copy, but with subregions zeroed out, for example if the data is corrupted on certain channels. The user specifies the indices of the region(s) to be zeroed.

Figure 45:
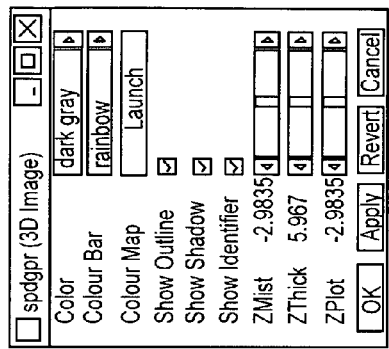

A 3D Image dialog box, shown in FIG. 45, controls the appearance of the selected 3D image in both the 2D plot(s) and 3D plot. This dialog box provides the following controls. The 'Color' pick-list selects the color of the outline around the 3D Image in the 3D plot (and 2D plot, if present). The same color is also used in the outline of any 2D slice or region associated with the 3D image. The same color is also used for the text labels associated with the 3D image, 2D slice and region (if present) in the 3D plot. The 'Color Bar' pick-list selects the desired color bar for the 3D image. This affects both the 3D and 2D plots. Clicking the 'Color Map' 'Launch' button opens a color map dialog box to edit the color map for the 3D image. This color map affect the 3D image in the 3D plot and 2D plot (but not 2D slices).

The 'Show Outline' checkbox enables or disables the outline around the 3D Image in the 3D plot. The 'Show Shadow' checkbox enables or disables plotting of the shadow of the 3D Image data in the 3D plot. The 'Show Identifier' checkbox enables or disables the text string describing the 3D Image in the 3D plot. The 'ZMid' and 'ZThick' sliders control the depth (z co-ord) over which the shadow is calculated. The range is given by [Zmid−0.5*Zthick, Zmin+0.5*Zthick]. The 'ZPlot' slider controls the depth (z co-ord) at which the shadow of the 3D image is plotted in the 3D plot.

A number of 3D image functions are provided. An import function imports the data of a file, such as a GRP data file (dztfile), in a new object with variable name, varName. A mapping data file, mapfile, contains the positions of the data points in dztfile, and a variable, vsep, is the vertical separation between samples, in meters. A load function loads the saved 3D Image with a name, varName. A delete function deletes the 3D Image with variable name varName. A merge function merges 3D Image objects named inName1, inName2, etc. and makes a new 3D Image object named outName. This object is displayed in the 3D plot and a variable created in the base workspace. The function merges 3D images by resampling them onto a common grid, thus creating a new 3D image. A draw function draws a 3D image named varName in 2D plot number iPlot.

A create function creates a new 2D slice for a 3D image, with varName as the variable name of the 3D image, and axis as a 1×2 array with the pixel co-ords of the top-centre of the slice. Another create function creates a new region for a 3D image, with varName as the variable name of the 3D image. The extent of the region is set to the whole image initially. An update function updates the 3D and 2D plots of the 3D image with new display settings, with varName as the variable name of the 3D image and display is a struct with one or more of the object's display parameters.

The SPADE tool provides for merging of 3D images. The function spd3DImageMerge(outName, inName1, inName2, . . . ), discussed above, merges the 3D Image objects named inName1, inName2, etc. and makes a new 3D Image object named outName. The steps are as follows:
  1. A rectangular grid of nodes is calculated such that:
      the orientation and grid spacing are based on the first input image, inName1;
      the grid is made large enough to include all of the input images.
  2. This grid is split into a number of blocks such that the size of data in each block matches the file-size parameter. To reduce memory requirements each block may be calculated in turn.
  3. Each block is initialized to zero and then the data from each input file are added one after another. For each input file:

For each node of the input image, the nearest node of the output grid is calculated, and the value of the input datum copied to this node.

The polygon defining the outline of the data in the input file is calculated and any nodes within this polygon are filled by nearest-neighbor interpolation between the nodes filled in the previous step. Note this interpolates between data points within the same input image, but not between data points in different input images. Other interpolation schemes may be used.

4. The completed block is dumped to file and the next block is calculated.

This function can also be used to resample an image onto a rectangular grid if called with only one input image. Merged images saved to file can be loaded.

Each 3D Image imported is stored in an individual spd3DImage object. When a 3DImage is imported, a new variable is created in the base workspace. The object will be shown in the Object List. GUI actions that affect 3D Images may also be performed by underlying application function calls.

The object spd3DImage is a structure with the following fields:

| Variable | Field | SubField | Type |
|---|---|---|---|
| spd3DImage. | type | | enumSpadeType = '3DImage' |
| | ID | | string = variable name |
| | dztFile | | string |
| | mapFile | | string |
| | tempFile{:} | | string |
| | data | x(#scan,#channel) | double |
| | | y(#scan,#channel) | double |
| | | z(#sample) | double |
| | | histNSigned(:) | double |
| | | histValSigned(:) | double |
| | | histNUnsigned(:) | double |
| | | histValUnsigned(:) | double |
| | slices{:} | | string |
| | regions{:} | | string |
| | display. | color | enumColor |
| | | showOutline | enumOnOff |
| | | showShadow | enumOnOff |
| | | showID | enumOnOff |
| | | zMid | double |
| | | zThick | double |
| | | zPlot | double |
| | | colorBar | enumColorBar |
| | | colorMap | colorMap |
| | handles3D | shadow | handle |
| | | outline | handle |
| | | ID | handle |
| | handles2D | shadow | handle |
| | handles2D | outline2D | handle |
| | | outline3D | handle |

The field types dztFile (GPR data file) and mapFile (mapping data file) are the filenames of the voxel and map data for the 3D image. Note that 3D Image objects do not include any of the voxel data. These are preferably only read in from the GPR data file (dztFile) as needed, to reduce memory requirements. If dztFile is an empty string, then it indicates that the 3D Image object has been generated from within SPADE, for example as a result of merging images or from one of the image processing functions.

The subfields histNSigned and data.histValSigned store histogram info for the voxel data for the whole 3D image, which is used when setting the colorMap for 2D slices. Subfields data.histNUnsigned and data.histValUnsigned store the corresponding info for the absolute values of voxel data, which is used when setting the colorMap for the shadows of 3D Images. The fields slices and regions are cell arrays containing the variable names of the 2D slices and regions associated with the 3Dimage object.

Subfield handles2D.outline2D is the handle of the outline of the shadow in the 2D plot. The shadow in the 2D plot only covers a subset of the full image, the extent of the 2D shadow is shown in the 3D plot: handles2D.outline3D is the handle of this extent. The following application data is stored with handles3D.shadow:

| | |
|---|---|
| voxel(#scan,#channel,#sample) | uint16 |
| X(#scan,#channel) | double |
| Y(#scan,#channel) | double |
| Z(#sample) | double |
| shadow(#scan,#channel) | double |

The voxel, X, Y, and Z data may be subsampled from the image to allow the 3D shadow to be redrawn quickly, and shadow contains the actual shadow data: display.colorBar and display.colorMap determine how to convert this to the Cdata property for handles3D.shadow. It is noted that voxel data are stored as 16-bit unsigned integers, since this uses only a quarter the number of bytes of the equivalent data stored as doubles, and are only converted to double precision when required. They are stored as unsigned (as opposed to signed integers) to match the format of the GPR data file: to obtain the true value, $2^{15}$ should be subtracted from the uint16 voxel data.

When a 3D Image object is shown in a 2D plot, the following application data is stored with handles2D.shadow:

| | |
|---|---|
| voxel(#scan,#channel,#sample) | uint16 |
| X(#scan,#channel) | double |
| Y(#scan,#channel) | double |
| Z(#sample) | double |
| shadow(#scan,#channel) | double |

As in the previous example, the voxel,X,Y,Z data may be subsampled from the image to allow the 3D shadow to be redrawn quickly, and shadow contains the actual shadow data: display.colorBar and display.colorMap determine how to convert this to the Cdata property for handles3D.shadow.

Figure 46:
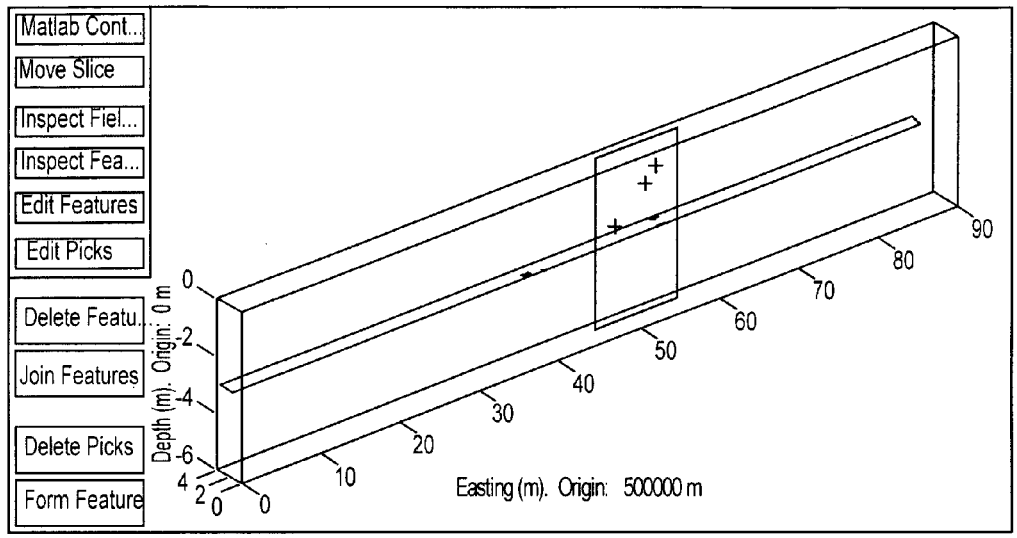

The 3D plot, as show in FIG. 46, can show all SPADE objects in the system and is primarily intended for navigational purposes. A set of buttons next to the 3D plot shown in FIG. 46 allows the user to interact with the data. The buttons include the following: Matlab controls, Move slice, Inspect Field Notes, Inspect Features, Edit Features, and Edit Picks. The coordinates of the 3D plot are relative to an origin. Clicking the Update→Origin menu item allows the user to specify new values for the origin. Default values are provided which correspond to the center of the currently displayed data, rounded to the near kilometer.

The Matlab Figure controls, in this embodiment, can be used to pan, zoom and rotate the 3D plot, among other manipulations. A Color Map dialog box allows the user to control the mapping between data point ranges (horizontal axis) and color (vertical axis). The mapping is linear with saturation, as shown by the line in purple. The two data points which define the mapping may be dragged around by holding down the left mouse button near a point, dragging it to the desired position, then on release of the left mouse button the color map will update.

The units of a 3D Image can be converted using a menu option. This menu option allows the user to find the position (x,y,z) of pixel with indices (i,j,k), or vice versa. It creates a new window. The user can select a 3D image and then enter the pixel indices. The position will then update. Alternatively, the user can enter a position and the window will return the indices of the nearest pixel. In both modes, the function will snap to the nearest pixel. The displayed position takes into account the origin. The SPADE tool provides an import data facility. If necessary, the Update-→Origin menu option is used to set the origin.

The following discussion provides an example of how the various SPADE functions can be combined to expose the features present in an EM image. An example GPR session can be found later in this disclosure. A given Radon transform may be dominated by signals from man-hole covers, for example. A process is needed to remove the data points corresponding to these. One way to do this is by a Principal Component Analysis (PCA) of the data, achieved using a Process→2D Image: Scale/Transform menu option and selecting PCA.

Figure 47:
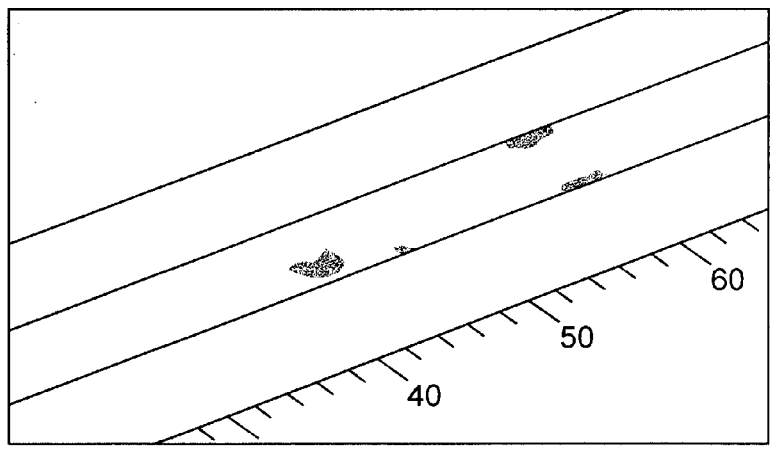

The 3D plot shown in FIG. 47, for example, shows the first principal component (i.e., the strongest, that with the greatest eigenvalue), zoomed into the region of interest. The third component may also of interest since the man-hole covers stand out particularly well as dark regions in this component. It is noted that the color map may been changed from rainbow to bone as this makes it more obvious which are regions of low intensity.

Figure 37:
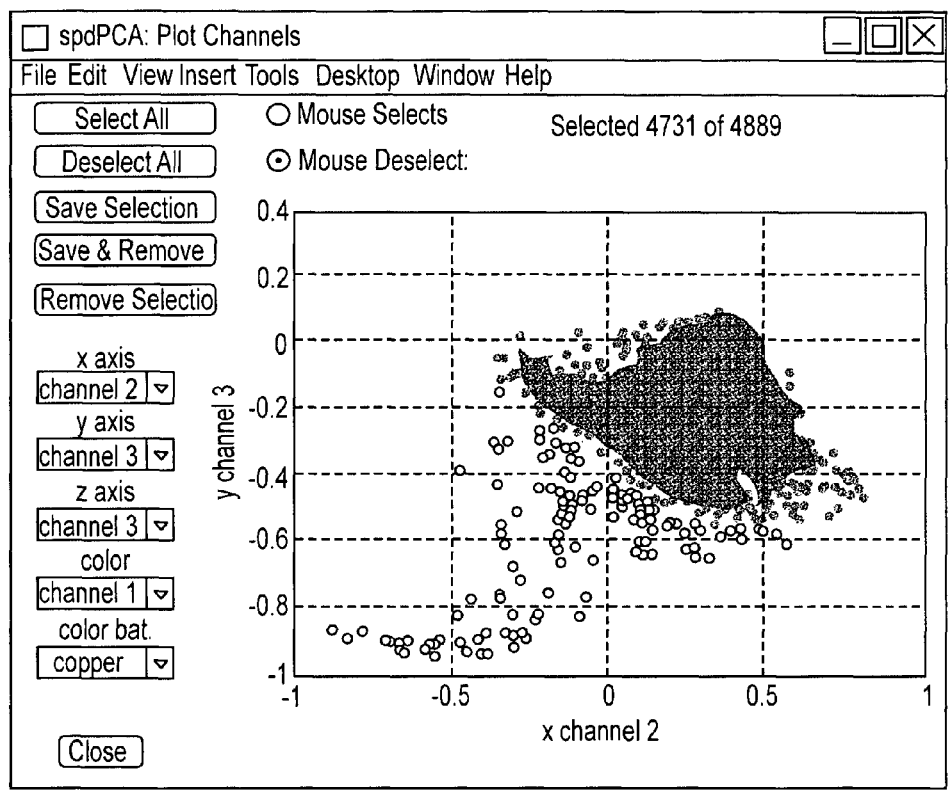
FIG. 37 shows a plot of multiple channels of data in a principal component analysis via the SPADE GUI in accordance with embodiments of the present invention.

The data can be examined using a Process→2D Image: Plot Channels menu option. FIG. 37, discussed previously, plots channel 2 (i.e., the second strongest component of the PCA) against channel 3 (third strongest component). In this illustrative example, the majority of the data points, as indicated by the circles with filled interiors, has been selected. The unselected data points (circles with white interiors) are those judged to be anomalous in that they fall outside the main data cluster. They also correspond to low values of the third principal component, which was previously linked to the man-hole covers wish to be excluded. The selected data points may then be extracted and saved to form a new image PCA_pruned.

Figure 48:
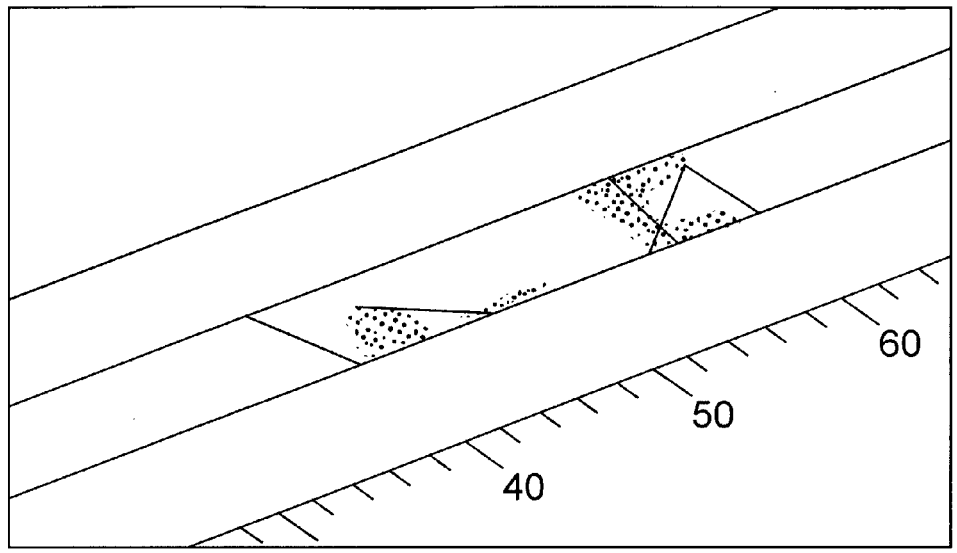

When the Radon transform of this is taken, it produces the features shown in FIG. 48. FIG. 48 shows that two pipes have been found. The Radon transform has also identified three spurious features around the man-hole covers, whose edges are still visible. These features could possibly be removed by being more aggressive during data selection and excluding more of the data points (i.e., those corresponding to the edges of the man-hole covers). Alternatively, adjusting the parameters of the Radon transform results in fewer unwanted features.

The Radon transform searches for linear features in an image. The 3D plot shown in FIG. 48 may be adjusted to provide a scaled image, zoomed into the region of interest, with the features found by the Radon transform superimposed as black lines. In this illustrative example, it has found one of the pipes at x=34, but has missed the one at x=52, instead forming a feature by joining the two man-hole covers at x=55.

Figure 49:
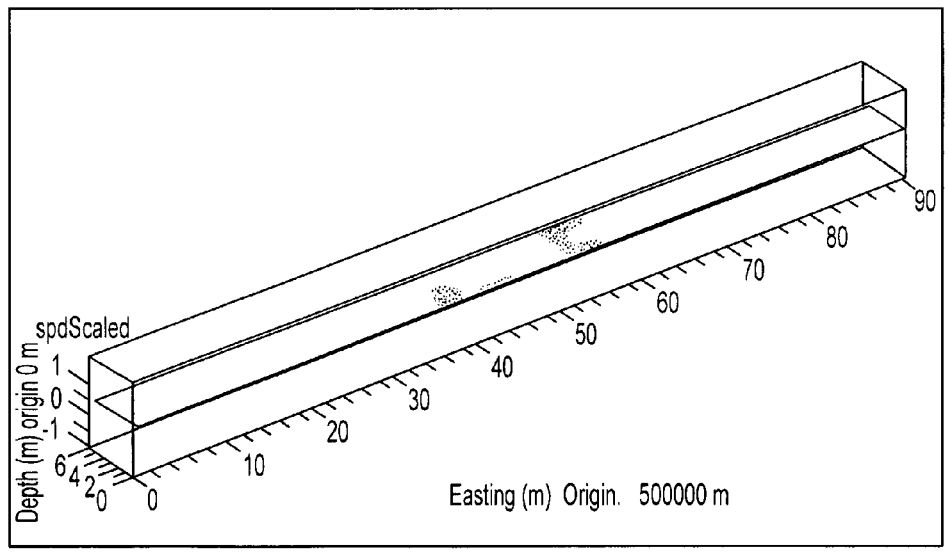

In this example, the imported image is dominated by a couple of very strong features (thought to be man-hole covers) and not much more detail is visible. It is useful to scale the image to bring out the weaker features. Not only does this make features more visible to the eye, but will help the subsequent image processing and feature extraction functions. The scaling chosen is such that the value, x, of each channel at each point is replaced by the value asinh(x/10). This is achieved using the Process→2D Image: Scale/Transform menu option. The 3D plot of FIG. 49 shows the scaled image. Several linear features are visible running across the swath.

Another feature allows the user to 'destripe' the region that has been defined. This is achieved by selecting the newly created region in the object list and using the Process→IPP 3DImage/Region: Destripe menu option. The merged image is no longer needed, so it can be deleted using the Process→Delete Objects menu option. If at any time the user wants to reload this or any other SPADE-generated image, the SPADE File→Load Saved Images menu option can be used.

Figures 50, 51:
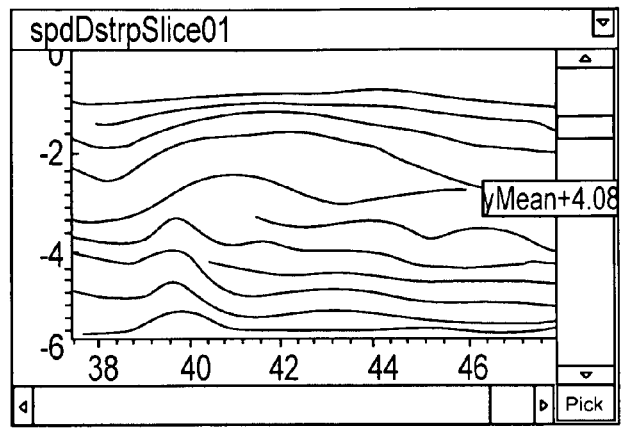

At this point the destriped image can be inspected and may be found to contain some corrupted pixels. FIG. 50 shows a slice through the data as viewed in the 2D plot. At depths greater than about 2.5 m the preprocessing has introduced artifacts on the channel at y=4.08 meters, which may interfere with subsequent image processing functions, so should be removed.

First, the indices of the offending pixels are identified. The conversion from position in meters to indices can be done using the Process→3D Image:Convert Units menu option. This shows that the affected pixels have channel index j=35 and depth index k>=215, in this illustrative example. Two other channels (i=7 and 21) were found to be similarly affected. This is explained by the fact that the data for the 42 channels were collected using three swaths, and on each swath the seventh sensor element was faulty. To zero out these three channels at depth, a Process→Copy 3D Image/Region→Copy with Zero Pixels menu option may be selected, as shown in FIG. 51.

Figure 52:
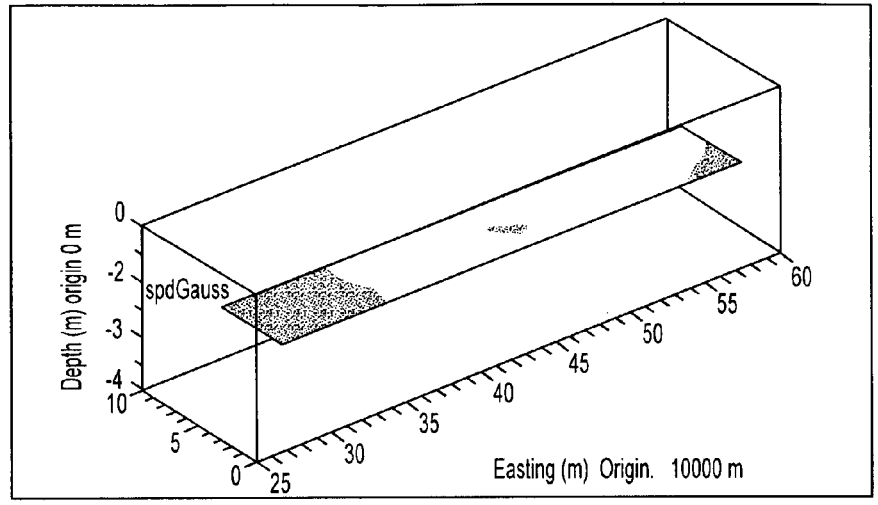

Before invoking the Radon transform, it is useful to low-pass filter the image to reduce the effect of noise. This is done using a Gaussian filter. Since the features show up as adjacent bands of positive and negative amplitude, it is necessary to convert the pixel values to their absolute values to avoid cancellation when filtering. The shadow of the resulting image is shown in FIG. 52. The shadow shown in FIG. 52 excludes the top ~1.5 meter of the image as this is very noisy, in order to show more clearly the deeper structures.

According to this illustrative embodiment, importing 3D images requires 3 things: a GPR data file, a mapping data file, and an estimate of the vertical separation of points. Once these files/parameters are available, the data can be imported. Three GPR data files are preferably used. The GPR data files typically do not come with corresponding map files. Therefore, mapping data files have to be generated for each of the GPR data files. It should be noted that under normal circumstances, mapping data files will already be present and the user should not have to generate them.

First, the amount of data in each GPR data file is determined by reading the header of the GPR data file. In this example it is assumed that the survey runs due east (bearing of 90 degrees) from an origin of (x0, y0)=(10000, 5000), with each of the GPR data files running parallel to each other. A utility function can then be used to generate the map files, where the value of y0 and swatheLength variables is derived from the number of channels and number of scans. The vertical separation between samples is initially assumed to be 11.7 mm, but this value is typically modified during migration.

Figure 53:
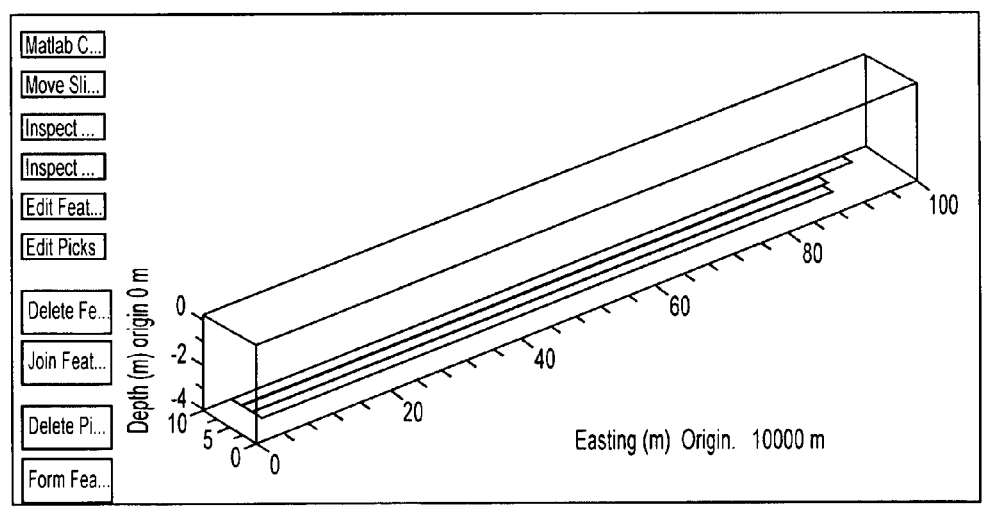

In the illustrative example shown in FIG. 53, three datasets are imported into SPADE. Alternatively, an XML file can be written allowing the three files to be imported using a SPADE File→Import Images menu option. At this point, the Update→Origin menu option may be used to set the origin.

Figure 54:
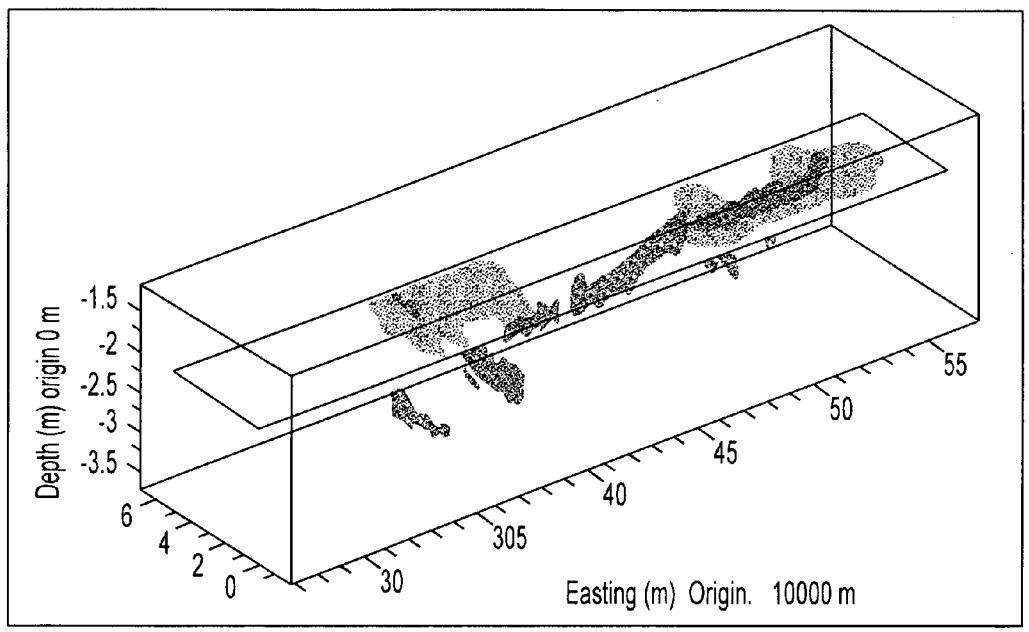

The following discussion provides an example of how the various SPADE functions can be combined to expose the features present in a GPR dataset. An Isosurface FEP process is computationally expensive, so the image may first be down-sampled. The isosurface FEP may then applied to the down-sampled image. This is very successful at finding elongated surfaces as shown in FIG. 54. FIG. 54 is the standard 3D view, which may be rotated to view from directly above, and with the shadow placed below the surfaces.

Figure 56:
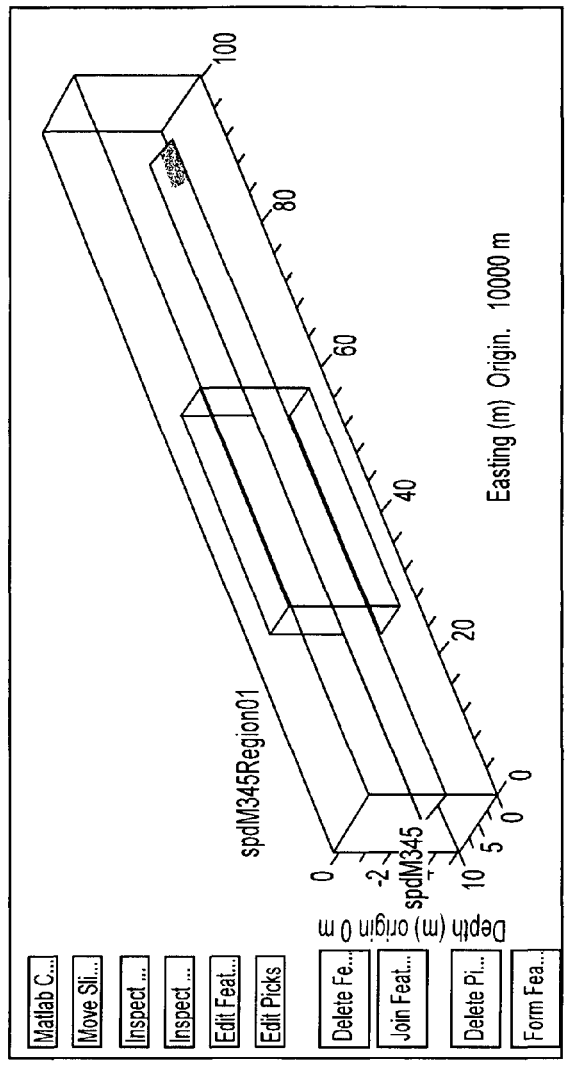
Figure 55:
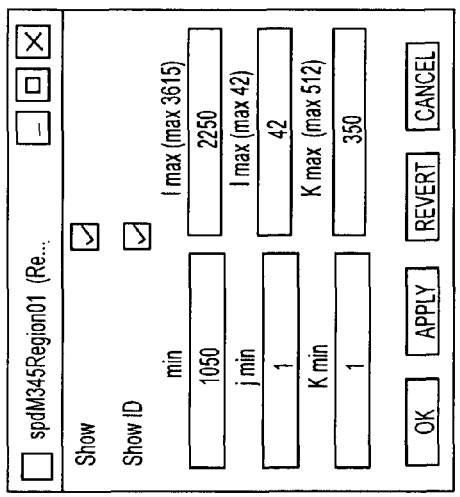

The three images can be merged by selecting them in the ObjectList and then using a Process→Merge 3D Images menu option. The three original images are no longer needed, so they can be deleted. The previous study identified the region of greatest interest. The Process→3D Image: Create Region menu option, shown in FIG. 55, can be used to create a region within the merged image. The region is then limited to the region of interest, as is shown in FIG. 56.

Migration collapses the diffraction hyperbolae to hopefully point sources. It is quite sensitive to the depth spacing of samples. Previously, it was determined that the optimum spacing was 5 mm. When the data was imported, a vertical spacing of 11.7 mm was specified, so this is corrected by decreasing the depths by a factor of 0.434. This may be accomplished using the Process→IPP 3DImage/Region. Migrate 3D menu option and entering a value of 0.434 for the z stretch factor.

Figure 57:
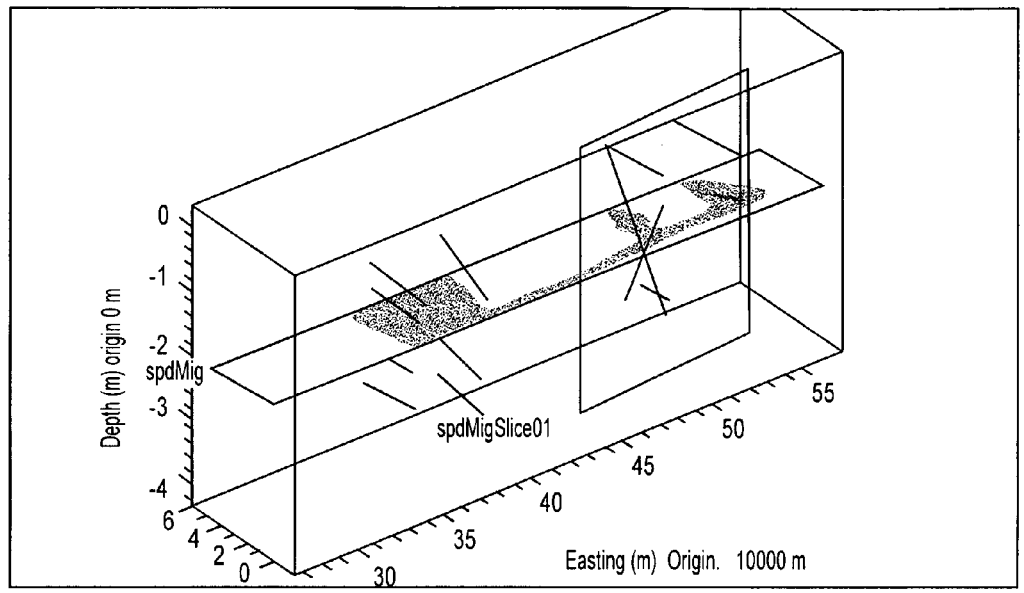
Figure 58:
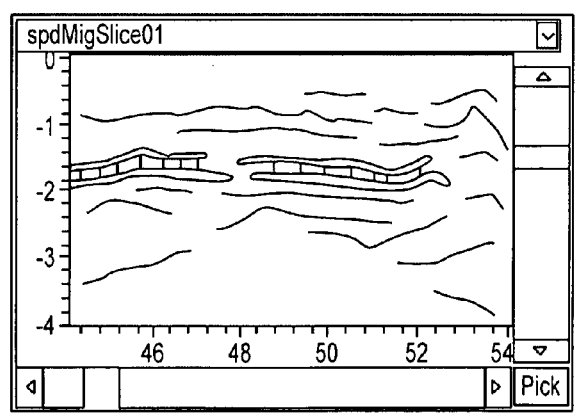
Figure 59:
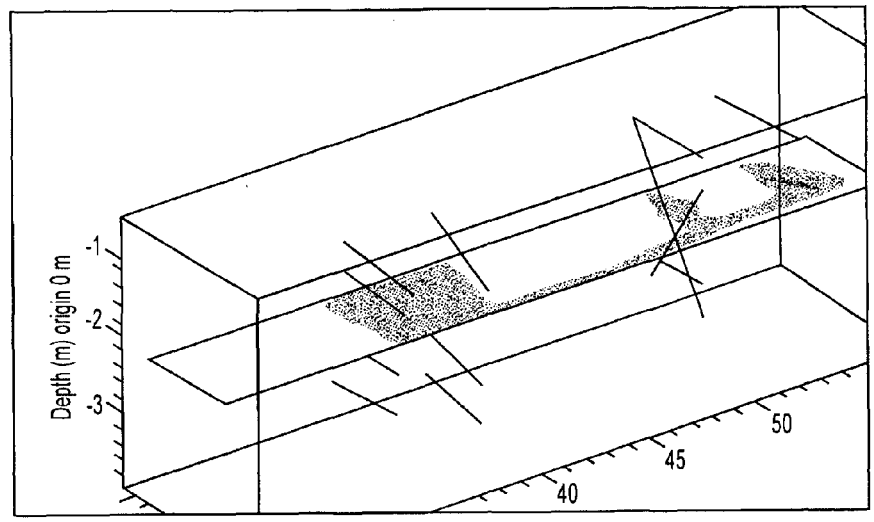

The SPADE tool provides for manual feature picking. A slice within image file spdMig is created and aligned with the feature that the Radon processing missed, as shown in FIG. 57. Displaying this slice in one of the 2D plots allows picks to be made (shown as red circles in FIG. 58). These can then be joined to form a feature within the 3D plot, shown in black in FIG. 59. The features can be saved. Alternatively, the isosurface FEP function can be used to pick out the features.

Images may be subject to Radon Transform, such as by using a menu option Process→FEP 2D/3DImage/Region. Radon which causes the image to be Radon transformed. Once SPADE has found the candidate linear features, it assigns a score to each feature, based on how strong it is. SPADE then creates a new figure and displays the features found. The user can then use a slider to select how many of the features to keep, the features with the lowest scores being removed first. Closing the window causes the features selected to be added to the 3D plot. The Radon process is quite successful in picking out the features running perpendicular to the swath, but may miss long linear feature running roughly parallel to the swath.

A dialog box for controlling the display properties of any SPADE object can be launched by double-clicking on the object in the Object List. In general, when a setting is changed in the dialog box, the 3D plot and (if applicable) 2D plot are updated immediately. Each dialog box has four buttons at the bottom: OK: close the dialog box and keep the current display settings; Apply: store the current display settings in the "undo" buffer; Revert: return to the display settings to those at the time of the last "Apply" or the start of the dialog box; and Cancel: Revert and close the dialog box.

Features represent possible buried objects: pipes, cables, etc. Each feature is described by: (1) a 3D polyline, which describes the location of the feature; (2) its "source", e.g. 'RADAN', 'Surfer', 'SPADE', 'user,' and (3) its "explanation", a free text field that describes the evidence for the feature (e.g., how it relates to field notes) and its likely identity, e.g. 'Feature seen in GPR, not EM. Runs between two sewer drains. Likely to be a sewer lateral.'

Figure 60:
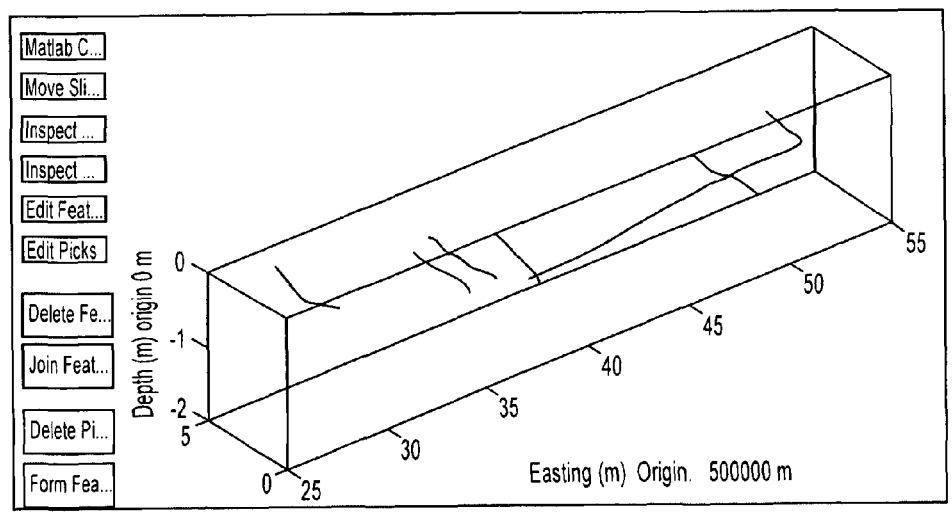

A significant benefit of using the SPADE tool is helping the user identify features in sensor images and provide good explanations for them. FIG. 60 shows features in the 3D plot. Features in the 3D Plot are shown as polylines, color-coded by "source." The display settings are configured by double-clicking on the spdFeatures object to bring up the Features dialog box. Two of the 3D Plot buttons relate to the following features: Inspect Features—view the source and explanation of features; and Edit Features—delete and join features.

Figure 61:
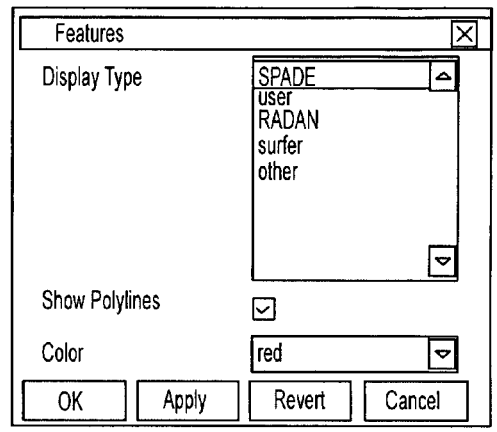

FIG. 61 shows the Features dialog box. One or more display types may be selected from the list box. The Show Polylines and Color controls apply to the selected types. The user may click on the "Edit Features" button next to the 3D Plot of FIG. 60 to enable these functions.

Clicking on a feature will toggle its selection. Selected features will appear with thicker polylines. Clicking on the "Delete Features" button will delete all selected features. Selecting the spdFeatures object from the Object List and using the Process→Delete Objects menu item will delete all features in the system. Features can also be deleted using the command spdFeaturesDelete.

Clicking on the "Join Features" button shown in FIG. 60 will create a new feature by joining all of the selected features. The selected features remain selected and are not deleted. The features are joined in the order in which they were selected. The first and second features are joined by a straight line between their nearest endpoints. The unjoined end of the second feature is then joined by a straight line to the nearest endpoint of the third feature, and so on. The explanation given to the joined feature is just the concatenation of the explanations of the selected features (and therefore will probably need editing). Features can also be joined using the command spdFeaturesJoin.

Features can be exported in either DXF or XML format. Note that DXF files only describe the polyline for each feature; XML also describes the "source" and "explanation". From the GUI, features can be exported using the 'SPADE File→Export DXF Features' or 'SPADE File→Export XML Features' menu items. This asks the user to specify a filename. Features can also be exported via the command line, using either spdFeaturesDXFExport or spdFeaturesXMLExport.

Features are imported as .DXF or .XML files. From the GUI, features can be imported using the 'SPADE File→Import Features' menu item. This asks the user to specify an .XML or .DXF file. If a .DXF file is imported, the user is asked to specify the source and an explanation that will be applied to all of the features. Features also be imported via the command line, using either the command spdFeaturesDXFImport or spdFeaturesXMLImport. When features are imported, they are added to the spdFeatures object and added to the 3D plot.

Figure 62:
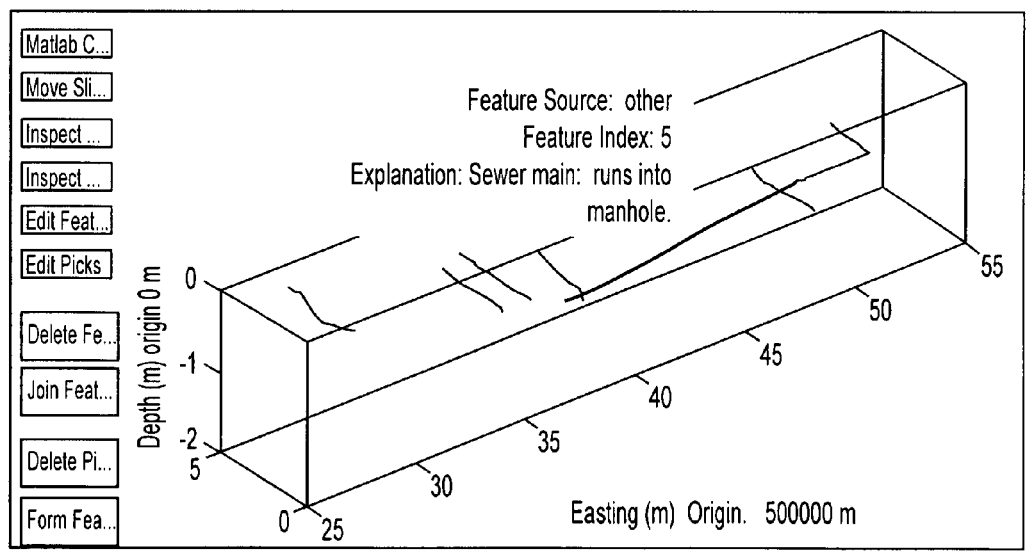

Clicking on the "Inspect Features" button next to the 3D plot in FIG. 62 enables this function. When the mouse is held down over a feature, a text box is popped up that display the index of the features, its source and explanation. The polyline for the feature is also made temporarily thicker. Pressing any key when this text box is shown enables the user to edit the explanation.

It will, of course, be understood that various modifications and additions can be made to the preferred embodiments discussed hereinabove without departing from the scope of the present invention. Accordingly, the scope of the present invention should not be limited by the particular embodiments described above.

What is claimed is:

1. A method for use with a user interface comprising a display, the method comprising:
providing a plurality of sensor data sets acquired during movement of a plurality of disparate types of sensors configured for sensing of a subsurface along a path via a movable platform, each of the sensor data sets comprising sensor data samples each associated with geographic position data acquired by a positioning sensor situated on the moveable platform;
providing positional offset data defining a positional offset of each sensor relative to the positioning sensor;
correcting for curvilinear dynamic motion of the movable platform using the positional offset data to produce corrected sensor data sets;
associating the geographic position data with the sensor data samples of each of the corrected sensor data sets relative to a reference frame; and
displaying a graphical representation of each of the corrected sensor data sets overlaid within a volume depicted on the display.

2. The method of claim 1, wherein the geographic position data of the sensor data samples comprises x and y geographic locations for each of the sensor data samples.

3. The method of claim 2, wherein geographic position data of the sensor data samples for at least one of the sensor data sets further comprises a depth value for each of the sensor data samples.

4. The method of claim 1, wherein the graphical representations are displayed within the volume relative to a fixed geographic reference.

5. The method of claim 1, wherein the geographic position data is associated with x and y locations of a global reference frame, a local reference frame, or a predefined reference frame.

6. The method of claim 1, wherein displaying the graphical representations comprises aligning sensor data samples of each of the corrected sensor data sets by their respective x and y geographic locations.

7. The method of claim 1, comprising:
receiving position sensor data comprising the geographic position data for a plurality of discrete geographic locations subject to subsurface sensing; and
assigning the geographic position data to the sensor data samples of each of the sensor data sets.

8. The method of claim 1, further comprising:
algorithmically identifying one or more features in the geographically aligned sensor data sets;
performing a data fusion function on the one or more features; and
producing a graphical indication of the one or more features.

9. The method of claim 8, wherein algorithmically identifying the one or more features comprises comparing the one or more features to a library of feature templates, the feature templates comprising response characteristics for a plurality of known features.

10. The method of claim 1, wherein the graphical representations of the corrected sensor data sets are selectably individually viewable within the volume and displayed in geographical alignment relative to one another within the volume in accordance with the geographic position data of the sensor data samples of each of the corrected sensor data sets.

11. The method of claim 1, wherein:
the geographic position data is acquired relative to a location on the platform other than at a location defined by a plane passing through an axle oriented generally transverse to a longitudinal axis of the platform or relative to a location at the geometric center of the platform; and
the plurality of sensor data sets is obtained at the platform as the platform traverses the path.

12. The method of claim 1, further comprising:
providing field note data representative of one or more known or manually observed features within the subsurface; and
displaying a graphical or textual representation of the field note data within the volume.

13. The method of claim 12, wherein the field note data comprises associated x and y geographic location data, and the graphical or textual representation of the field note data are displayed within the volume at one or more locations corresponding to the associated x and y geographic location data.

14. The method of claim 1, further comprising:
providing feature data representative of the one or more features within the subsurface; and
displaying a graphical or textual representation of the feature data within the volume.

15. The method of claim 1, further comprising:
providing point marker data representative of one or more points manually picked from images of data developed using one or more of the subsurface sensors; and
displaying a graphical or textual representation of the point marker data within the volume.

16. The method of claim 1, wherein the volume depicted on the display is defined by a length, a width, and a depth, the length and width respectively representative of a length and a width of each of a plurality of scan regions of earth subjected to sensing by use of the plurality of sensor.

17. The method of claim 1, further comprising selecting one or more of the graphical representations for viewing or hiding within the volume depicted on the display.

18. The method of claim 1, further comprising:
selecting one of the graphical representations; and
altering the selected graphical representation in a manner that enhances visual perception of the selected graphical representation relative to non-selected graphical representations within the volume.

19. The method of claim 18, wherein altering the selected graphical representation comprises adding or altering one or more of a color, grey scale, line style, shading, hatching, or marker of the selected graphical representation.

20. The method of claim 1, further comprising:
providing user developed indicia data, the indicia data comprising one or more of annotations, axis labels, legends, and textual information, and
adding the indicia data to the display comprising the graphical representations.

21. The method of claim 1, further comprising:
selecting a volume location; and
generating a two-dimensional view of the graphical representations at the selected volume location.

22. The method of claim 21, wherein the volume has a longitudinal axis, and the two-dimensional view is generated along a plane transverse to the longitudinal axis.

23. The method of claim 21, further comprising selecting one or more of the graphical representations to generate the two-dimensional view.

24. The method of claim 1, wherein the plurality of sensor data sets comprises one or more ground penetrating radar data sets and one or more electromagnetic sensor data sets.

25. The method of claim 1, wherein the plurality of sensor data sets comprises one or more ground penetrating radar data sets and one or more seismic sensor data sets.

26. The method of claim 25, wherein the plurality of sensor data sets comprises one or more electromagnetic sensor data sets.

27. The method of claim 1, wherein correcting for curvilinear dynamic motion of the moveable platform accounts for velocity and orientation of the movable platform.

28. An apparatus, comprising:
an input configured to receive signals representative of a plurality of sensor data sets acquired during movement of a plurality of disparate types of sensors configured for sensing of a subsurface along a path via a movable platform, each of the sensor data sets comprising sensor data samples each associated with geographic position data acquired by a positioning sensor situated on the moveable platform, the input further configured to receive signals representative of positional offset data defining a positional offset of each sensor relative to the positioning sensor;
a display; and
a processor coupled to the input and the display, the processor configured to correct for curvilinear dynamic motion of the movable platform using the positional offset data to produce corrected sensor data sets and associate the geographic position data with the sensor data samples of each of the corrected sensor data sets relative to a reference frame, the processor cooperating with the display to present a graphical representation of each of the corrected sensor data sets overlaid within a volume depicted on the display.

29. The apparatus of claim 28, wherein the processor is configured to algorithmically identify one or more features in the geographically aligned sensor data sets, to perform a data fusion function on the one or more features, and to produce a graphical indication of the one or more features.

30. The apparatus of claim 28, wherein the processor is configured to receive position sensor data comprising the geographic position data for a plurality of discrete geographic locations subject to subsurface sensing, and to assign the geographic position data to the sensor data samples of each of the sensor data sets.

31. The apparatus of claim 28, wherein the processor is configured to cooperate with the display to present graphical representations of the corrected sensor data sets selectably individually within the volume and in geographical alignment relative to one another within the volume in accordance with the geographic position data of the sensor data samples of each of the corrected sensor data sets.

32. The apparatus of claim 28, wherein the geographic position data is acquired relative to a location on the platform other than at a location defined by a plane passing through an axle oriented generally transverse to a longitudinal axis of the platform or relative to a location at the geometric center of the platform, and the plurality of sensor data sets is obtained at the platform as the platform traverses the path.

33. The apparatus of claim 28, wherein the input receives field note data representative of one or more known or manually observed features within the subsurface, and the processor cooperates with the display to present a graphical or textual representation of the field note data within the volume.

34. The apparatus of claim 33, wherein the field note data comprises associated x and y geographic location data, and the graphical or textual representation of the field note data are displayed within the volume at one or more locations corresponding to the associated x and y geographic location data.

35. The apparatus of claim 28, wherein the input receives one or both of feature data representative of one or more features within the subsurface and point marker data representative of one or more points manually picked from images of data developed using one or more of the subsurface sensors, and the processor cooperates with the display to present one or both of a graphical or textual representation of the feature data within the volume and a graphical or textual representation of the point marker data within the volume.

36. The apparatus of claim 28, wherein the plurality of sensor data sets comprises at least two of ground penetrating radar data sets, electromagnetic sensor data sets, and seismic sensor data sets.

37. The apparatus of claim 28, wherein correcting for curvilinear dynamic motion of the movable platform by the processor accounts for velocity and orientation of the movable platform.

38. The apparatus of claim 28, wherein the processor is configured to:
algorithmically identify one or more features in the geographically aligned sensor data sets and compare the one or more features to a library of feature templates, the feature templates comprising response characteristics for a plurality of known features;
perform a data fusion function on the one or more features; and
cooperate with the display to produce a graphical indication of the one or more features.

39. The apparatus of claim 28, further comprising:
a second movable platform mechanically coupled to the movable platform; and
a second sensor arrangement supported by the second movable platform and configured to provide second sensor data samples as the second movable platform moves along the path;
wherein the processor is configured to associate the geographic position data with the sensor data samples and the second sensor data samples relative to the reference frame and in a manner that accounts for curvilinear dynamic motion of the respective platforms.

40. The apparatus of claim 28, further comprising:
a second movable platform mechanically coupled to the movable platform; and
a second sensor arrangement supported by the second movable platform and configured to provide second sensor data samples as the second movable platform moves along the path;
wherein the processor is configured to associate the geographic position data with the sensor data samples and the second sensor data samples relative to the reference frame using positioning sensor affixed only to one of the respective platforms and a fixed location of a coupler that mechanically couples the respective platforms.

* * * * *